(12) United States Patent
Schowengerdt

(10) Patent No.: US 9,389,424 B1
(45) Date of Patent: Jul. 12, 2016

(54) METHODS AND SYSTEMS FOR IMPLEMENTING A HIGH RESOLUTION COLOR MICRO-DISPLAY

(71) Applicant: Magic Leap, Inc., Dania Beach, FL (US)

(72) Inventor: Brian T. Schowengerdt, Seattle, WA (US)

(73) Assignee: Magic Leap, Inc., Dania Beach, FL (US)

( * ) Notice: Subject to any disclaimer, the term of this patent is extended or adjusted under 35 U.S.C. 154(b) by 0 days.

(21) Appl. No.: 14/677,931

(22) Filed: Apr. 2, 2015

Related U.S. Application Data

(60) Provisional application No. 61/974,393, filed on Apr. 2, 2014.

(51) Int. Cl.
| | |
|---|---|
| *G02B 27/01* | (2006.01) |
| *H04N 9/14* | (2006.01) |
| *H04N 9/31* | (2006.01) |
| *G02B 6/08* | (2006.01) |
| *G02B 6/00* | (2006.01) |

(52) U.S. Cl.
CPC .............. *G02B 27/0172* (2013.01); *H04N 9/14* (2013.01); *H04N 9/3179* (2013.01); *G02B 6/08* (2013.01); *G02B 2006/0098* (2013.01)

(58) Field of Classification Search
CPC .................................................. H04N 5/23235
USPC .......................................................... 348/197
See application file for complete search history.

(56) References Cited

U.S. PATENT DOCUMENTS

| | | |
|---|---|---|
| 4,955,687 A | 9/1990 | Pafford |
| 5,033,814 A | 7/1991 | Brown et al. |
| 8,372,004 B2 | 2/2013 | Krattiger |
| 8,469,525 B2 | 6/2013 | Kojima et al. |
| 9,014,517 B2 | 4/2015 | Katakura et al. |
| 2002/0110077 A1 | 8/2002 | Drobot et al. |
| 2004/0179764 A1 | 9/2004 | Melikechi et al. |
| 2006/0171647 A1 | 8/2006 | Ye et al. |
| 2007/0154153 A1 | 7/2007 | Fomitchov et al. |
| 2010/0220293 A1 | 9/2010 | Mizushima et al. |
| 2011/0032602 A1 | 2/2011 | Rothenberg |
| 2011/0274435 A1 | 11/2011 | Fini et al. |
| 2015/0009357 A1* | 1/2015 | Seibel ...................... A61B 1/07 348/222.1 |
| 2015/0178939 A1* | 6/2015 | Bradski ................ G02B 27/017 345/633 |
| 2015/0268415 A1 | 9/2015 | Schowengerdt et al. |
| 2016/0026253 A1* | 1/2016 | Bradski .................... G02B 6/34 345/8 |

OTHER PUBLICATIONS

International Search Report and Written Opinion mailed on May 8, 2014, International Application No. PCT/US14/11736, International Filing Date of Jan. 15, 2014., (11 pages).
Non-final office action mailed Sep. 3, 2015 for U.S. Appl. No. 14/156,366, Inventor Brian T. Schowengerdt, application filed Jan. 15, 2014 (22 pages).
Final Office Action dated Apr. 1, 2016 for U.S. Appl. No. 14/156,366.

\* cited by examiner

*Primary Examiner* — Paulos M Natnael
(74) *Attorney, Agent, or Firm* — Vista IP Law Group, LLP

(57) ABSTRACT

The tiled array of fiber scanners includes multiple fiber scanners arranged in a polygonal pattern determined based on analysis results. Multiple fiber scanners generate multiple component images tiled to form a seamless overall image. A fiber scanner is devised through analysis and includes projector optics, a single-core or multi-core scan fiber disposed within an actuator tube coupled with the projector optics within a housing tube according to analysis results and one or more compensators.

1 Claim, 98 Drawing Sheets

FIG. 1A TABLE 1

| Design Case | Expert Criteria in Specification | | | | | Derived Criteria | |
|---|---|---|---|---|---|---|---|
| | Resolution | Display Diagonal Size | Dynamic Range (Grayscale) | Frame Rate | Aspect Ratio | Pixel Pitch to Match Resolution |
| Threshold | 5.24 MPx | 12 mm | 12 bit | 72 Hz | 5:4 (1.25) | 3.66 μm |
| Objective | 8.02 MPx | 12 mm | - | 96 Hz | 5:4 (1.25) | 2.95 μm |

FIG. 1B TABLE 2

| Des | Image Diagonal (mm) 12 | | 5 MPX | | | | | | Field of View | | | Angular Resolution | |
|---|---|---|---|---|---|---|---|---|---|---|---|---|---|
| | AR | Dimensions (mm) | | Pixel Res. | | Pixel Pitch | | Actual Pixels | H | V | Diag. | H | V |
| | | Width | Height | H | V | H | V | | | | | | |
| 40x32 Deg | 1.250 | 9.37 | 7.50 | 2500 | 2000 | 3.75 | 3.75 | 5.00E+06 | 40 | 32 | 51.22 | 0.96 | 0.96 |
| 5MP | 1.250 | 9.37 | 7.50 | 2560 | 2048 | 3.66 | 3.66 | 5.24E+06 | 40 | 32 | 51.22 | 0.94 | 0.94 |

FIG. 9A-TABLE 3

| Design Case | Pixel Pitch | Scanner Separation Gap | Fiber NA | Image-Side / Output NA | BCD @ Image Plane | Michelson Contrast |
|---|---|---|---|---|---|---|
| Stacked, 5 MPx | 3.66 μm | 0.2 mm | 0.14 | 0.091 | 1.22 pixels | 0.98 |
| Stacked, 8 MPx | 2.96 μm | 0.2 mm | 0.16 | 0.111 | 1.22 pixels | 0.98 |
| Lenslet, 5 MPx | 3.66 μm | 0.05 mm | 0.14 | 0.106 | 1.04 pixels | 0.998 |
| Lenslet, 8 MPx | 2.96 μm | 0.05 mm | 0.147 | 0.111 | 1.22 pixels | 0.98 |

FIG. 9B – TABLE 4

FIG. 13A
TABLE 5

| Surface | Radius (mm) | Thickness (mm) | Glass | Diameter (mm) |
|---|---|---|---|---|
| OBJ | -1.935 | -1.935 | | 0.8 |
| STO | Infinity | 1.935 | | 0.5074058 |
| 2 | -1.935 | 0.05 | | 0.88 |
| 3 | 1.289644 | 0.7005531 | L-LAH86 | 1.06 |
| 4 | Infinity | 1.426867 | | 1.06 |
| 5 | 0.8847238 | 0.4064885 | S-YGH51 | 1.06 |
| 6 | -1.9648 | 0.17235 | | 0.8 |
| 7 | -0.6125116 | 0.2962589 | S-TIH4 | 0.8 |
| 8 | 0.6125116 | 0.1954013 | | 1.06 |
| 9 | -608.8232 | 0.4956644 | S-YGH51 | 1.06 |
| 10 | -0.6721057 | 4.632413 | | 1.460826 |
| IMA | Infinity | | | |

FIG. 13B
TABLE 6

| Fiber | On-axis Michelson contrast | Off-axis Michelson contrast (H x V) | Off-axis + 30 µm z shift Michelson contrast (H x V) |
|---|---|---|---|
| 3.3 µm MFD fiber | 0.67 | -0.028 x 0.21 | 0.46 x 0.60 |
| 4.36 µm MFD fiber | 0.49 | 0.15 x 0.29 | 0.32 x 0.31 |

| Fiber | On axis Michelson contrast | Off axis Michelson contrast |
|---|---|---|
| 3.3 μm MFD | 0.78 | Not Evaluated |
| 4.56 μm MFD | 0.56 | Not Evaluated |

FIG. 20A
TABLE 7

FIG. 26A - TABLE 8

| Type | Value | Citation | Change |
|---|---|---|---|
| TTH | -0.02 | 0.078832 | 0.078832 |
| TTH | 0.02 | 0.074157 | 0.074157 |
| TTH | 0.03 | 0.063983 | 0.063983 |
| TTH | 0.02 | 0.063286 | 0.063286 |
| TTH | -0.02 | 0.061216 | 0.061216 |
| TRV | -0.007 | 0.055303 | 0.055303 |
| TRV | -0.007 | 0.055303 | 0.055303 |
| TTH | 0.02 | 0.054591 | 0.054591 |
| TTH | 0.02 | 0.054333 | 0.054333 |
| TTH | -0.02 | 0.052369 | 0.052369 |

FIG. 26B - TABLE 9

| Type | Value | Citation | Change |
|---|---|---|---|
| TTH | 0.03 | 0.063749 | 0.063749 |
| TTH | 0.02 | 0.054517 | 0.054517 |
| TRV | -0.007 | 0.054179 | 0.054179 |
| TRV | -0.007 | 0.054179 | 0.054179 |
| TTH | -0.02 | 0.051016 | 0.051016 |
| TTH | -0.03 | 0.04959 | 0.04959 |
| TRV | -0.007 | 0.048924 | 0.048924 |
| TRV | -0.007 | 0.048924 | 0.048924 |
| TRX | -0.007 | 0.04653 | 0.04653 |
| TRX | -0.007 | 0.04653 | 0.04653 |

FIG. 26C - TABLE 10

| Percentage of Runs | # Wvs of Deviation from Neutral |
|---|---|
| 90% | 0.09580131 |
| 80% | 0.08721982 |
| 50% | 0.07970818 |
| 20% | 0.07145107 |
| 10% | 0.06607965 |

FIG. 26D - TABLE 11

| Percentage of Runs | # Wvs of Deviation from Neutral |
|---|---|
| 90% | 0.02650577 |
| 80% | 0.01706723 |
| 50% | 0.01188033 |
| 20% | 0.00222196 |
| 10% | 0.00050481 |

FIG. 26E - TABLE 12

| Parameter | Value |
|---|---|
| Image field diameter | 3.77 mm |
| Fiber field diameter | 0.8 mm |
| Magnification | 4.7 |
| Image GRD | 5.92 μm |
| Fiber MFD | 1.26 μm |
| Fiber 1/e² NA | 0.25 |
| Image 1/e² NA | 0.06 |

FIG. 27A - TABLE 13

FIG. 34A - TABLE 14

| Feature ID (Decimal) | Feature ID (Binary) | Occurs in Frame |
|---|---|---|
| 1 | 00001 | |
| 2 | 00010 | 1 |
| 3 | 00011 | 2 |
| 4 | 00100 | 1,2 |
| 5 | 00101 | 3 |
| 6 | 00110 | 1,3 |
| 7 | 00111 | 2,3 |
| 8 | 01000 | 1,2,3 |
| 9 | 01001 | 4 |
| 10 | 01010 | 1,4 |
| 11 | 01011 | 2,4 |
| 12 | 01100 | 1,2,4 |
| 13 | 01101 | 3,4 |
| 14 | 01110 | 1,3,4 |
| 15 | 01111 | 2,3,4 |
| 16 | 10000 | 1,2,3,4 |
| 17 | 10001 | 5 |
| 18 | 10010 | 1,5 |
| 19 | 10011 | 2,5 |
| 20 | 10100 | 1,2,5 |
| 21 | 10101 | 3,5 |
| 22 | 10110 | 1,3,5 |
| 23 | 10111 | 2,3,5 |
| 24 | 11000 | 1,2,3,5 |
| 25 | 11001 | 4,5 |
| | | 1,4,5 |

FIG. 39A
TABLE 15

FIG. 42A - TABLE 16

| NA | 0.13 |
|---|---|
| Cutoff Wavelength | 410 nm |
| Core Diameter | 2.5 μm |

FIG. 42B - TABLE 17

| Wavelength (nm) | nCore | nCladding |
|---|---|---|
| 635 | 1.462 | 1.457 |
| 532 | 1.464 | 1.458 |
| 403 | 1.468 | 1.462 |

FIG. 42C - TABLE 18

| Theta | Evanescent Depth @635 nm | Evanescent Depth @532 nm | Evanescent Depth @443 nm |
|---|---|---|---|
| 84.94° | 8.8 μm | 7.4 μm | 6.1 μm |
| 86° | 640 nm | 535 nm | 444 nm |
| 87° | 487 nm | 407 nm | 338 nm |
| 90° | 392 nm | 328 nm | 272 nm |

| Mode Field Diameter [μm] | Allowable Magnification | Scan Field Diameter [mm] | Approx. Fiber Length Radius [mm] |
|---|---|---|---|
| 3.5 | 2.09 | 6.216 | 12.265 |
| 3.4 | 2.15 | 6.038 | 11.915 |
| 3.3 | 2.22 | 5.861 | 11.564 |
| 3.2 | 2.29 | 5.683 | 11.214 |
| 3.1 | 2.36 | 5.505 | 10.863 |
| 3.0 | 2.44 | 5.328 | 10.513 |
| 2.9 | 2.52 | 5.150 | 10.163 |
| 2.8 | 2.61 | 4.973 | 9.812 |
| 2.7 | 2.71 | 4.795 | 9.462 |
| 2.6 | 2.82 | 4.617 | 9.111 |
| 2.5 | 2.93 | 4.440 | 8.761 |
| 2.4 | 3.05 | 4.262 | 8.410 |
| 2.3 | 3.18 | 4.085 | 8.060 |
| 2.2 | 3.33 | 3.907 | 7.710 |
| 2.1 | 3.49 | 3.730 | 7.359 |
| 2.0 | 3.66 | 3.552 | 7.009 |
| 1.9 | 3.85 | 3.374 | 6.658 |
| 1.8 | 4.07 | 3.197 | 6.308 |
| 1.7 | 4.31 | 3.019 | 5.957 |
| 1.6 | 4.58 | 2.842 | 5.607 |
| 1.5 | 4.88 | 2.664 | 5.257 |
| 1.4 | 5.23 | 2.486 | 4.906 |
| 1.3 | 5.63 | 2.309 | 4.556 |
| 1.2 | 6.10 | 2.131 | 4.205 |
| 1.1 | 6.65 | 1.954 | 3.855 |
| 1.0 | 7.32 | 1.776 | 3.504 |

FIG. 51A
TABLE 19

| Scan Frequency | Lines at 72 Hz Frame Rate | Difference | Lines at 96 Hz Frame Rate | Difference |
|---|---|---|---|---|
| 11500 Hz | 313.89 | | 235.42 | |
| 11500 Hz | 319.44 | +/-5.56 | 239.58 | +/-4.17 |
| 11700 Hz | 325.00 | | 243.75 | |
| 22600 Hz | 633.33 | | 475.00 | |
| 23000 Hz | 638.89 | +/-5.56 | 479.17 | +/-4.17 |
| 23200 Hz | 644.44 | | 483.33 | |
| 35800 Hz | 994.44 | | 745.83 | |
| 36000 Hz | 1000.00 | +/-5.56 | 750.00 | +/-4.17 |
| 36200 Hz | 1005.56 | | 754.17 | |

FIG. 75A
TABLE 20

METHODS AND SYSTEMS FOR IMPLEMENTING A HIGH RESOLUTION COLOR MICRO-DISPLAY

CROSS-REFERENCE TO RELATED APPLICATION(S)

This application claims the benefit of U.S. Prov. Patent Application Ser. No. 61/974,393 filed on Apr. 2, 2014 and entitled "ULTRA-HIGH RESOLUTION SCANNING FIBER DISPLAY FOR HEAD MOUNTED DISPLAY SYSTEMS". The content of the aforementioned provisional U.S. patent application is hereby expressly incorporated by reference in its entirety for all purposes. This application is cross-related to U.S. patent application Ser. No. 14/156,366 filed in 2014 and entitled "ULTRA-HIGH RESOLUTION SCANNING FIBER DISPLAY".

GOVERNMENT LICENSE RIGHTS

This invention was made with government support under the grant number AF131-017-1649 awarded by the AF Small Business Innovation Research (SBIR) Program of the United States Air Force. The government has certain rights in the invention.

BACKGROUND

Fiber scanned displays involve the use of an optical fiber cantilever scanned in one or two dimensions to project light out of the end of the fiber to form an image. In comparison to traditional image projection systems like video projectors or competing scanning technology such as MEMS (micro-electromechanical system) mirror scanning devices or the like, fiber scanning technology offers many advantages. The small mass of the micro-fabricated fiber scanner allows higher scan angles at video rates than mirror scanners. Fiber scanners also have a smaller 'footprint', occupying less space and may be conveniently packaged into a small diameter tube.

Due to the smaller size of fiber scanners, the resolution of the generated image is nevertheless limited, especially in view of the demand of high-definition image or video content. Therefore, there exists a need for a high resolution color fiber scanned display.

SUMMARY

Disclosed are apparatuses for a color micro-display or a color ultra-high definition micro-display that are well-suited for applications including head-mounted displays.

Some embodiments are directed to a tiled array of fiber scanned displays. The tiled array includes a plurality of fiber scanners that are affixed in the tiled array in a polygonal pattern. The polygonal pattern may be determined based in part or in whole upon one or more analyses including, for example, one or more of a sensitivity analysis, an inverse sensitivity analysis, a tolerance analysis, and/or Monte Carlo simulations. The polygonal pattern may include a hexagonal pattern that covers the overall image while leaving an additional display area for presenting additional information other than the overall image.

In one embodiment, the overall image has a 12-mm diagonal in one or more aspect ratios and a resolution of five-megapixels or higher. The tiled array may include 72 fiber scanners to produce the overall image with a resolution over 5 mega-pixels and Michelson contrast of 0.5 or better in some embodiments. Multiple scan frequencies from approximately 10 kHz to over 50 kHz may be selected for the fiber scanners to accommodate different refresh rates of over 80 Hz. In some embodiments, the tiled array may include only 10 fiber scanners operating at a scan frequency to produce the overall image with a resolution over 8 mega-pixels and Michelson contrast of 0.5 or better.

The plurality of fiber scanners produce the corresponding plurality of component images that are tiled together to form an overall image. Various techniques apply to produce visually or visibly seamless overall images. A fiber scanner in the tiled array may be devised based in part or in whole upon a plurality of analyses and may comprise projector optics disposed within a housing tube and a single-core or multi-core scan fiber disposed within a piezoelectric actuator tube according to analysis results and one or more compensators. The piezoelectric actuator tube is operatively coupled with the projector optics in the housing tube.

In some embodiments, the tiled array may include at least one lensed scanning fiber that has a mode field diameter within the range of 0.5 µm to 1.26 µm and produces an image field having a diameter larger than 3 mm and a magnification of greater than 4×. The plurality of fiber scanners may be positioned in the tiled array based upon a mechanical geometric registration and/or a digital geometric registration of the plurality of component images produced by the plurality of fiber scanners with the overall image.

The scan fiber of a fiber scanner may be devised based in part or in whole upon results the plurality of analyses that include one or more paraxial analyses, a contrast-based performance analysis, a wavefront aberration performance analysis, and/or a coherent image analysis. In addition or in the alternative, the plurality of fiber scanners include at least one fiber scanner that incorporates multiple cores into the scan fiber. In some embodiments, the plurality of fiber scanners is affixed to a monolithic lenslet array in the tiled array.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 1A-B respectively including TABLES 1 and 2 that illustrate some examples of parameters and characteristics of a fiber scanner or a tiled array of fiber scanned displays in some embodiments.

FIG. 9A including TABLE 3 that includes some parameter examples for some design variants or configurations in some embodiments.

FIG. 9B including TABLE 4 shows some examples of basic design parameters for a unit cell design in some embodiments.

FIG. 13A including TABLE 5 illustrates some examples of the prescription data for the refined thick lens design in some embodiments.

FIG. 13B including TABLE 6 illustrates contrast performance for an example of a nominal thick lens design in some embodiments.

FIG. 20A including TABLE 7 illustrates a summary of an example of the Monte Carlo analysis with no compensators in some embodiments.

FIG. 26A including TABLE 8 illustrates some examples of tolerances of interest used for these one or more sensitivity analyses in some embodiments.

FIG. 26B including TABLE 9 illustrates some examples of the worst offender deviations from a nominal design using only a focus compensator in some embodiments.

FIG. 26C including TABLE 10 illustrates some examples of the worst offender deviations from a nominal design using both a focus compensator and a thickness compensator in some embodiments.

FIG. 26D including TABLE 11 illustrates some examples of the distribution of Monte Carlo simulations that exceeds a certain deviation value in some embodiments.

FIG. 26E including TABLE 12 illustrates some examples of the distribution of Monte Carlo simulations that exceeds a certain deviation value with tolerances determined from inverse sensitivity analyses in some embodiments.

FIG. 27A including TABLE 13 illustrates some examples of design parameters of a 45 kHz paraxial fiber scanner design in some embodiments.

FIG. 34A including TABLE 14 illustrates some examples of positional errors due to manufacturing and assembly tolerances in some embodiments.

FIG. 39A including TABLE 15 illustrates some examples of a binary identification scheme in some embodiments.

FIG. 42A including TABLE 16 illustrates some examples of specifications for a fiber scanner in some embodiments.

FIG. 42B including TABLE 17 illustrates some examples of estimated indices of refraction by laser diode wavelength in some embodiments.

FIG. 42C including TABLE 18 illustrates some examples of evanescent field penetration depth in some embodiments.

FIG. 51A including TABLE 19 illustrates how, to first order, the fiber length may vary depending on the mode field diameter of the fiber cores in some embodiments

FIG. 75A including TABLE 20 illustrates the scan frequency sensitivity analysis results in some embodiments.

DETAILED DESCRIPTION

Figure 1:
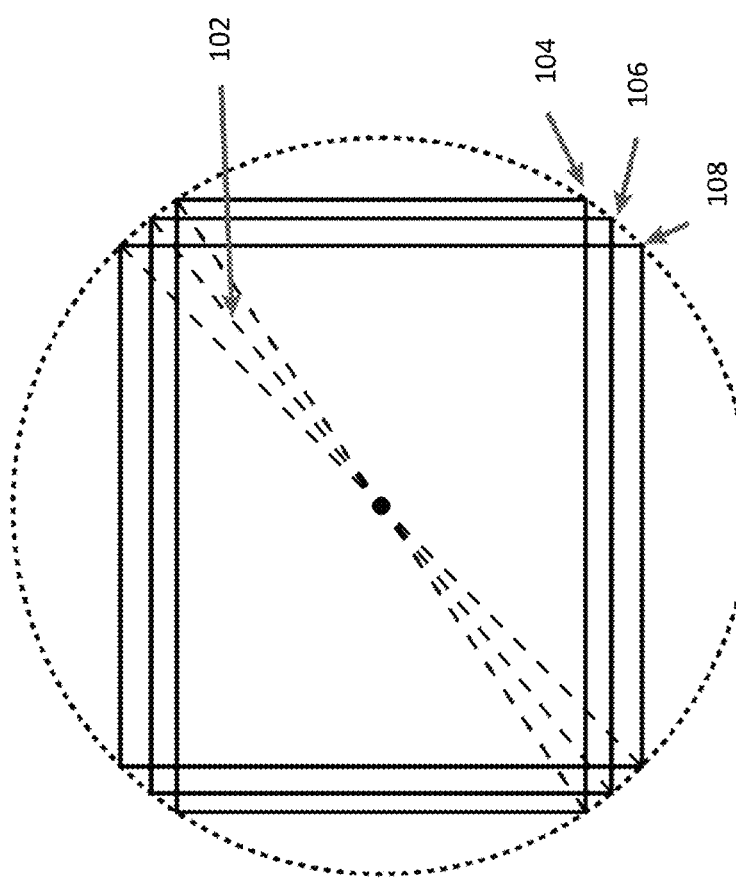
FIG. 1 illustrates some examples of aspect ratio formats in some embodiments.

Various embodiments of the invention are directed to a methods and systems for implementing a color micro-display in a single embodiment or in some embodiments. Other objects, features, and advantages of the invention are described in the detailed description, figures, and claims.

Some embodiments are directed at a tiled projector array fiber scanned displays (FSDs) for a color micro-display. Some of these embodiments are directed at a tiled projector array FSDs for a color ultra-high definition micro-display (CUDM). The tiled projector array of FSDs includes a plurality of fiber scanners that are arranged in a tiled array to provide a high definition image having a 12-mm diagonal at a certain refresh rate in some embodiments. For example, a tiled projector array including 72 fiber scanners may produce a 2560×2048 or 5.24 mega-pixels (MPx) image with a 12-mm diagonal at 72 Hz refresh rate. The tiled projector array may also be devised to produce even higher resolution images (e.g., approximately 8 MPx) with 10 fiber scanners. Some embodiments are directed at enhanced fiber scanned displays producing high resolution images. Some other embodiments are directed at various methods for implementing or devising a fiber scanner and a tiled projector array comprising multiple such fiber scanners to produce a seamless image by various techniques including, for example, various analyses, geometric alignment of images, photometric blending, etc.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Disclosed are method and systems for implementing or devising a color micro-display. The color micro-display may be used for virtual and augmented reality In, for example, optical instruments such as a human wearable display glasses for the application of virtual reality or augmented reality.

Some examples of optical designs, a tiled array of fiber scanned displays (FSDs), and various types of data are illustrated and described below with reference to various figures and tables. It shall be noted that the reference of certain specific information or data such as certain parameters and characteristics of these examples is provided for explanation and illustration purposes and is not intended to limit the scope of the claims or the scope of other embodiments referencing one or more other parameters and/or one or more other characteristics that are not listed herein.

For example, some examples described below reference display images with a 12-mm diagonal to accommodate the viewing optics disposed further upstream from the fiber scanned display or the tiled array. Some examples further produce rectangle display images with certain resolutions, aspect ratios, dynamic ranges, frame rate, and pixel pitch to match the resolutions. For example, TABLE 1 in FIG. 1A lists some examples of parameters and characteristics of a fiber scanner or a tiled array of fiber scanned displays in some embodiments. Nonetheless, it shall be noted that the techniques described herein are not limited to only to these parameters or characteristics listed in TABLE 1 or other parameters and characteristics recited in the remainder of this application. For example, one or more parameters or characteristics including angular visual acuity (e.g., 20/20) presented to the viewer, the angular resolution per pixel (e.g., 50 arcsec), etc. may also be considered in implementing the fiber scanner designs and the designs of a tiled array of fiber scanned displays. Visual acuity is a parameter that may be used to assess overall vision.

Moreover, some embodiments are directed at a tiled array of fiber scanned displays that may be arranged in, for example, a hexagonal pattern, to fully cover a 12-mm diameter circle. These tiled arrays may thus produce 8.02 mega-pixels (MPx) total resolution with the same angular resolution for the 5.24 mega-pixel (MPx) resolution in a rectangular form factor with a 12-mm diagonal assuming that the same angular field of view (FOV) may be subtended by the 12-mm diagonal. A tiled array of FSDs also provides the flexibility in terms of different aspect ratios for the produced images. FIG. 1 illustrates some examples of aspect ratio formats in some embodiments.

These examples illustrated in FIG. 1 have 12-mm diagonals (102). Furthermore, FIG. 1 illustrates an existing format that matches the 40°×32° FOV described as a requirement for QSXGA (Quad Super Extended Graphics Array), which has 5:4 (1.25) aspect ratio (106) with a resolution of 2560 H×2048 V, or 5.24 MPx. One embodiment adopts this QSXGA format and produces derived display dimensions of 9.37 mm×7.50 mm or 3:2 aspect ratio (104) with a 12-mm diagonal as shown in TABLE 2 in FIG. 1B. The resulting pixel pitch is determined to be 3.66 um and corresponds to an angular resolution of 56 arcsec, or 20/23 acuity, with 50 arcsec being equal to 20/20. TABLE 2 further includes more characteristics of this QSXGA format and a variant with the resolution of 2500 H×2000 V. FIG. 1 further illustrates the 1:1 aspect ratio (108) with the derived display dimensions of 8.49-mm×8.49-mm.

As described previously, one of the advantages of a tiled array FSDs is that the image displays are not limited to standard, rectangular display formats. To best match the input image plane requirements of HMD (head-mounted display) viewing optics, some embodiments include a rectangular, 5:4 aspect ratio, 12-mm diagonal display. Other embodiments may adopt any geometry that may be filled by an overlapped, hex-packed array of circular images. For example, the 12-mm image diagonal subtends a 51° FOV when the rectangular display area is a 40°×32° FOV. These embodiments include more fiber scanners to fill an entire 12-mm diameter circle to provide a 51° conical FOV and additional overall resolution of the rectangular display (8.44 MPx with a 3.66 µm pixel pitch, or 12.9 MPx with a 2.96 µm pixel pitch). In some of these embodiments, when a 40° conical FOV is sufficient for a particular purpose, the additional spatial resolution provided by these additional fiber scanners may be utilized as an increase in angular resolution, reducing the angular pixel pitch for higher acuity.

Figure 2:
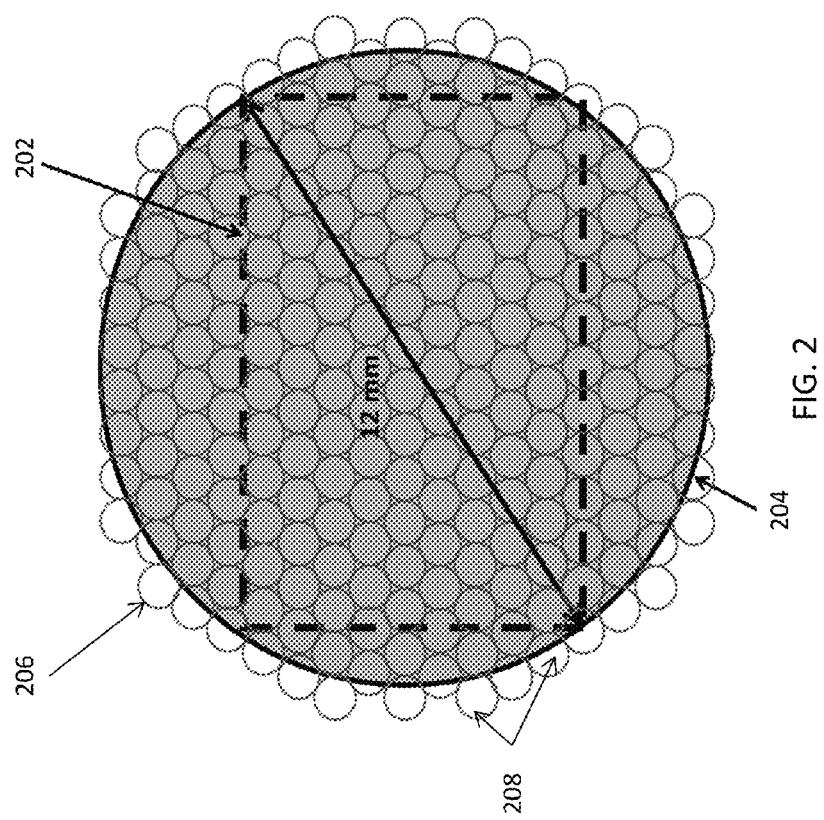
FIG. 2 illustrates a schematic or conceptual representation of a tiled projector array display comprising a plurality of fiber scanners in some embodiments.
Figure 3:
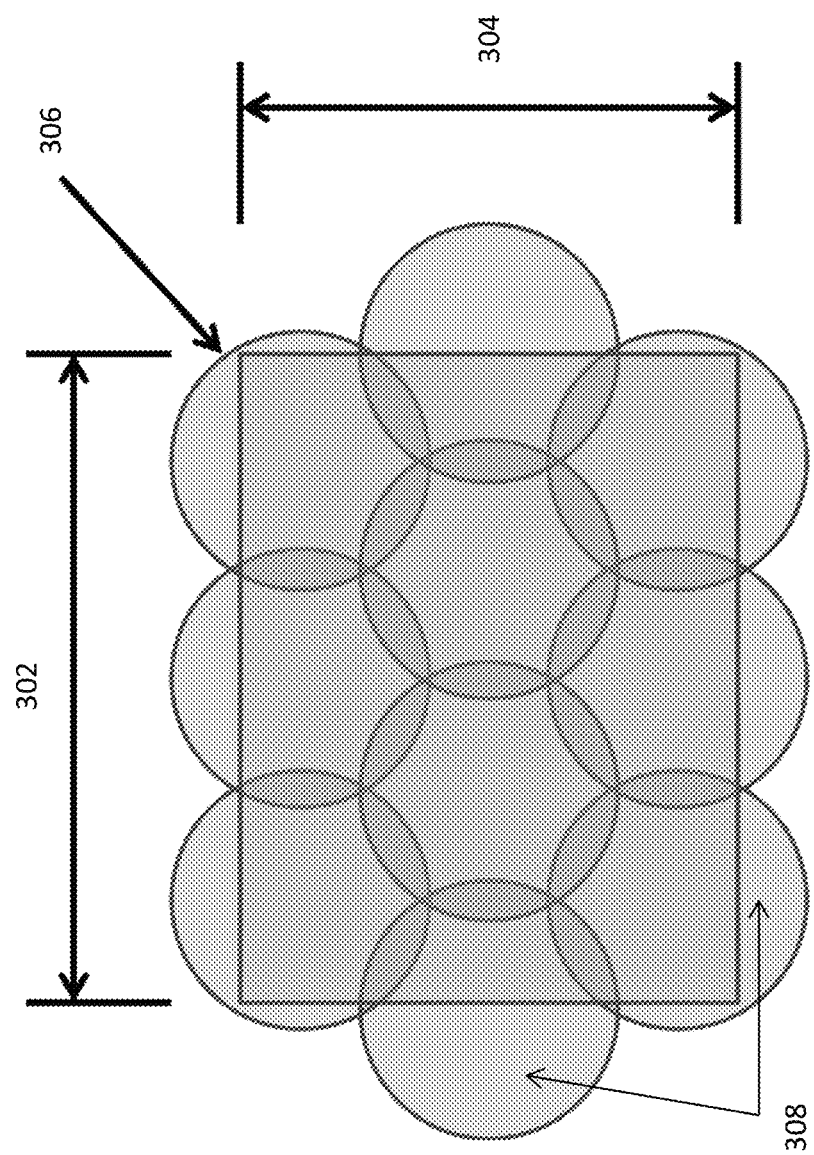
FIG. 3 illustrates a schematic or conceptual representation of a tiled projector array display including side lobes to provide additional resolution in some embodiments.

FIG. 2 illustrates a schematic or conceptual representation of a tiled projector array display comprising a plurality of fiber scanners in some embodiments. In FIG. 2, each of the array of small circles (206) represents a fiber scanner body, and the large circle (204) and rectangle (206) respectively represent the usable display areas. It shall be noted that the periphery (208) of the tiled array FSDs not bounded by the actual display area may still be utilized to provide other data including additional information, symbology, legends, etc. For example, a 10-FSD tiled array, shown in FIG. 3 with image field diameters (306) (e.g., ɸ3.77-mm) may form a display of 8 MPx with a 12-mm diagonal having the width of 9.37-mm (302) and the height (304) of 7.50-mm, but the 'lobes' (308) outside of the display format may be available for presentation of other data or information. In this example, the additional resolution amounts to 2.8 MPx, for a total available resolution of 10.8 MPx.

Some embodiments are directed at a tiled projector array fiber scanned display design for the resolution of 5.24 MPx with 5:4 aspect ratio and a 12 mm-diagonal. One of the objectives is to obtain a Michelson contrast at a prescribed level while accounting for manufacturability and/or cost in some embodiments.

Figure 4:
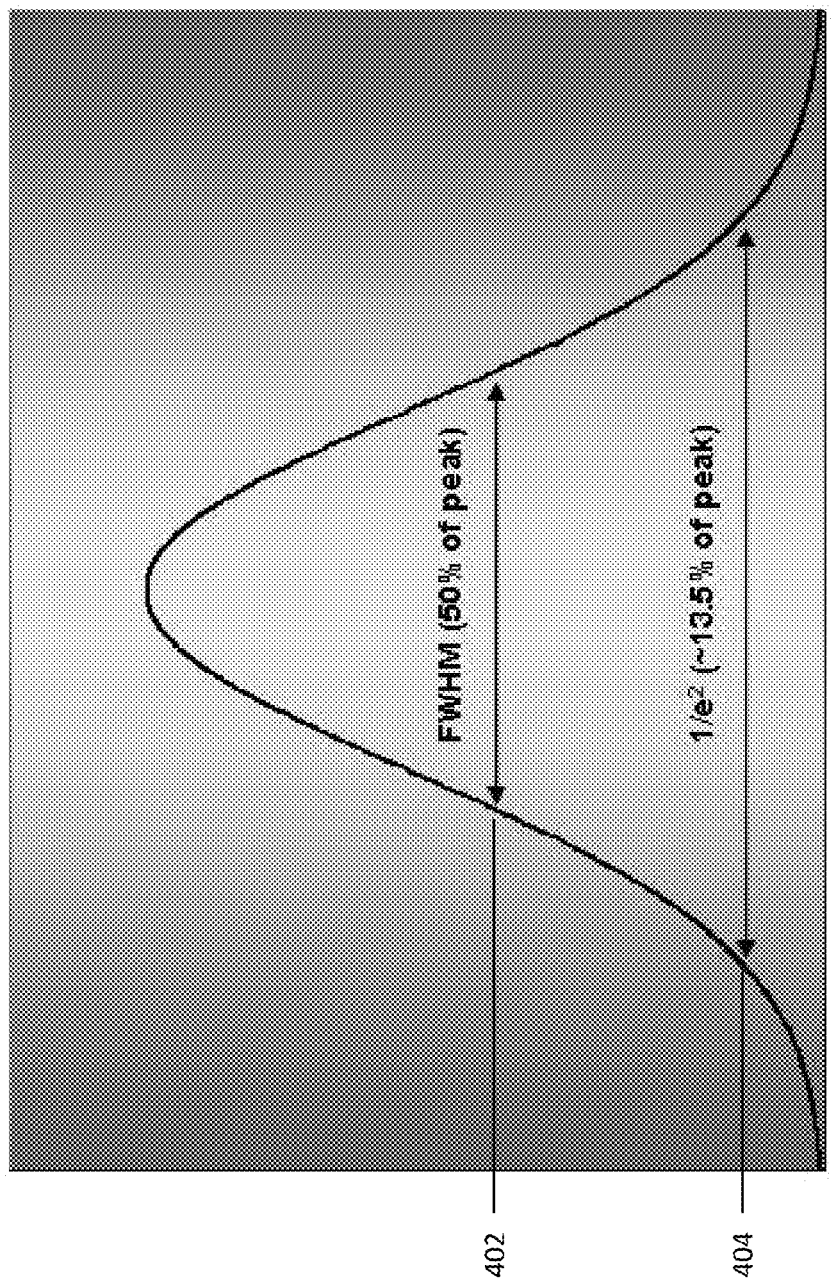
FIG. 4 illustrates full-width and half-maximum (FWHM) and $1/e^2$ descriptions of a Gaussian beam diameter in some embodiments.

FIG. 4 illustrates full-width and half-maximum (FWHM) (402) and $1/e^2$ (404) descriptions of a Gaussian beam diameter in some embodiments. Some conventional approaches adopt a 1:1 mapping of an FWHM diameter to pixel size, some embodiments use a definition for the Gaussian beam diameter (GBD) at the image plane of $1/e^2$ of the peak intensity of the Gaussian shape.

Figure 5:
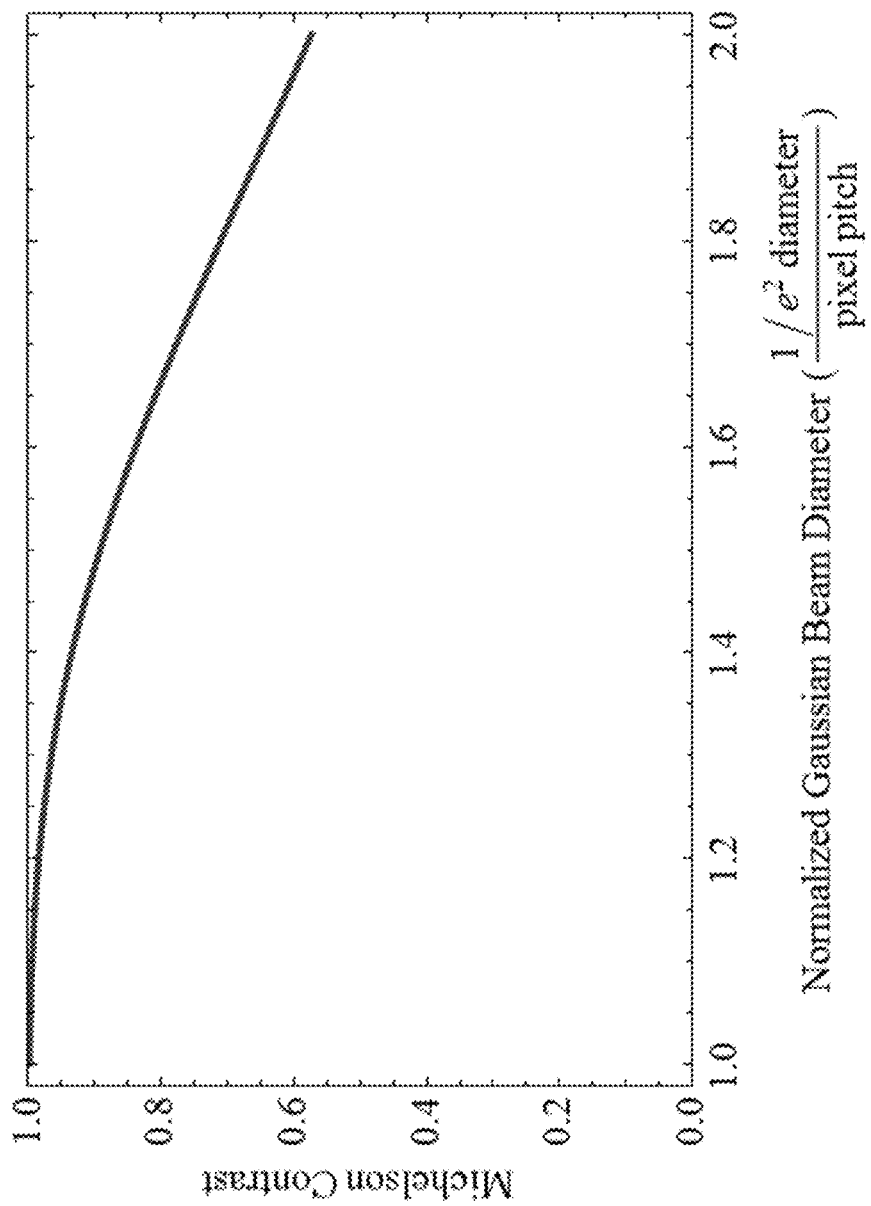
FIG. 5 illustrates a plot of Michelson contrast with respect to normalized Gaussian beam diameter in some embodiments.

In some embodiments, the absolute beam diameter may be normalized with respect to the pixel pitch and use the line-on/line-off Michelson contrast criterion to evaluate the effects of various mappings of the $1/e^2$ diameter to a rectangular pixel size. For example, some embodiments divide the $1/e^2$ diameter by the pixel pitch to normalize the absolute beam diameter with respect to the pixel pitch as illustrated in FIG. 5, which illustrates a plot of Michelson contrast with respect to normalized Gaussian beam diameter. Normalizing the Gaussian beam diameter may provide the ability to uniformly analyze designs across various actual pixel sizes and/or target resolutions of the tiled projector FSDs (e.g., 5 MPx and 8 MPx target resolutions).

The effects of one or more different mappings (e.g., the mapping with the FWHM diameters, the mapping with the 1/e2 diameter, etc.) may be evaluated, for example, the line-on/line-off Michelson contrast. The Michelson contrast describes the line-on/line-off contrast and may be expressed by Eqn. (1) below:

$$C_m = \frac{Y_{max} - Y_{min}}{Y_{max} + Y_{min}}, \quad (1)$$

Figure 6:
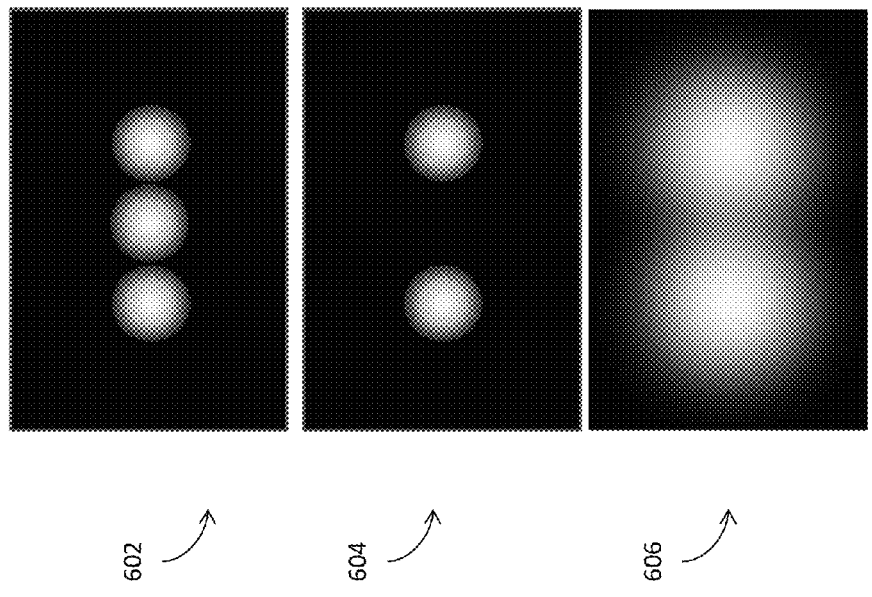
FIG. 6 illustrates some examples of the size of Gaussian beam diameters affecting the intensity of the line-off trough between two non-adjacent "on" pixels separated by an "off" pixel in some embodiments.

In Eqn. (1), $Y_{max}$ and $Y_{min}$ denote the maximum and minimum intensities of the summation of the overlapping Gaussian beams. The size of the Gaussian beam diameter with respect to the pixel pitch may be used to determine the intensity of the line-off trough between two non-adjacent "on" pixels separated by an "off" pixel as illustrated in FIG. 6, which illustrates some examples of the size of Gaussian beam diameters affecting the intensity of the line-off trough between two non-adjacent "on" pixels separated by an "off" pixel in some embodiments. At the top of FIG. 6 there is a representation (602) of three consecutive pixels having small GBDs relative to the pitch between two immediately adjacent pixels.

Figure 7:
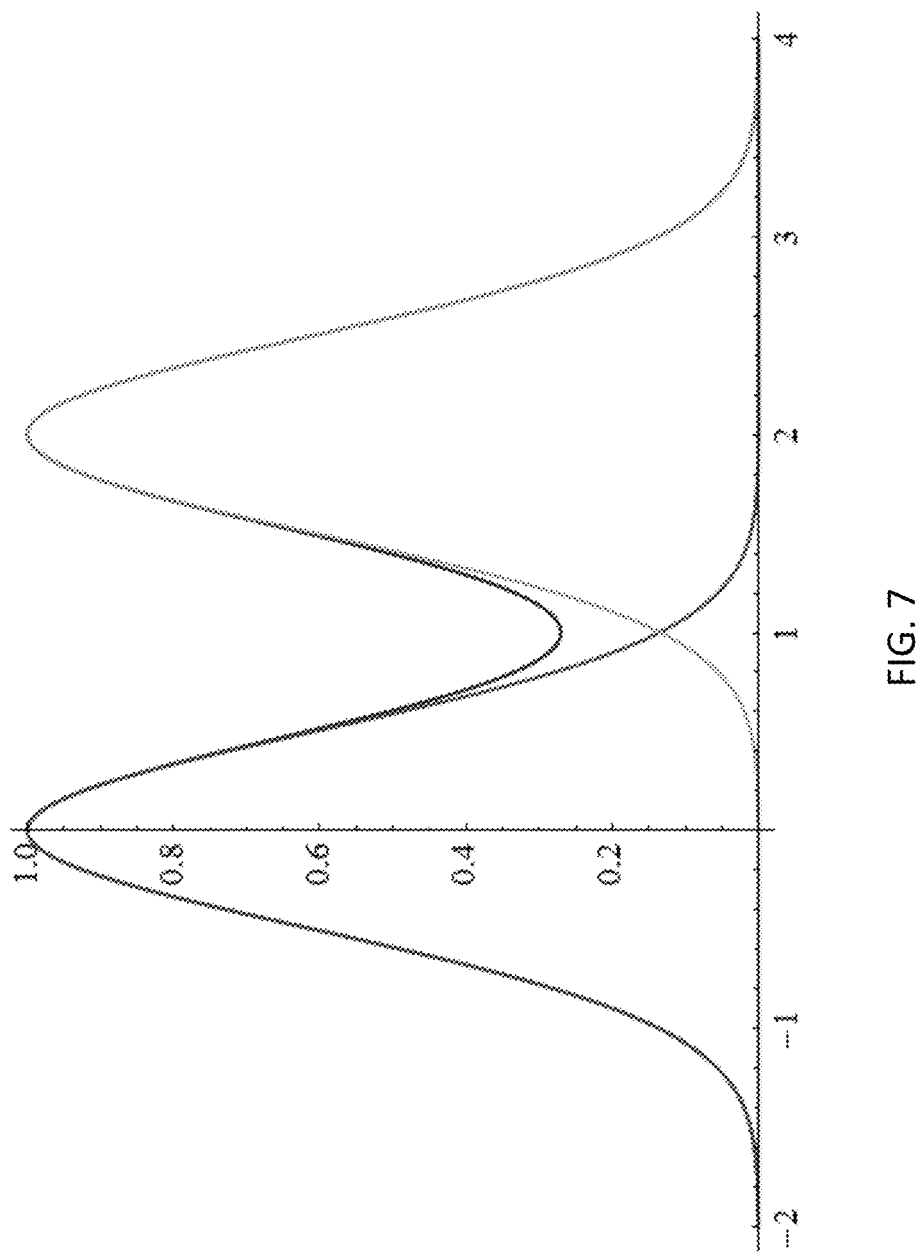
FIG. 7 illustrates an example of a relationship between Michelson contrast and normalized Gaussian beam diameters in some embodiments.

The middle representation (604) illustrates the central pixel having been turned off, showing very high contrast between the line-off and line-on condition. The bottom representation (606) illustrates an example of a large GBD resulting in low contrast between the peaks of the Gaussian beams and the trough formed by the sum of the two beams in the "line-off" region. FIG. 7 illustrates an example of a relationship between Michelson contrast and normalized Gaussian beam diameters in some embodiments. More specifically, FIG. 7 shows a relation between the Michelson Contrast and a normalized GBD for a GBD-to-pixel pitch ratio of 2. Some embodiments described herein adopt the Michelson contrast goal of 50% or better to produce display images.

Design performances may be compared across various design variants or configurations based on one or more criteria (e.g., the Michelson contrast) for further analyses of designs among target resolutions. In some embodiments, these design variants or configurations may be modeled using simple paraxial lenses for comparison purposes. For example, a first design variant or configuration may include an array of individual FSDs bound together, each FSD including its own optics, and a second design variant or configuration may include an array of separate scan engines having their respective piezo tubes, electrical leads, optical fibers, and mounting collars with a monolithic lenslet array. These two variants or configurations may be analyzed for both the 5 MPx and the 8 MPx resolutions and further compared or graded based in part or in whole upon their respective Michelson contrast. For example, the normalized GBDs may be compared for these design variants or configurations, where smaller normalized GBD corresponds to higher Michelson, and minimum normalized GBD corresponds to highest Michelson contrast.

Figure 8:
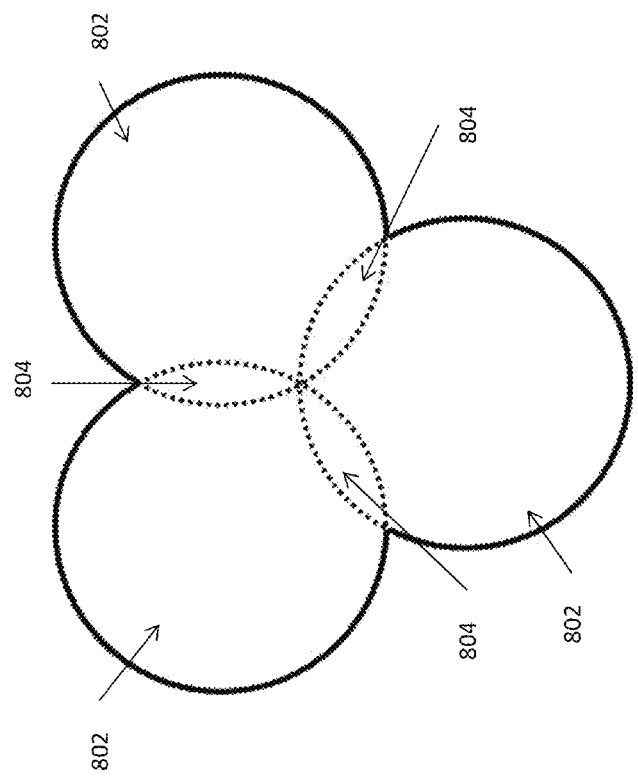
FIG. 8 illustrates an example of overlapping scan fields for circular elements tiled in a hexagonal array in some embodiments.

With these paraxial design variants or configurations, the numerical aperture of the fiber scanners affects the numerical aperture on the image side of the tiled array of FSDs and thus the size of the image fields as well as the degree of overlap, which may be further analyzed, processed, or otherwise manipulated to improve uniformity across the tiled image produced by the tiled array of FSDs. FIG. 8 illustrates an example of overlapping scan fields for circular elements tiled in a hexagonal array in some embodiments. In FIG. 8, each of the three circular regions (802) represents the image produced by a fiber scanner, and the regions (804) represent overlapping regions.

Figure 9:
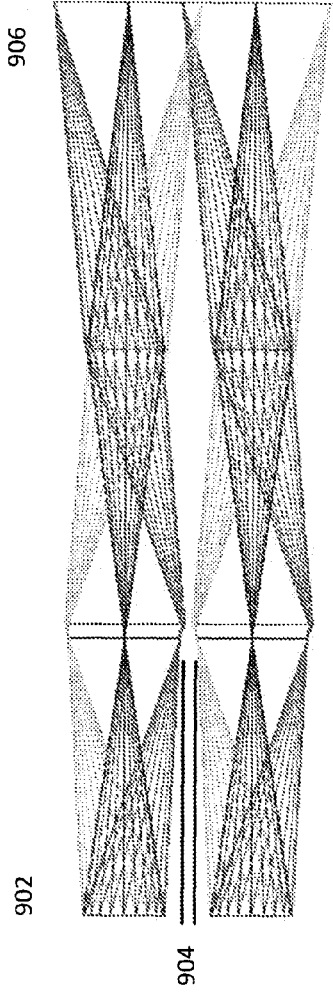
FIG. 9 illustrates a schematic representation of a general paraxial design layout and ray-trace in some embodiments.

A paraxial design may be determined by performing one or more paraxial analyses to improve the contrast. FIG. 9 illustrates a schematic representation of a general paraxial design layout and ray-trace in some embodiments, and TABLE 3 illustrated in FIG. 9A includes some parameter examples for some design variants or configurations in some embodiments. In the first example of a general paraxial design, (902) denotes the numerical aperture of a fiber scanner; (904) indicates the gap; and (906) indicates the output numerical aperture.

In these embodiments represented by TABLE 3 and/or FIG. 9, the first design variant assumes assembling an array of multiple, self-contained FSDs, each of which includes the same optical fiber used in existing FSD prototypes. Each FSD may include its own dedicated projection optics (e.g., optics including two paraxial lenses) and may be housed in its own enclosure tube. The tube, along with the diameter of the projection lenses may constrain how closely together the FSDs may be packed. For a lens lateral separation distance of 0.2 mm and a NA of 0.14 for the fiber scanner, the output NA required or desired to fully overlap the individual scanner images is 0.091 for a 5 MPx display. The pixel pitch is 3.66 µm, and the normalized beam diameter is $1.22*1/e^2$, yielding a Michelson contrast of 0.98.

Another example of a paraxial design with individual FSDs bound together for the 8 MPx display, a larger output NA of 0.111 may be used to achieve a pixel pitch of 2.96 µm at the image plane. In this second example of paraxial designs, the fiber NA may be increased to 0.16 in order to achieve a 0.111 NA on the output side, targeting the same 0.98 Michelson contrast as in the 5 MPx case with an equivalent normalized beam diameter of $1.22*1/e^2$. In a third example of a paraxial design including tubeless FSDs with lenslet arrays for a 5 MPx display where the lateral spacing between the projection optics of the FSDs is reduced, a lower optical magnification and thus a lower input fiber scanner NA may be used in the projection optics.

In this example, removing the individual fiber scanner tubes and assembling the fiber scanners closer together in a monolithic assembly may be achieved by using lenslet arrays for the projection optics. The lenslet arrays allow the use of existing 0.14 NA fiber scanners, while increasing the Michelson contrast. The NA of the fiber scanner is maintained at 0.14, and the output NA is increased to 0.106 over, for example, the stacked tube design. The normalized beam diameter may be reduced to $1.04*1/e^2$, and consequently the Michelson contrast is improved to 0.998 in this third example of paraxial design. In the fourth example of a paraxial design including tubeless FSDs with lenslet arrays for an 8 MPx display, the NA of the fiber scanner may be reduced 0.147, while achieving the same performance as stacked tube design: pixel pitch of 2.96 µm, normalized beam diameter of $1.22*1/e^2$, and a Michelson contrast of 0.98 as the second paraxial design example. The lenslet array design may provide several advantages over the stacked tube design as in the second example, yet the lenslet arrays may be custom fabricated.

In these embodiments including paraxial designs, the numerical aperture of a fiber scanner may be identified or extracted by using equation (2) below.

$$NA = \sqrt{n_{core}^2 - n_{cladding}^2} \quad (2)$$

In Eqn. (2), $n_{core}$ and $n_{cladding}$ denote the indices of refraction for a fiber scanner and the normalized frequency (V number). In these embodiments including paraxial designs, one of the parameters may include the numerical aperture (NA) of the fiber scanner because the NA of the fiber scanner affects the NA of the image side of the optical system, and therefore the size of the image fields and the degree of overlap, which is related to the uniformity across the tiled image when tiling circular FSD elements in a hexagonal arrangement. For thick lens designs, the one or more parameters or characteristics may include the mode field diameter which relates to the Gaussian beam diameter and hence the degree of contrast. In some embodiments, the V number may be subject to a condition of V<2.405 for single mode operation. In these embodiments, the V number may be expressed in Eqn. (3) below.

$$V = \frac{2\pi a}{\lambda} NA \quad (3)$$

In Eqn. (3), "a" denotes the radius of the core. The spot size may then be determined by Eqn. (4) below in some embodiments.

$$w_0 = a(0.65 + 1.619V^{-1.5} + 2.879V^{-6}) \quad (4)$$

The mode field diameter may then be determined by Eqn. (5) below.

$$MFD = 2w_0.$$

Multiple paraxial designs may be identified, where each paraxial design may include multiple fiber scanned displays in a respective arrangement. The beam diameter produced by a paraxial design may be normalized into a normalized beam diameter. The normalized beam diameter is minimized based in part upon the contrast generated by a paraxial design. These multiple paraxial designs are graded based in part upon their respective Michelson contrast. The first paraxial design may be determined by comparing the performances of these multiple paraxial designs based on their respective Michelson contrast to analyze these multiple paraxial designs among target resolutions.

The tiled array of FSDs may have a unit cell design or a monolithic lenslet array. The unit cell design is easier for manufacturing and is thus associated with lower manufacturing costs, while the monolithic design produces better performances at the expense of higher manufacturing complexities and hence higher costs. In these embodiments, a characteristic related to the Gaussian diameter at the image plane or the degree of contrast may be identified and an initial thick lens design may be identified. The 5 MPx stacked tube design may be determined to be the initial thick lens design.

In some embodiments, the individual scanner array design may be selected over the monolithic lenslet-array design because the unit cell design lends itself better to fabrication techniques already in place for a single scanner assembly, and further because of a lower performance to cost ratios of a lenslet array design. In some embodiments, the characteristic may include the mode field diameter (MFD), which is related to the Gaussian beam diameter at the image plane and hence the degree of contrast. The mode field diameter may be determined by using Eqns. (2)-(5) provided above. In some embodiments, a paraxial design having a unit cell design may include only spherical surfaces and cemented elements.

The initial thick lens design may include only spherical surfaces and cemented elements. The thick lens design refinement process is to determine whether or not the optical performance may be achieved with some basic parameters and easier-to-fabricate design components. TABLE 4 illustrated in FIG. 9B shows some examples of basic design parameters for a unit cell design. These basic parameters may include, for example, one or more of the target image pixel size, fiber NA, image NA, fiber maximum swing, lens clear aperture margin, scanner tube wall allowance, center distance between two immediately neighboring fiber scanners, and image size.

Figure 10:
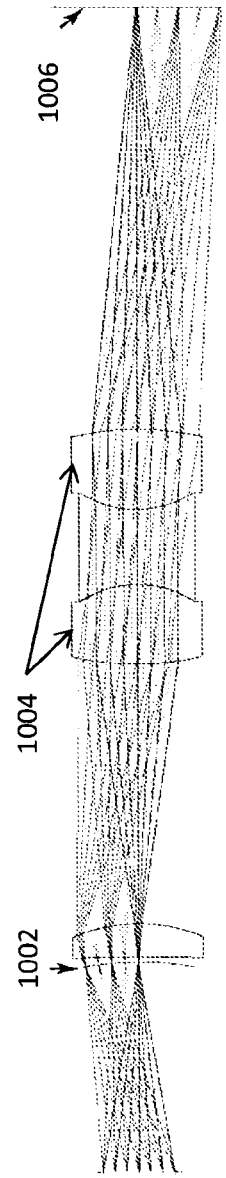
FIG. 10 illustrates a simplified schematic representation of a thick lens design in some embodiments.

FIG. 10 illustrates a simplified schematic representation of a thick lens design in some embodiments. More specifically, FIG. 10 shows the optical schematic and ray-tracing of a unit cell design. A field lens next to the scanning fiber (1002) bends the rays to stay within the mounting tube, and a symmetric achromatic triplet (1004) provides focusing power to form the fiber tip image plane (1006). The scanner image may be devised larger than the scanner separation to avoid gaps in the tiled image produced by an array of scanners in some embodiments. A symmetric triplet design form may be adopted because it is relatively easy to mount, as it also avoids the need for precise air gaps, and the symmetry prevents accidental placement in the wrong direction.

Figure 11A:
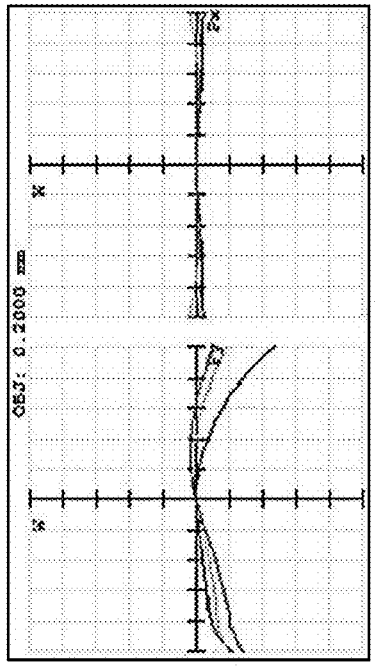
FIGS. 11A-C illustrates some examples of wavefront aberration analysis results in some embodiments.
Figure 11B:
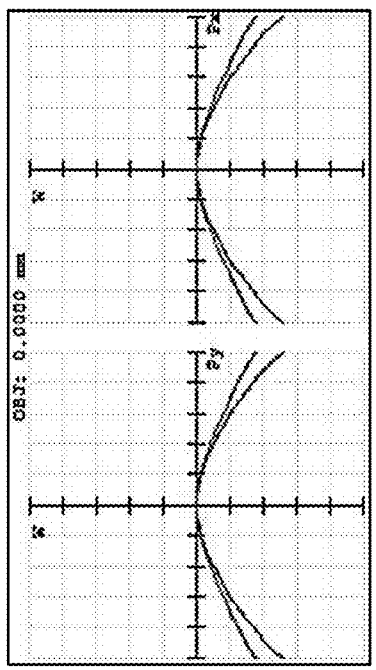
Figure 11C:
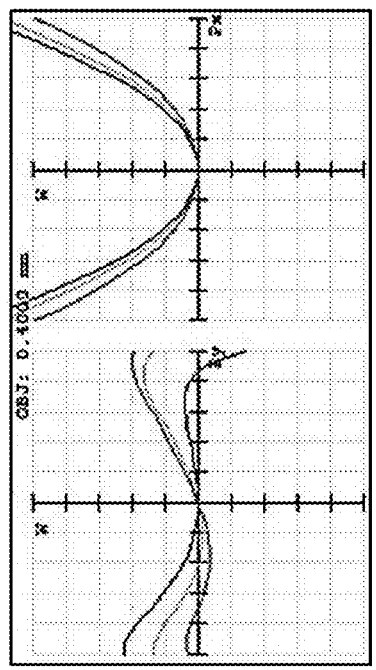

A wavefront aberration performance analysis may be performed, and corrections may be applied to one or more dominant aberrations. FIGS. 11A-C illustrate some examples of wavefront aberration analysis results in some embodiments. More specifically, these figures show the wavefront error (1.0 wave full scale) for the fiber tip on axis (FIG. 11A), 0.2 mm off axis (FIG. 11B), and 0.4 mm off axis (FIG. 11C). Chromatic aberration may be corrected as seen by the curves lying close to each other in FIGS. 11A-C.

In some embodiments, the one or more dominant aberrations include field curvature, astigmatism, etc. Field curvature may be caused by the fiber scanner tip following a curved arc. Both astigmatism and field curvature may receive correction from the triplet's negative center element in some embodiments. In some of these embodiments, the degree or extent of correction may be insufficient to move the design into a diffraction limited state (e.g., approximately 0.25 wave of aberration). In these embodiments, further corrections or modifications to the initial thick lens design may be required or desired to move the design into a diffraction limited state.

An coherent image analysis may be performed by modeling Gaussian beam and by analyzing the Gaussian beam model to determine aberrations with on-axis and off-axis Gaussian spots. Some conventional approaches model a hard edge cone of light emitted from a point source, as would accurately describe a traditional camera lens. The fiber scanner emits, however, a Gaussian beam, which comprises long tails that are not accurately modeled in these conventional approaches. Some embodiments adopt a coherent imaging feature that reasonably accurately models Gaussian beams passing through a system with moderate levels of aberration.

Figure 12:
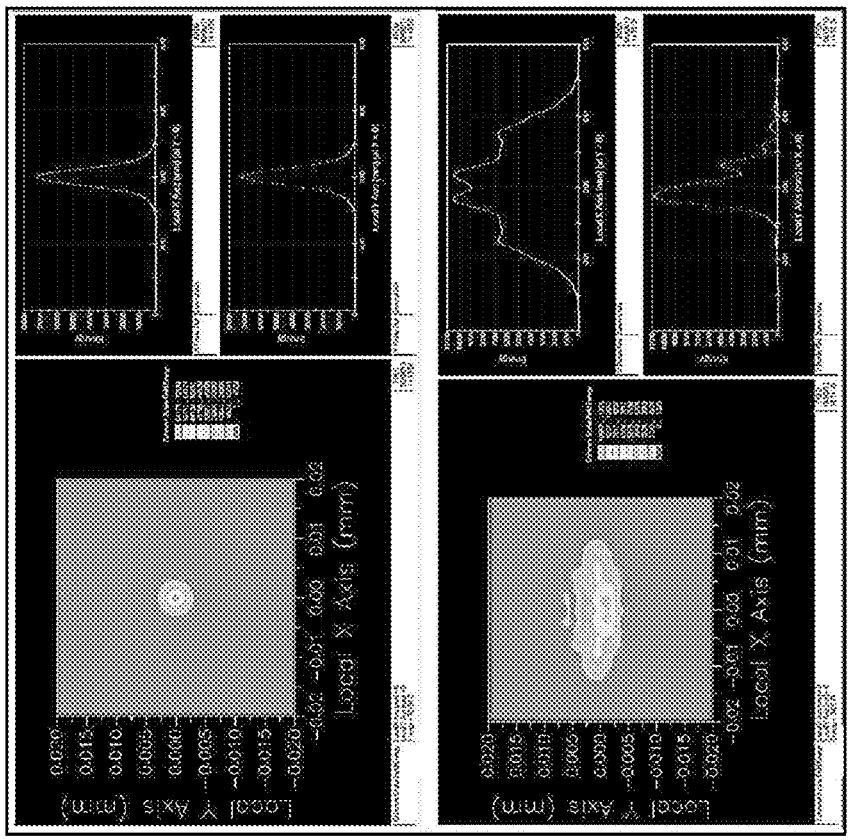
FIG. 12 illustrates some examples of coherent image analysis results in some embodiments.

FIG. 12 illustrates some examples of coherent image analysis results in some embodiments. More specifically, FIG. 12 shows a plot displaying the irradiance profiles at the image plane for the on axis scanner position (top) and the 0.4 mm off axis scanner position (bottom). On the left of each plot in FIG. 12 is a false color contour map, and on the right are horizontal (top right) and vertical (bottom right) cross sections. The lateral plot dimensions are +/−20 µm. The on axis spot is round, Gaussian shaped, and reasonably compact. It would produce a line-on/line-off Michelson contrast of over 0.9 for a 3.66 µm pixel size (e.g., the 5 MPx target). The off axis spot is elliptical due to astigmatism and may produce poor contrast in the horizontal direction and possibly fair contrast in the vertical direction. The value of the coherent image analysis is that the coherent image analysis informs the choice of wavefront aberration limits to use in one or more other analyses. In the example provided in FIG. 12, the design exhibits one wave of astigmatism, which is clearly undesirable.

The on-axis and the off-axis performance of the initial thick lens design may be improved by improving individual optical elements and spacing. For example, an air-gapped triplet, rather than cemented triplet, may be selected in place of the cemented triplet in some embodiments. As another example, the poor off-axis performance of the initial thick lens design, with the constraints of a cemented triplet, led to a refinement of the initial thick lens design by utilizing an air-gapped triplet rather than the cemented element. The air-gapped triplet, while more difficult to assemble, allows optimization of individual optical elements (e.g., scanning fibers) and their spacing.

A fiber sweep radius and a fiber deflection may be determined based in part or in whole upon one or more design for manufacturing (DFM) factors. In some embodiments, the refined thick lens design may be optimized around a 1.935 mm fiber sweep radius and 0.4 mm fiber deflection, similar to an existing 11.5 kHz scanner. The performance of the refined nominal thick lens design is improved compared to the initial thick lens design (e.g., the initial thick lens design having the cemented triplet design), and this refined nominal thick lens design incorporates one or more design-for-manufacturing (DFM) factors including, for example, sufficient lens diameter to ensure that the Gaussian beam is clipped at approximately the 2% irradiance level (worst case) to avoid beam scatter off of lens edges and corner chips.

Figure 13:
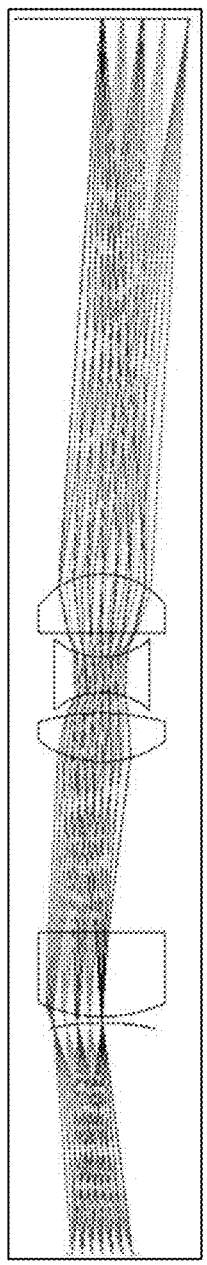
FIG. 13 illustrates a schematic representation of an improved thick lens design in some embodiments.

The lens tolerances used may also be extracted and/or verified. The generated optical schematic is shown in FIG. 13, which illustrates a schematic representation of an improved thick lens design in some embodiments. Some examples of the prescription data for the refined thick lens design are provided in TABLE 5 illustrated in FIG. 13A. The refined thick lens design may be evaluated using two different fiber mode field diameters (MFD): 4.36 µm, and 3.3 µm. The former (4.36 µm) corresponds to the fiber used in the existing 11.5 kHz FSD (e.g., Stocker Yale, 0.077 NA), and the latter (3.3 µm) corresponds to another FSD (e.g., Nufern PM460-HP fiber with 0.106 NA), which theoretically may result in greater Michelson contrast at the image.

Figure 14:
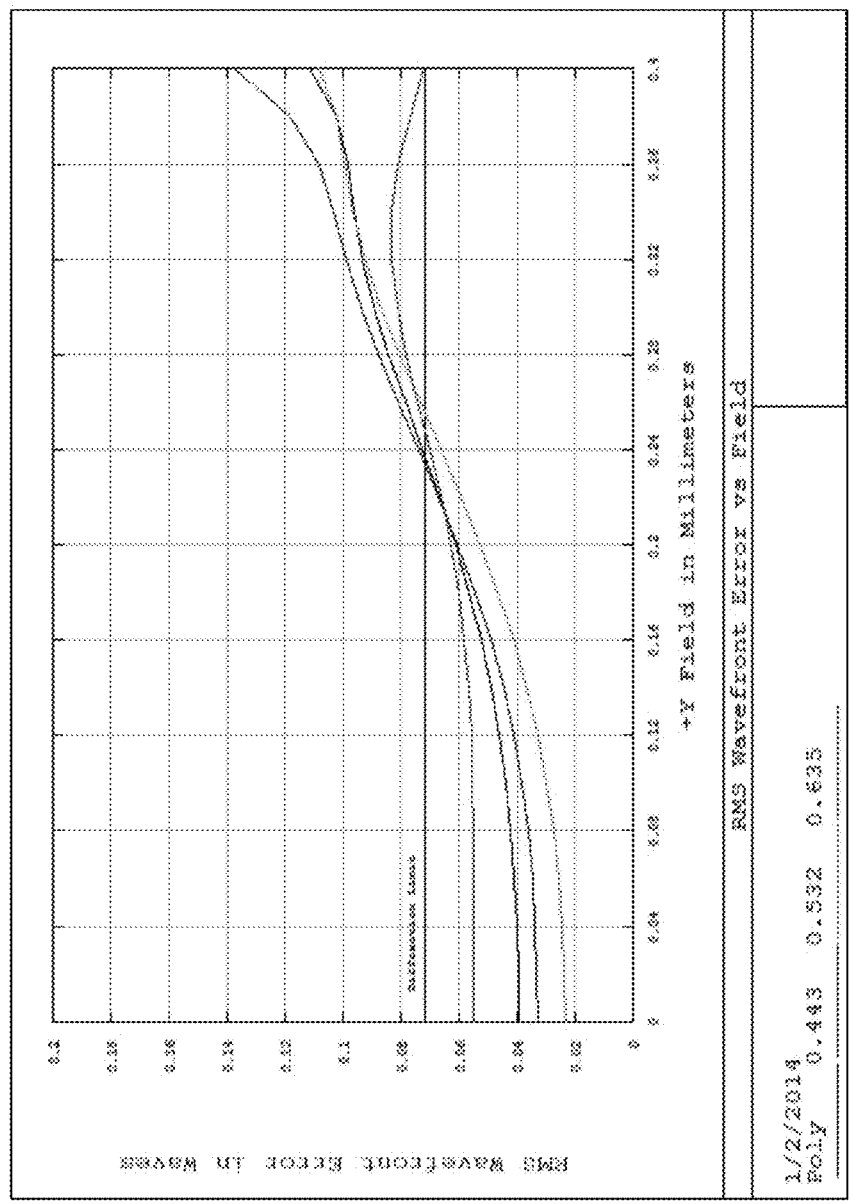
FIG. 14 illustrates a plot of wavefront error in some embodiments.

The design may also be optimized and toleranced for an image-side NA of 0.13. This numerical aperture value of 0.13 results in smaller Gaussian beam diameter size at the image plane when evaluated using the 3.3 µm and 4.36 µm mode field diameters. FIG. 14 illustrates a plot of wavefront error in some embodiments. More specifically, FIG. 14 shows the wavefront error versus field at a setting of 0.13 NA at the image plane.

Figure 15:
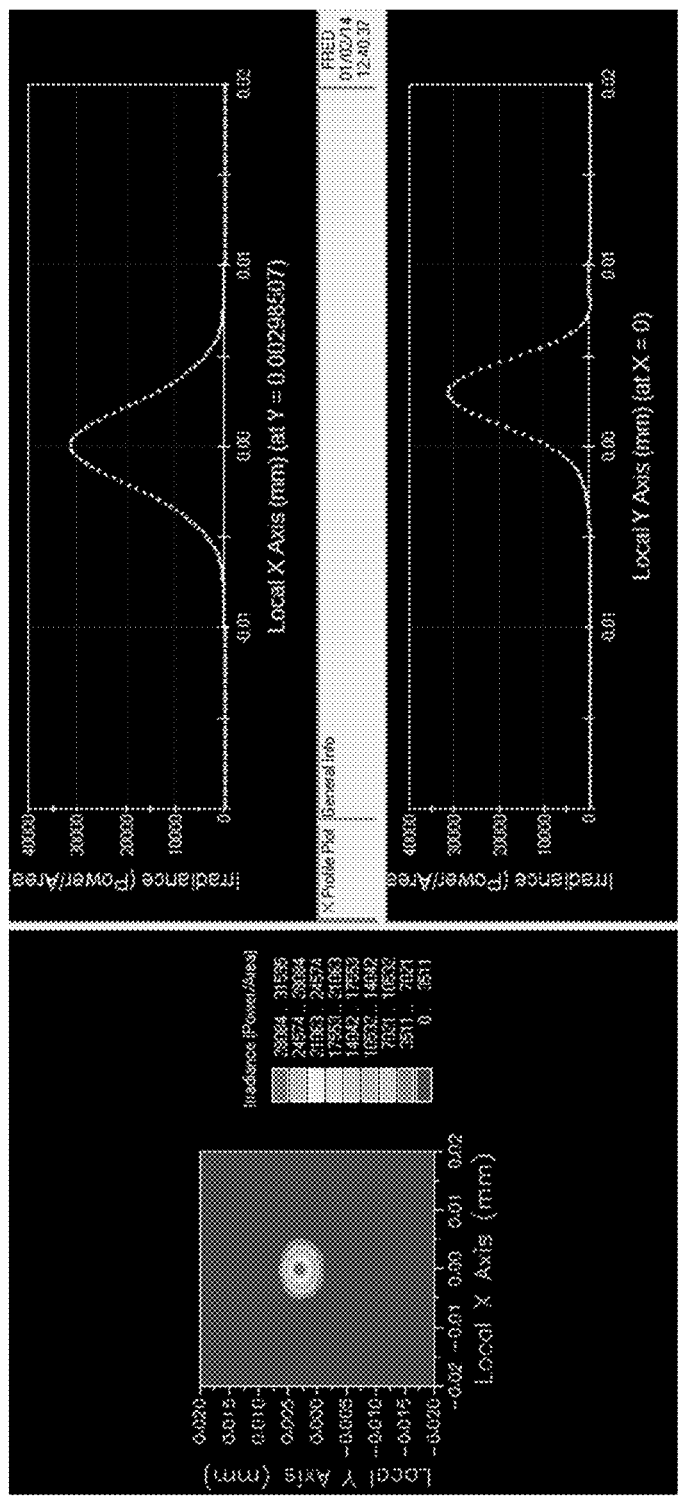
FIG. 15 illustrates an example of the off-axis performance of a fiber scanner in some embodiments.
Figure 16:
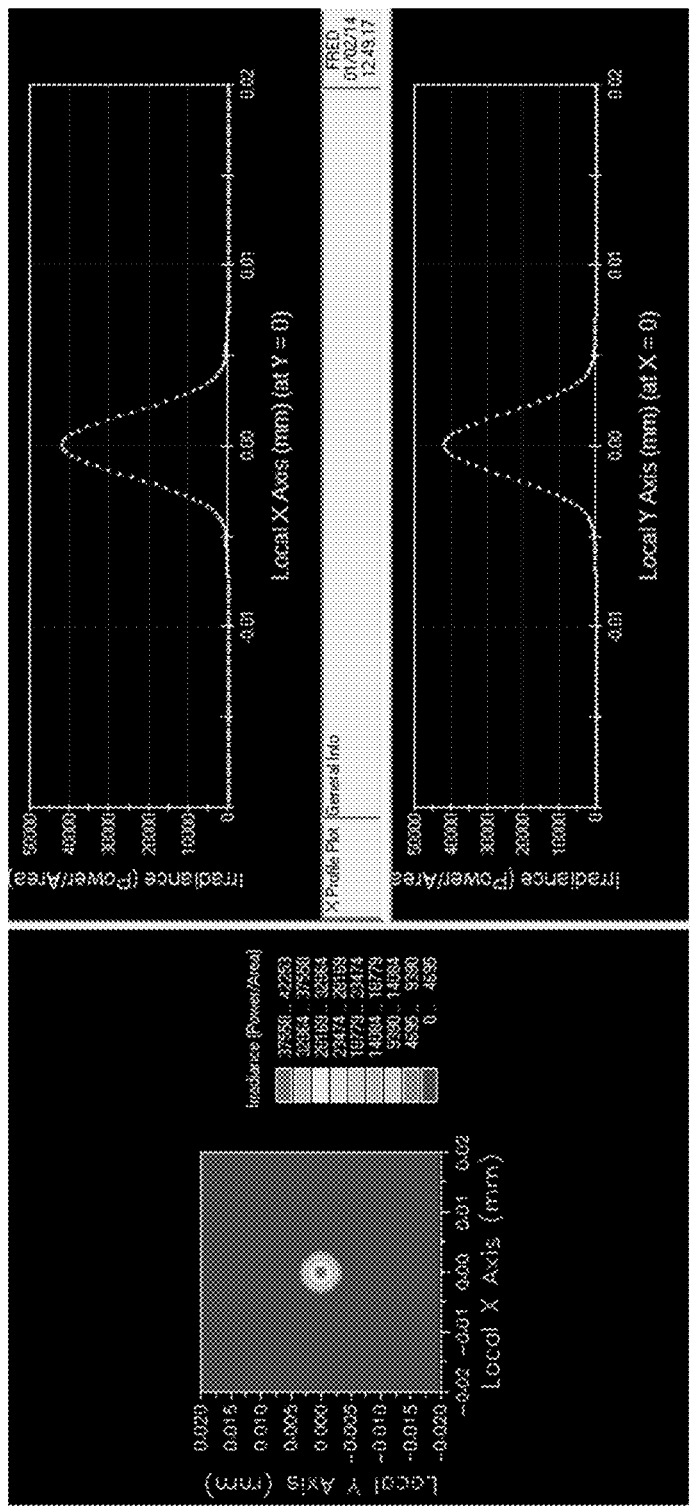
FIG. 16 illustrates an example of the on-axis performance of a fiber scanner in some embodiments.
Figure 17:
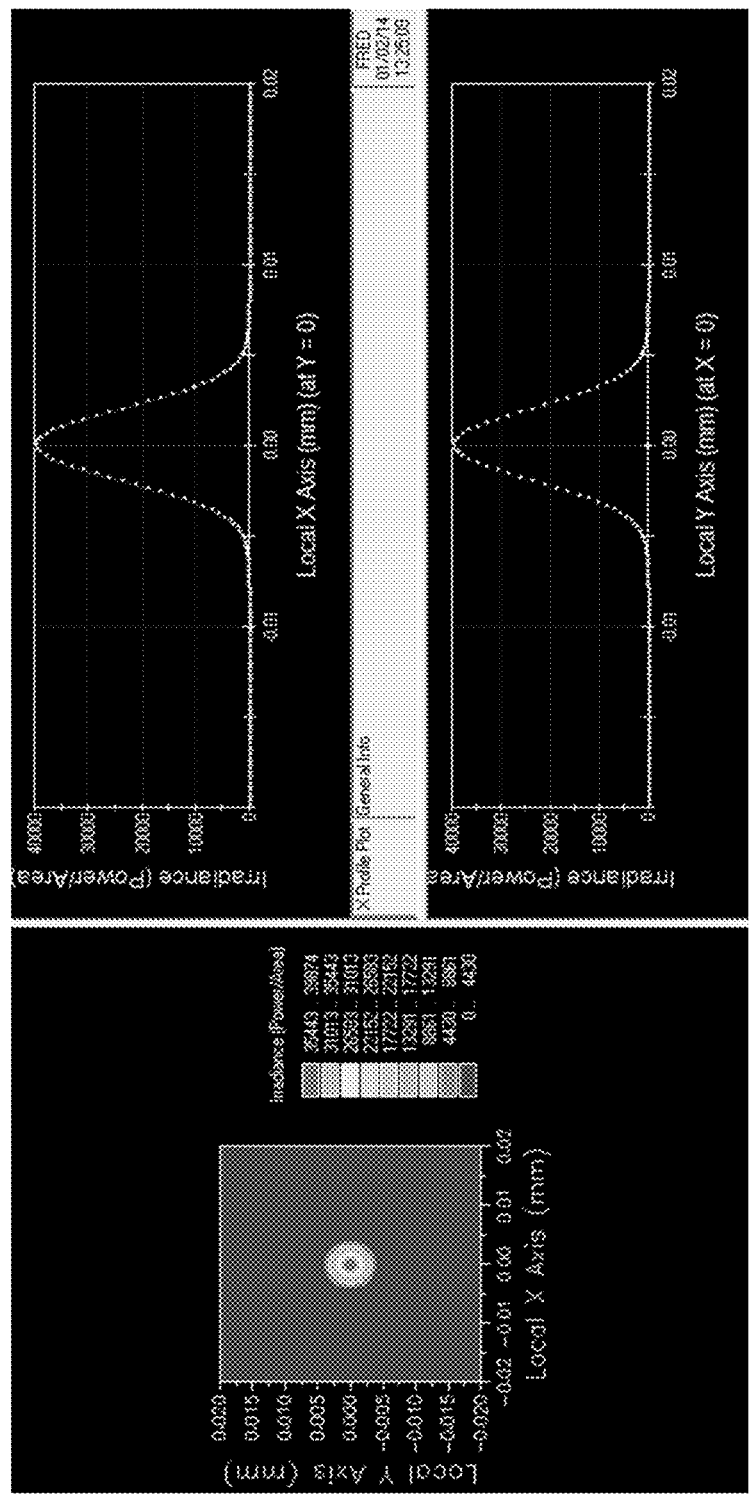
FIG. 17 illustrates an example of the on-axis performance of a fiber scanner in some embodiments.
Figure 18:
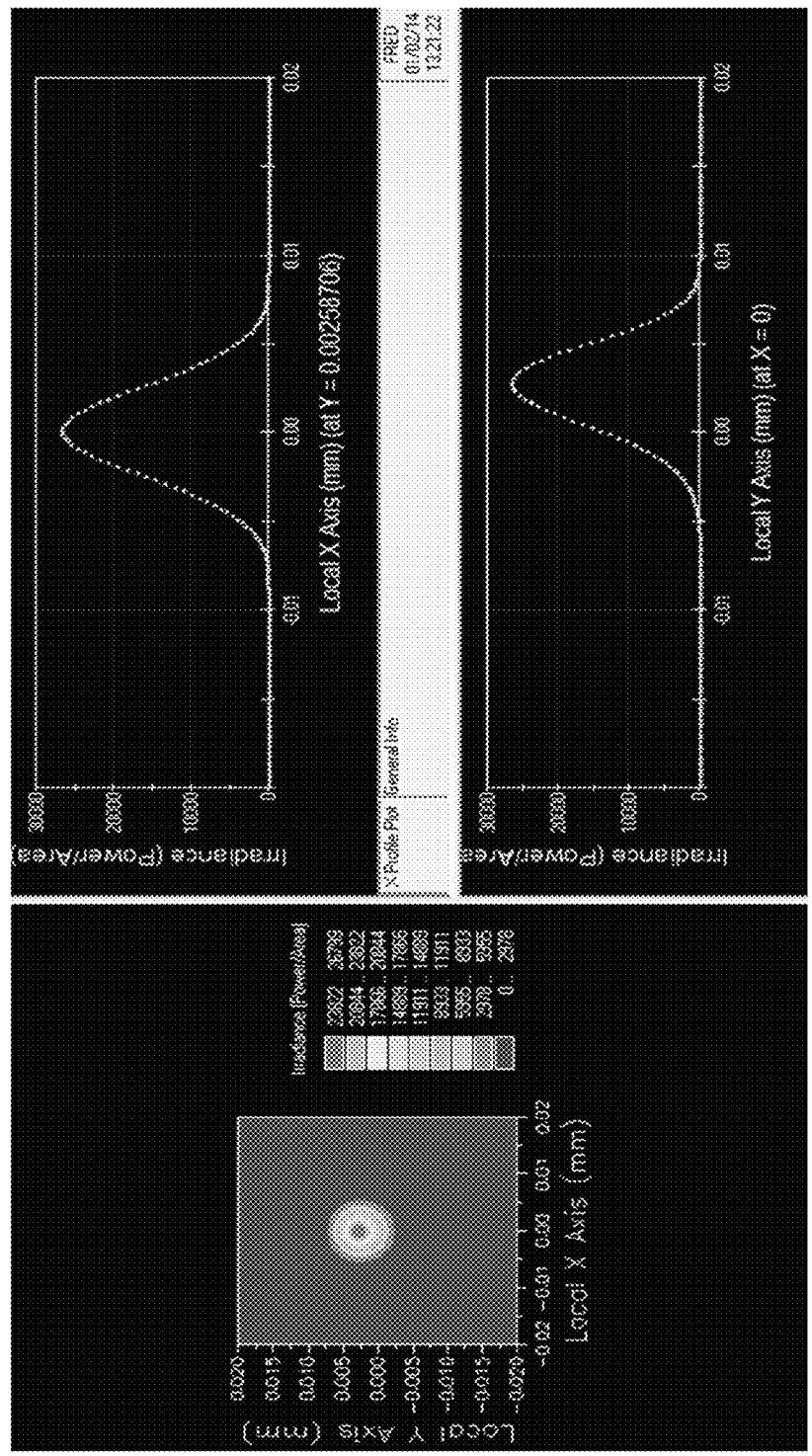
FIG. 18 illustrates an example of the off-axis performance of a fiber scanner in some embodiments.

In the aforementioned examples, the 3.3 µm MFD scanning fiber may exhibit a better on axis contrast as illustrated in FIG. 15, which illustrates an example of the off-axis performance of a fiber scanner in some embodiments, but has undesirable off-axis contrast. In FIG. 15, a negative value indicates the "off" pixel is brighter than the "on" pixel as also illustrated in FIG. 16, while the roles are reversed with the 4.36 µm MFD fiber as shown in FIGS. 17-18.

Figure 19:
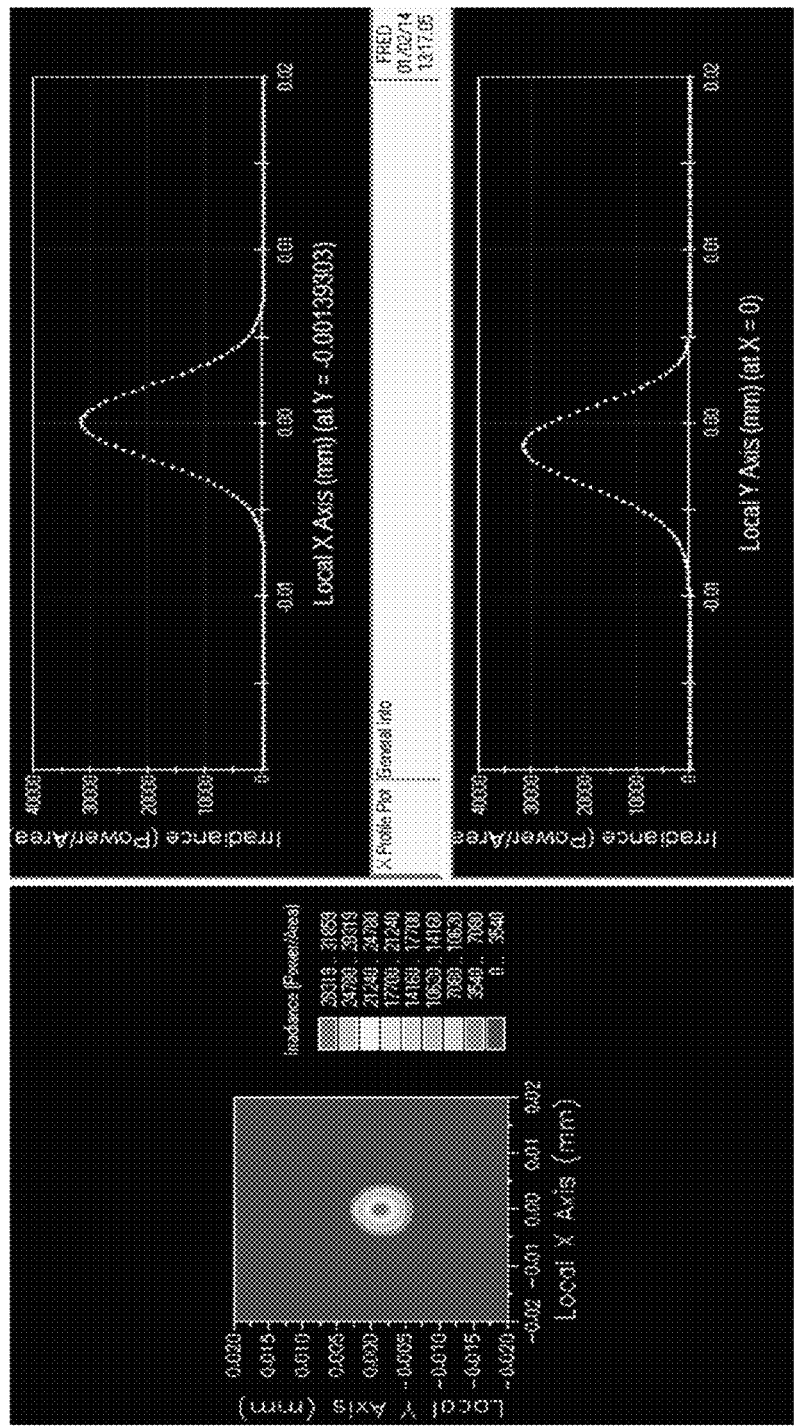
FIG. 19 illustrates an example of the off-axis performance of a fiber scanner in some embodiments.
Figure 20:
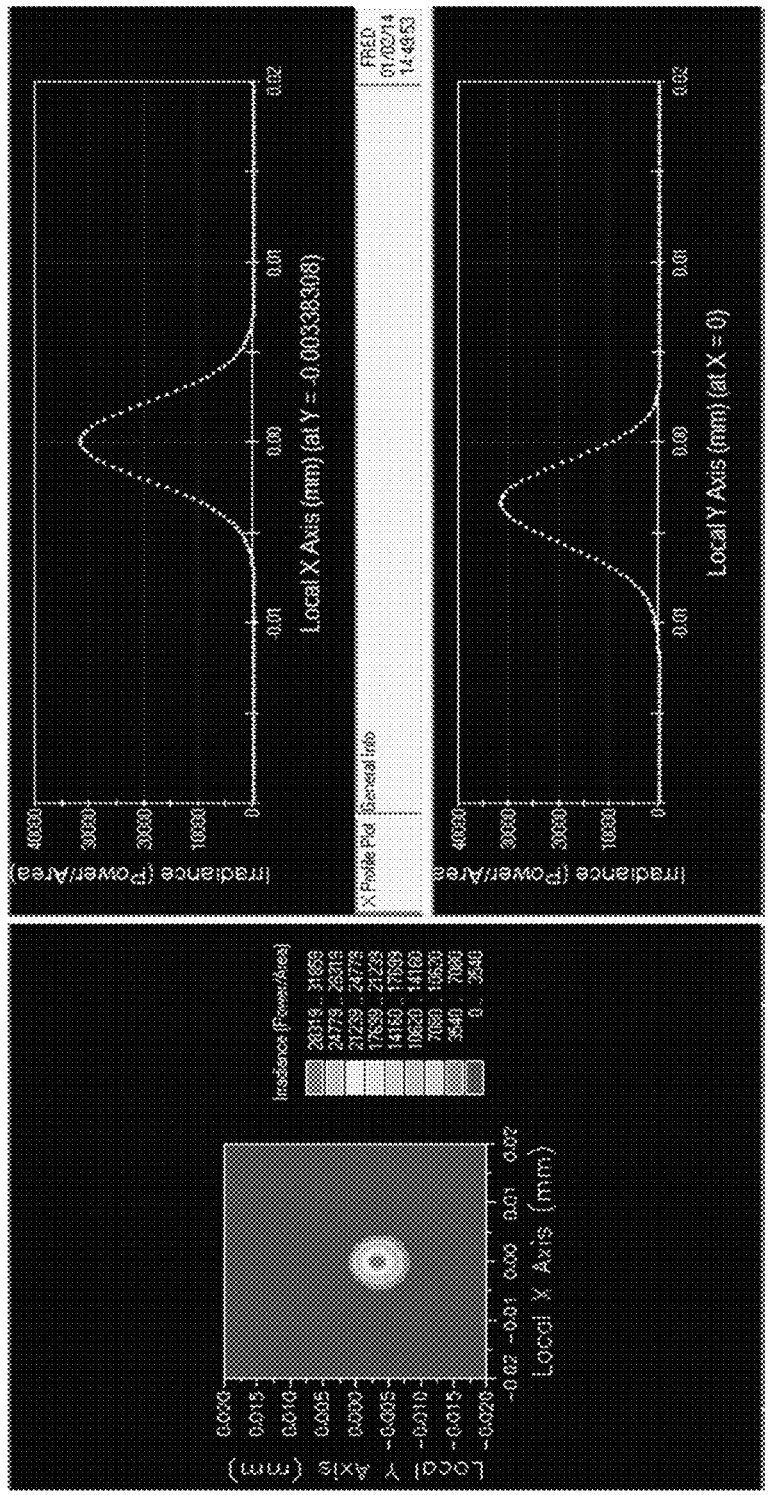
FIG. 20 illustrates an example of the off-axis performance of a fiber scanner in some embodiments.

The undesirable off-axis contrast may be caused by astigmatism induced field curvature. In some embodiments, evaluating both scanning fibers at an image position shifted 30 µm in the z-direction (e.g., the axial direction) may cause the contrast values to increase as illustrated in FIGS. 19-20. In these examples, the 3.3 µm MFD scanning fiber has demonstrated the most improvement in contrast. In some embodiments where the field curvature may be corrected, the 3.3 µm MFD scanning fiber may produce a higher contrast image than the 4.36 µm MFD scanning fiber as shown in these examples. The contrast performance for the example of nominal design is summarized in TABLE 6 illustrated in FIG. 13B in some embodiments.

The first thick lens design or even the refined thick lens design may be further improved by performing one or more tolerance analyses in some embodiments. In order to determine how well a thick lens design will perform as intended, it may be desirable to evaluate potential variations in optical performance that may be affected by real-world manufacturing tolerances on the optical elements.

Various types of analyses such as Monte Carlo simulations, sensitivity analyses, inverse sensitivity analyses, etc. may be performed. The Monte Carlo simulation randomly perturbs all of the given tolerances at once, yielding a variety of lens systems that could be encountered in real-world assembly of the optics. The sensitivity analysis, on the other hand, perturbs each tolerance individually, and determines the 'worst offenders' in terms of deviation from a nominal performance metric. The inverse sensitivity analysis allows us to determine what kind of tolerances would be required to match a particular performance metric.

Monte Carlo simulations may be performed on a nominal thick lens design by perturbing the identified one or more tolerances of interest at once to generate multiple thick lens design variants. A nominal thick lens design (e.g., a nominal design of the refined or the initial thick lens design) may be analyzed using tolerances. For the purpose of explanation and illustration, the analysis includes a Monte Carlo simulation of 20 lenses, and the design at the 80% level (80% of the lenses should exhibit identical or better performances) is analyzed for Michelson contrast using two MFD scanning fibers.

The multiple thick lens design variants may be analyzed to determine their respective on-axis and/or off-axis contrast performance. In the aforementioned two examples, the off-axis performance is undesirable, but the on-axis contrast is very good at 0.56 for the 4.36 μm MFD scanning fiber and 0.78 for the 3.3 μm MFD scanning fiber. This undesirable off-axis contrast performance may be caused by using loose tolerances in the nominal thick lens design. This undesirable off-axis contrast may further indicate that the field curvature may not yet be well corrected due to the loose tolerances to ensure adequate performance. In this example, tightening the real-world tolerances on the lenses or the thick lens design may improve the results of this analysis but may also result in higher manufacturing costs because of the lower yield of lenses within the tighter design tolerances. The respective tolerance values or respective ranges of tolerance values may be determined for these one or more tolerances of interest based in part or in whole upon one or more criteria including, for example, cost, manufacturability, performance requirements, etc.

Figure 21:
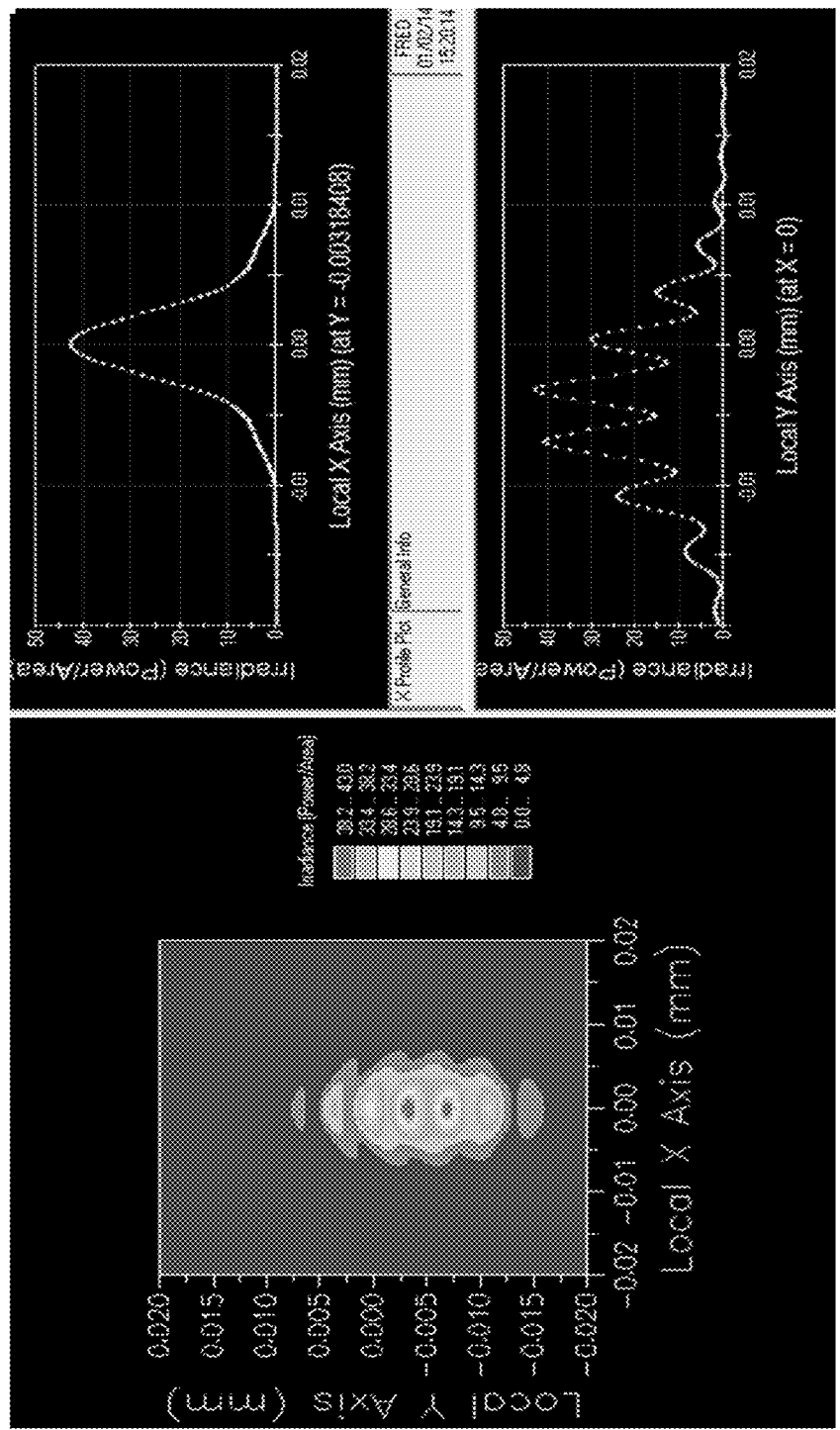
FIG. 21 illustrates an example of the off-axis performance of a fiber scanner in some embodiments.
Figure 22:
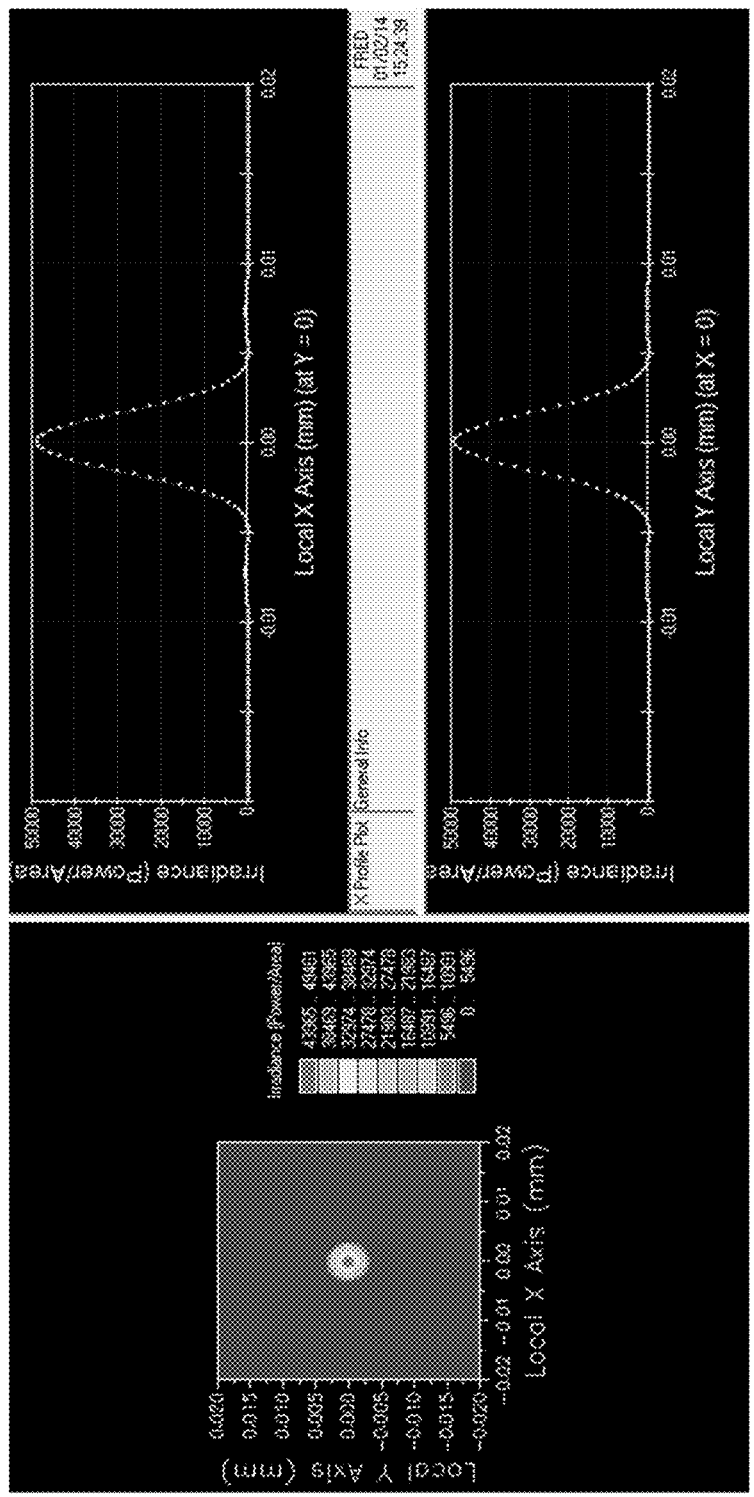
FIG. 22 illustrates an example of the on-axis performance of a fiber scanner in some embodiments.

The on- and off-axis performance using these lens tolerances are shown in FIGS. 21-24 and is summarized in TABLE 7 illustrated in FIG. 20A. More specifically, TABLE 7 illustrates a summary of an example of the Monte Carlo analysis with no compensators. FIG. 21 illustrates an example of the off-axis performance of a fiber scanner in some embodiments. More specifically, FIG. 21 illustrates off-axis performance of a multi-fiber display with 3.3 μm scanning fibers using lens tolerances, while the Gaussian spot radius and MC (Michelson Contrast) are not evaluated. FIG. 22 illustrates an example of the on-axis performance of a fiber scanner in some embodiments.

Figure 23:
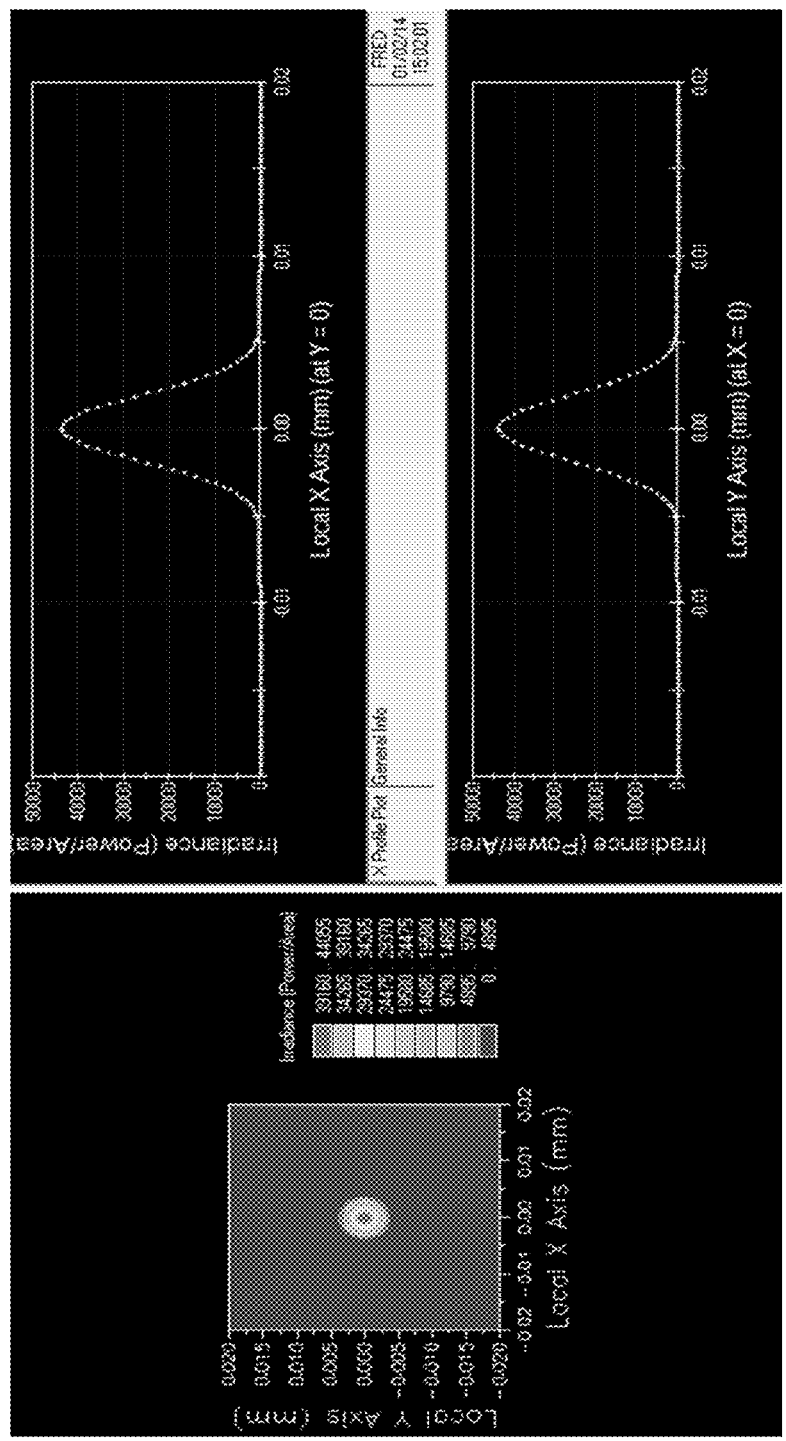
FIG. 23 illustrates an example of the on-axis performance of a fiber scanner in some embodiments.
Figure 24:
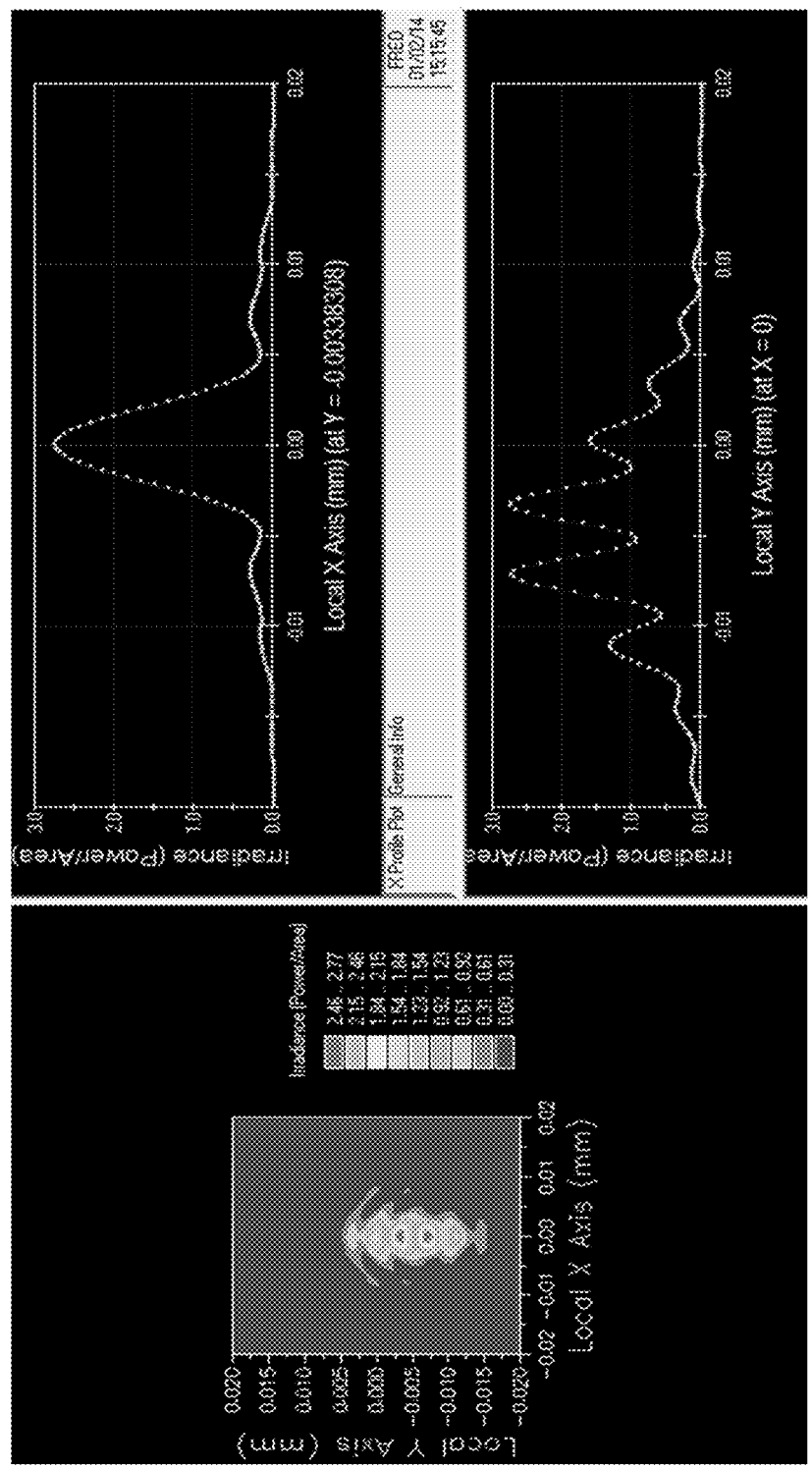
FIG. 24 illustrates an example of the off-axis performance of a fiber scanner in some embodiments.

More specifically, FIG. 22 illustrates on-axis performance of a multi-fiber display with 3.3 μm scanning fibers using lens tolerances, the Gaussian spot radius of 3.1×3.1 μm (H×V), and MC of 0.78×0.78. FIG. 23 illustrates an example of the on-axis performance of a fiber scanner in some embodiments. More specifically, FIG. 23 illustrates on-axis performance of a multi-fiber display with 3.3 μm scanning fibers using lens tolerances, the Gaussian spot radius of 3.7×3.7 μm (H×V), and MC of 0.56×0.56. FIG. 24 illustrates an example of the off-axis performance of a fiber scanner in some embodiments. More specifically, FIG. 24 illustrates off-axis performance of a multi-fiber display with 4.36 μm scanning fibers using lens tolerances, while the Gaussian spot radius and MC are not evaluated.

Figure 25:
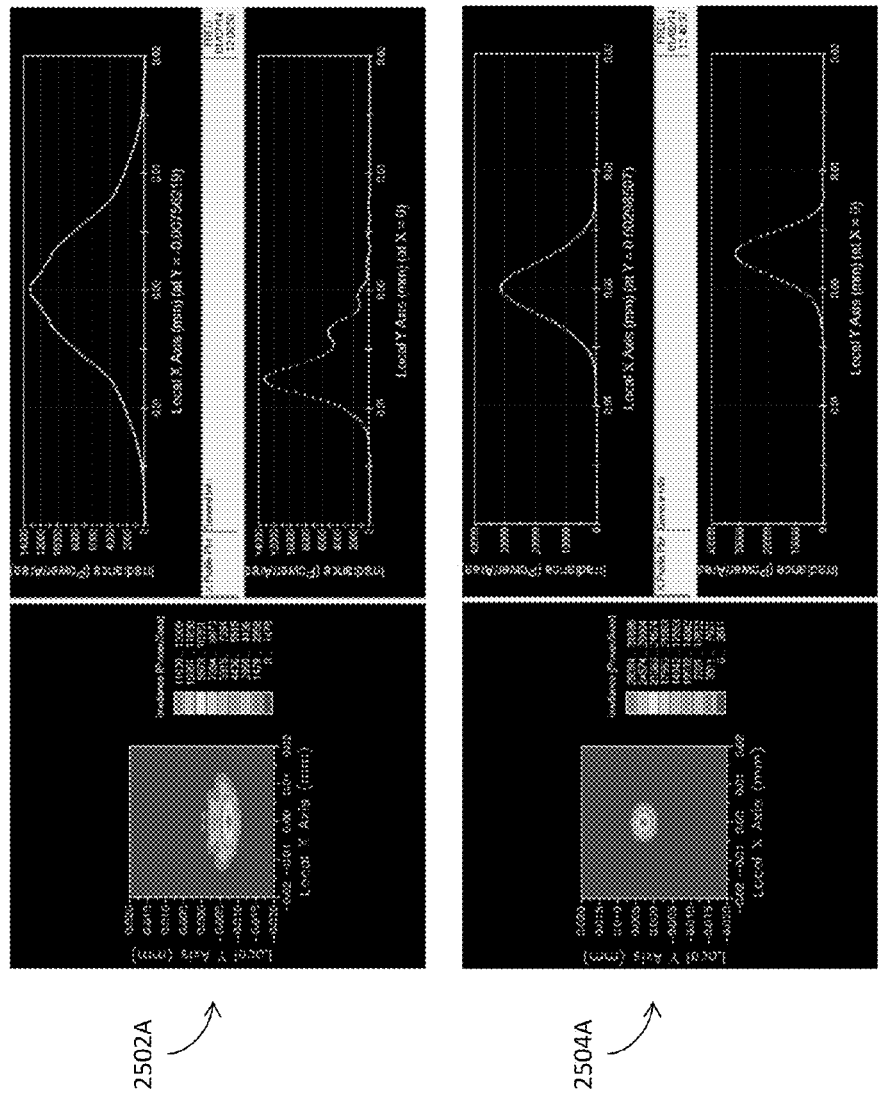
FIG. 25 illustrates a comparison of the off-axis spot between the thick lens design illustrated in FIG. 10 and the thick lens design illustrated in FIG. 13 in some embodiments.

With these techniques, the nominal off-axis spot, while not ideal, has also been greatly reduced in extent between the initial thick lens design and this refined thick lens design as shown in FIG. 25, which illustrates a comparison of the off-axis spot between the thick lens design illustrated in FIG. 10 and the thick lens design illustrated in FIG. 13 in some embodiments. More specifically, FIG. 25 illustrates the comparison of off-axis spot from the initial thick lens design (2502A) to off-axis spot in the refined thick lens design (2504A), both using 3.3 μm multi-fiber displays (MFD).

A sensitivity analysis may be performed to identify the worst offender causing the most performance degradation. The sensitivity analysis includes the worst offender analysis that seeks to identify the tolerances that cause the most degradation when perturbed individually. The results of these one or more sensitivity analyses may thus be used to narrow down the scope of the tolerance control as well as the level of precision for the assembly process. One or more tolerances of interest may be identified. Some examples of tolerances of interest used for these one or more sensitivity analyses are shown in TABLE 8 illustrated in FIG. 26A. For example, the one or more tolerances of interest may include one or more of the edge thickness tolerance, the air space thickness tolerance, the center thickness tolerance for concave elements, the center thickness tolerance for convex elements, the fringes surface power tolerance, and the fringes surface irregularity tolerance in some embodiments. The one or more tolerances of interest may be perturbed individually to generate one or more perturbed designs.

The maximum error difference between a nominal design and a perturbed design may be determined by determining the respective errors of the one or more perturbed designs with evaluating a merit function at one or more field positions. A merit function may be used to return, for example, the maximum wavefront error difference between the nominal design and the perturbed design in some embodiments. In some embodiments, the merit function is evaluated at five (5) field positions: 0.0, 0.1, 0.2, 0.3, and 0.4 mm (in the fiber deflection).

Figure 26:
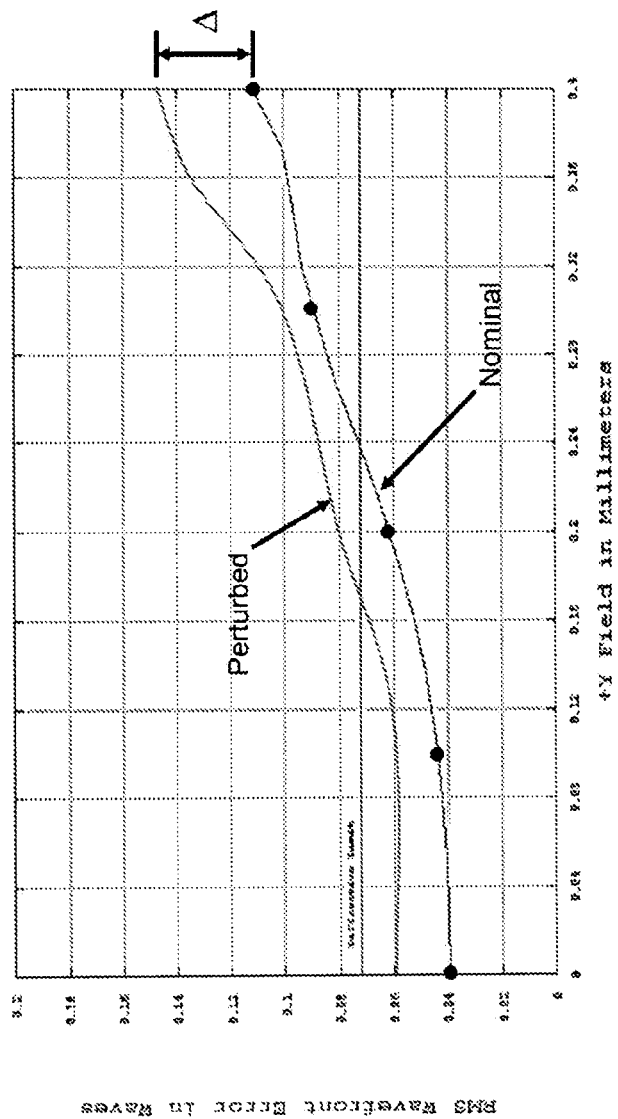
FIG. 26 illustrates a plot of the nominal wavefront error and the perturbed wavefront error in some embodiments.

The worst offender from the respective errors may be selected and compensated for with one or more compensators including, for example, a thickness compensator, a focus distance compensator, etc. For example, FIG. 26 illustrates a plot of the nominal wavefront error and the perturbed wavefront error in some embodiments. More specifically, FIG. 26 shows the nominal wavefront error difference between the nominal design and a perturbed design in this example. Suppose the perturbed system has wavefront errors of 0.06 waves at 0.0 mm, 0.06 waves at 0.1 mm, 0.08 waves at 0.2 mm, 0.10 waves at 0.3 mm, and 0.15 waves at 0.4 mm. This results in differences of 0.02, 0.01, 0.02, 0.01, and 0.04 waves respectively. The maximum value of 0.04 waves may be returned as the worst offender.

In this example, the sensitivity analysis changes each tolerance individually using the values listed in TABLE 8. After the perturbation, the optimizer may apply a compensator (e.g., applying a focus compensator which changes the focus distance) to improve the merit function. TABLE 9, which is included in FIG. 26B and illustrates some examples of the worst offender deviations from a nominal design using only a focus compensator in some embodiments, lists the ten worst tolerance offenders. These listed worst offenders cause large performance degradations (e.g., an increase of 0.05 waves puts the perturbed system well outside the diffraction limited range) in the example of the nominal thick lens design. The listed worst offenders include a decenter tolerance (TIRY in TABLE 9) for the second surface of the negative element.

Also, most of the listed worst offenders constitute surface thickness tolerances (TTHI in TABLE 9).

The one or more sensitivity analyses may be performed with the one or more compensators to determine whether the merit function evaluation results have improved. For example, a compensator may be applied to the initial or refined thick lens design, and the merit function may be re-evaluated to determine whether the maximum error difference between a nominal design and a perturbed design is reduced. Because thickness tolerances are determined to be the worst offenders in the aforementioned examples, a thickness compensator may be added between the negative lens element and the final lens element in some embodiments, and one or more sensitivity analyses may be rerun. TABLE 10 is included in FIG. 26C and illustrates some examples of the worst offender deviations from a nominal design using both a focus compensator and a thickness compensator in some embodiments. More specifically, TABLE 10 shows a significant improvement in the results. The single thickness compensator canceled several of the earlier worst offenders.

Monte Carlo simulations may be performed with one or more compensators. In some embodiments where the one or more sensitivity analyses have been performed to determine the worst offenders and hence one or more compensators, these one or more compensators may be applied to the nominal design, and one or more Monte Carlo simulations may be performed. One or more tolerance values may be randomly identified within their respective allowed ranges. The thick lens design (e.g., the initial or the refined thick lens design) may be implemented with one or more compensators determined from the one or more sensitivity analyses.

The one or more identified tolerance values may be perturbed at once to generate a perturbed design, and Monte Carlo simulations may be performed on the perturbed design. The thick lens design may be iteratively improved by evaluating the merit function at one or more field positions to generate the maximum error difference between the nominal design and the perturbed design. With the identified compensation method, a Monte Carlo simulation may be run using the focus and/or thickness compensators.

This analysis randomly picks tolerance values within the range allowed, optimizes the design using the compensators, and then evaluates the merit function. TABLE 11 is included in FIG. 26D and illustrates some examples of the distribution of Monte Carlo simulations that exceeds a certain deviation value in some embodiments. In these embodiments, only approximately 10% of the runs produce better than 0.066 waves increase, and these results place this example of thick lens design outside the nearly diffraction limited level to achieve reasonable Michelson contrasts.

One or more inverse sensitivity analyses may be performed. A limit on the wavefront error may be identified. One or more tolerances for the wavefront error to stay within the identified limit may be determined by performing one or more analyses on the thick lens design (e.g., the initial or the refined thick lens design). In some embodiments, the one or more tolerances may include, for example, the lens power, the irregularity, the fabrication and/or assembly tolerances (e.g., edge thickness difference tolerance, positional tolerances, thickness tolerance, etc.), or any other tolerances that may cause degradation in the performance of the scanning fibers, the multi-fiber display, or the tiled array of FSDs.

One or more design characteristics whose tolerances may be tightened or loosened may be identified based in part or in whole upon the tolerances determined. One or more control mechanisms or corrections may be applied to the one or more design characteristics based in part or in whole upon the tolerances determined. The one or more control mechanisms or corrections may include, for example, a position control on the assembly process with optical feedback, a longitudinal position control on the assembly process with optical feedback, etc.

Assembly tolerances may require or desire precise automated optical positioning and alignment processes in some embodiments to ensure that the 'as built' performance exhibits good Michelson contrast of 0.5 or better in some embodiments. In some of these embodiments, the thick lens design may be devised to increase the size and resolution of individual FSDs and decrease the total number of FSDs in the array by utilizing a modified optical fiber, which will be described with reference to the section below for optical designs and analyses for high frequency tiled array FSDs.

An inverse sensitivity analysis fixes the wavefront error increase to a specified limit, and then determines how tight the tolerances actually need to be to stay within the specified wavefront error limit. The inverse sensitivity analysis may be performed with a limit value of, for example, 0.01 waves, which may be determined based on heuristics, design of experiments, etc. The results indicate that tolerances for lens power and irregularity may be acceptable at the originally prescribed levels, and most edge thickness difference tolerances are acceptable at the original level of 7 µm, but several other tolerances may need to be held tighter.

The negative element needs to be held to, for example, 1 µm positional tolerance in this example of thick lens design. This positional tolerance recommends lens centering control on the assembly process using, for example, optical feedback. The thickness tolerances may be held to levels as small as 6 µm, which indicates that longitudinal position control on the assembly process using, for example, optical feedback may be desired. Monte Carlo simulations may be performed with the tolerances determined from the one or more inverse sensitivity analyses in some embodiments. The tolerances may be determined from the one or more inverse sensitivity analyses and applied to the thick lens design. Monte Carlo simulations may then be performed with the one or more tolerances determined from the one or more inverse sensitivity analyses to obtain a desired Michelson contrast Assuming the tightened tolerance levels calculated by the one or more inverse sensitivity analyses, a Monte Carlo simulation may be run. TABLE 12 is included in FIG. 26E and illustrates some examples of the distribution of Monte Carlo simulations that exceeds a certain deviation value with tolerances determined from inverse sensitivity analyses in some embodiments. More specifically, TABLE 12 shows that 10% of the runs are nearly unchanged from the nominal thick lens design, while 90% show a change of 0.027 waves or less. These results are more in line with keeping the "as built" performance in the nearly diffraction limited range needed for reasonable Michelson contrast.

A higher scan frequency generally equates to more lines of resolution per FSD at a given frame rate and may thus reduce the total number of FSDs required to fill a 12-mm image space. Some embodiments described herein use a 45 kHz scan frequency at a refresh rate of 72 Hz to produce 8MPx resolution with 2.96 µm pixel pitch in a 12-mm diagonal format using only ten FSDs. In these embodiments, one or more metrics of a tiled array of FSDs may be improved by determining a scan frequency. The one or more metrics of a tiled array may include, for example, resolution, the total number of FSDs in the tiled array, manufacturability of the fiber scanners and/or the tiled array, the cost of the tiled array of FSDs, any combinations thereof, or any other suitable metrics of a tiled array FSDs or components thereof.

Figure 27:
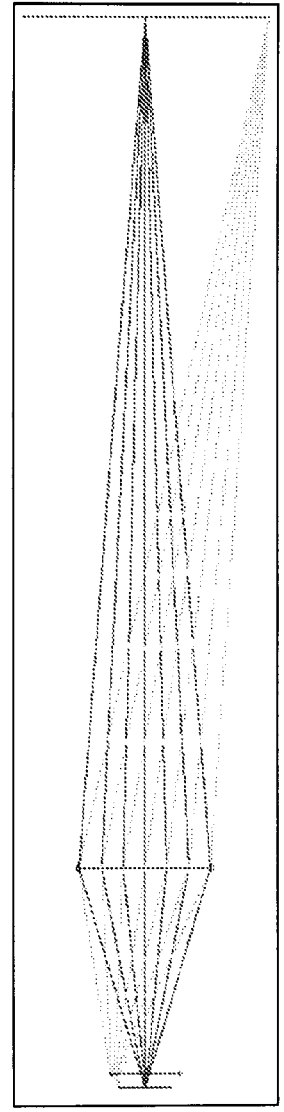
FIG. 27 illustrates a schematic representation of a paraxial design for a fiber scanner in some embodiments.

An initial design and one or more design parameters may be identified. The initial design may comprise a paraxial design or a thin-lens approximation design. An initial paraxial design using the thin-lens approximation approach is illustrated in FIG. 27, which illustrates a schematic representation of a paraxial design for a 45 kHz fiber scanner in some embodiments. TABLE 13 is included in FIG. 27A and illustrates some examples of design parameters in some embodiments. The initial design may also comprise a thick lens design in some embodiments.

Figure 28:
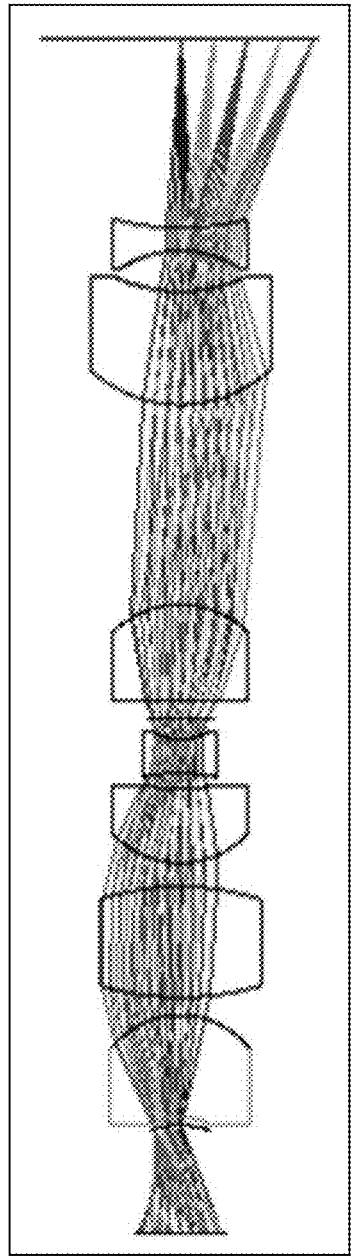
FIG. 28 illustrates a schematic representation of another thick lens design in some embodiments.

An example of a thick lens design refined from a 45 kHz paraxial design is illustrated in FIG. 28, which illustrates a schematic representation of another thick lens design in some embodiments. Some of these embodiments use lensed optical fiber scanners, which may be obtained by micro-polishing the tip of an optical fiber scanner as small as less than 1 µm. A thick lens design may be determined from the initial design and the one or more design parameters using lensed optical fibers and one or more prescribed characteristics. In some embodiments where lensed optical fibers are used in the tiled array, the one or more prescribed characteristics may include the mode field diameters (MFDs). In these embodiments, lensed optical fibers having mode field diameters that are smaller than a prescribed diameter may be used for the thick lens design.

A preliminary contrast analysis may be performed. The thick lens design may be analyzed to determine the contrast performance. The Gaussian beam diameter at an image plane may be determined. One or more characteristics for improvement may be identified. These one or more characteristics or metrics may include, for example, on-axis contrast performance, off-axis contrast performance, etc. in some embodiments. The Gaussian beam diameter may be reduced to or below a prescribed level by improving the one or more characteristics in some embodiments. The mode field diameter, the image field diameter, and/or the magnification may also be determined in some of these embodiments based in part or in whole upon, for example, one or more of the total number of lensed fiber scanners, the resolution of a lensed fiber scanner, the total resolution, the cost of a fiber scanner or the cost of the tiled array of FSDs, the manufacturability of the fiber scanner or the tiled array of FSDs, or any other suitable criteria.

Figure 29:
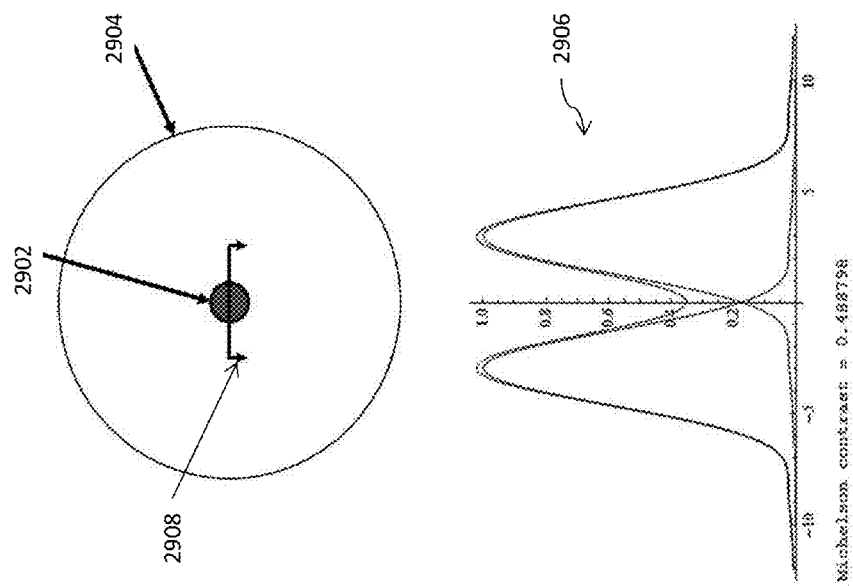
FIG. 29 illustrates an example of analysis results for the on-axis Michelson contrast with a high scan frequency deign in some embodiments.

For example, the thick lens design is analyzed to determine its Michelson contrast performance in some embodiments. With the thick lens design illustrated in FIG. 28 illustrating a schematic representation of another thick lens design in some embodiments, the preliminary analyses of the Michelson contrast for the high scan frequency design indicate good on-axis contrast at 0.49 as illustrated in FIG. 29, which illustrates an example of analysis results for the on-axis Michelson contrast with a high scan frequency deign in some embodiments. FIG. 29 illustrates the line-on/line-off condition with 2.96 µm pixel pitch in a large-tube design with an on-axis Michelson Contrast of about 0.49.

Figure 30:
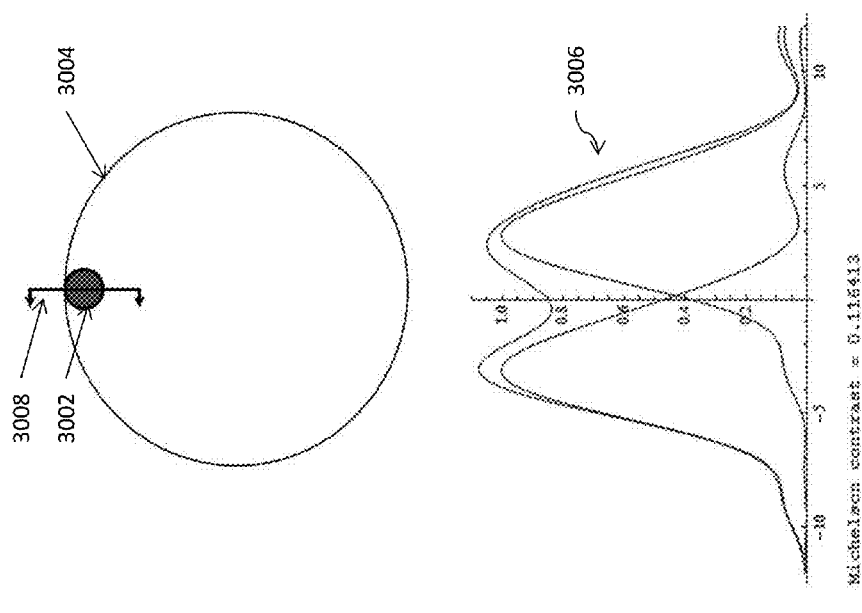
FIG. 30 illustrates an example of analysis results for the off-axis Michelson contrast in the vertical or radial direction with a high scan frequency deign in some embodiments.

In FIG. 29, (2902) indicates the Gaussian spot; (2904) indicates the image circle; and (2906) indicates the line plot for the on-axis, radially symmetric cross-section indicated by (2908). The maximum field off-axis contrast in the vertical (or radial) direction is lower at 0.12 as shown in FIG. 30, which illustrates an example of analysis results for the off-axis Michelson contrast in the vertical or radial direction with a high scan frequency deign in some embodiments. This lower maximum field off-axis contrast in the radial direction may be due to aberrations that may be further improved upon by subsequent design refinement. More specifically, FIG. 30 illustrates the line-on/line-off condition with 2.96 µm pixel pitch in a large-tube design with an off-axis vertical cross-section and the Michelson Contrast of 0.12. In FIG. 30, (3002) indicates the Gaussian spot; (3004) indicates the image circle; and (3006) indicates the line plot for the off-axis, vertical cross-section indicated by (3008).

Figure 31:
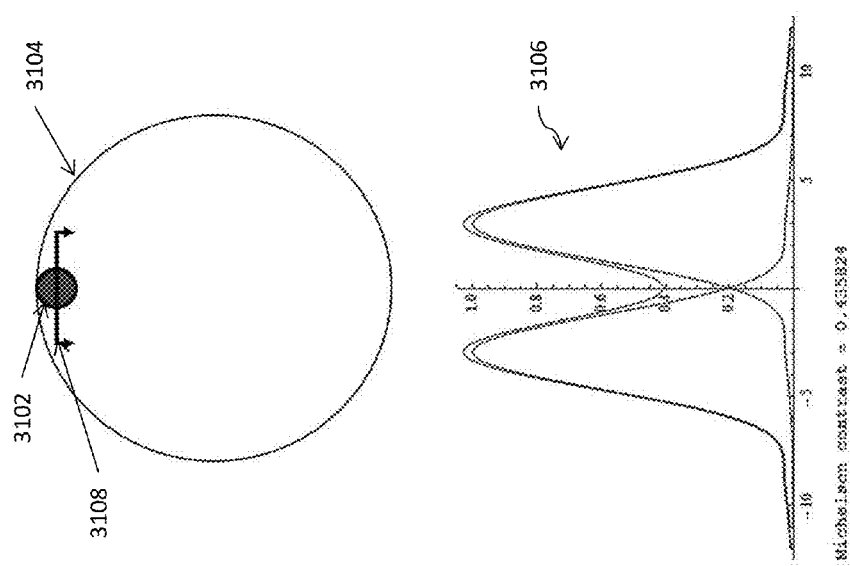
FIG. 31 illustrates an example of analysis results for the off-axis Michelson contrast in the horizontal or tangential direction with a high scan frequency deign in some embodiments.

The thick lens design also produces good maximum field, off-axis performance in the horizontal (or tangential) direction with a Michelson contrast of 0.44 that is very close to the on-axis performance as illustrated in FIG. 31. More specifically, FIG. 31 illustrates the line-on/line-off condition with 2.96 µm pixel pitch in a large-tube design with an off-axis horizontal cross-section line plot and the Michelson Contrast of 0.12. In FIG. 31, (3102) indicates the Gaussian spot; (3104) indicates the image circle; and (3106) indicates the line plot for the off-axis, horizontal cross-section indicated by (3108).

The designs may be referred to in the above examples as the "5.24 MPx design" and the "8 Mpx design". These references to resolutions also indicate that the resolutions are obtained in a given display size for the pixel pitches of 3.66 µm and 2.96 µm, respectively. In some embodiments, the "5.24 MPx" design may also be referred to as the "small tube" design, and the "8 MPx" design may be referred to as the "large tube" design based on the sizes of the piezo tubes accommodating the fiber scanner. These two designs may be compared by analyzing their performances using the same pixel size. The use of the same pixel size implies the use of an MFD in each case that yields the desired GBD at the image plane.

Figure 32:
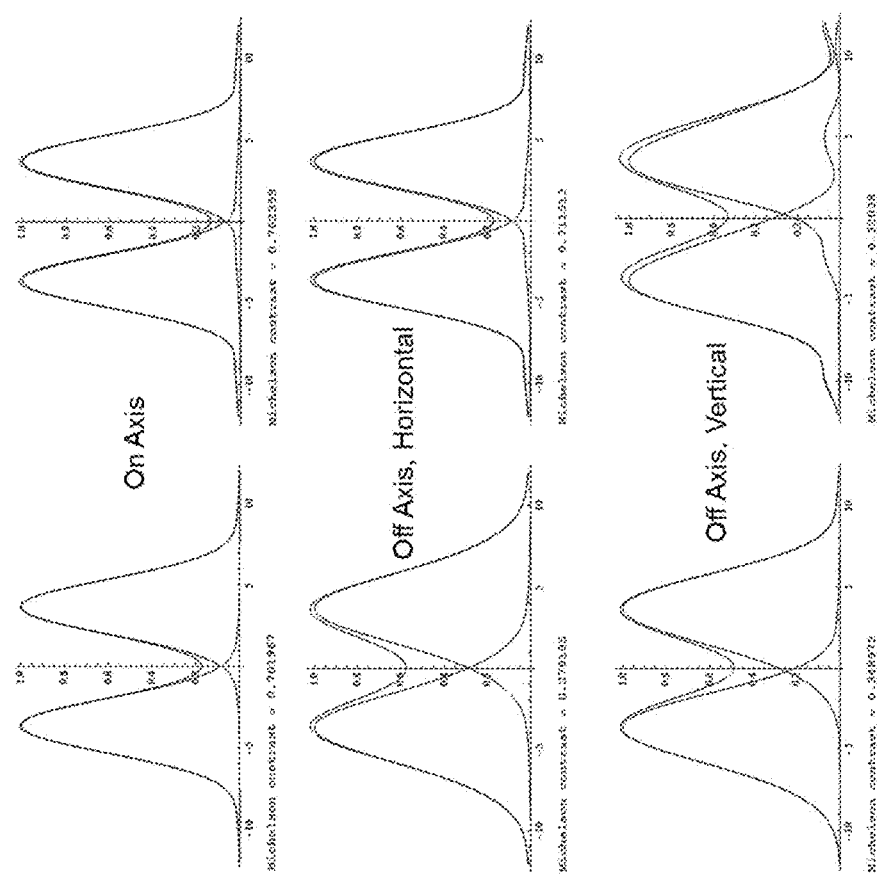
FIG. 32 illustrates an example of comparison results for Michelson contrast performance between a larger tube design and a smaller tube design for a first pixel pitch in some embodiments.
Figure 33:
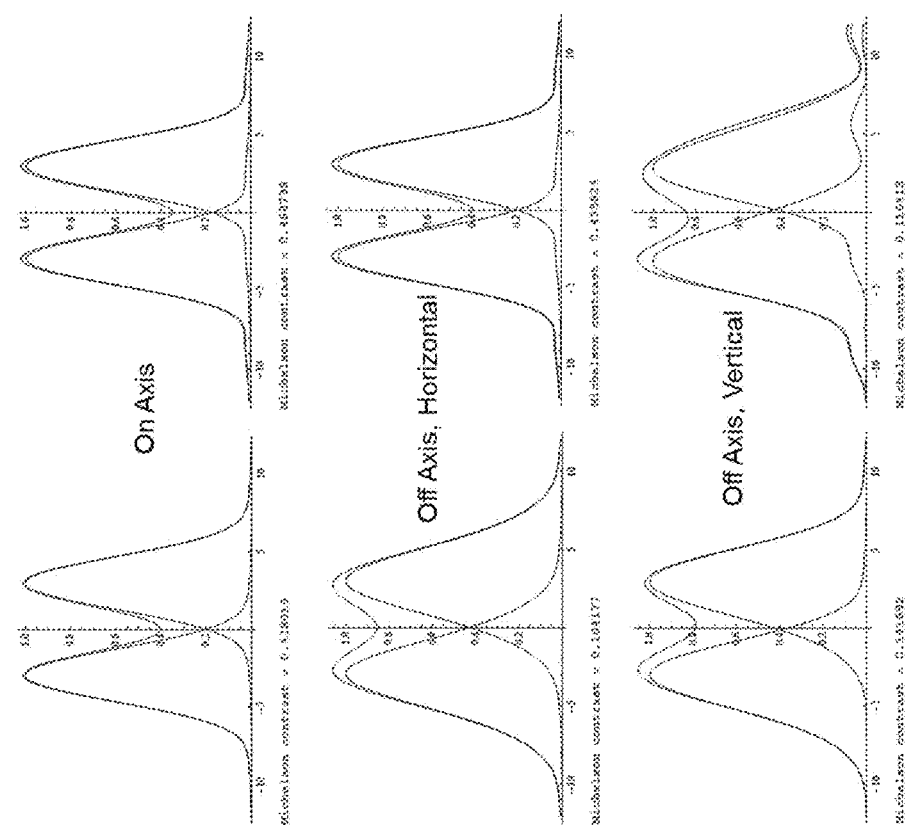
FIG. 33 illustrates an example of comparison results for Michelson contrast performance between a larger tube design and a smaller tube design for a second pixel pitch in some embodiments.

In the example illustrated in FIGS. 32-33, the first design at 3.66 µm pixel pitch (or 5.24 MPx in a 12-mm diagonal display as illustrated in FIG. 32 is compared to a second design with the 2.96 µm pixel pitch (or 8 MPx in a 12-mm diagonal display as illustrated in FIG. 33. More specifically, FIG. 32 illustrates the comparison of Michelson Contrast performance for small tube (left side of FIG. 32) and large tube (right side of FIG. 32) for a 3.66 µm pixel pitch (or a 5.24 MPx display). FIG. 33 illustrates the comparison of Michelson Contrast performance for small tube (left side) and large tube (right side) for a 2.96 µm pixel pitch (or an 8 MPx display). As it may be seen from FIG. 33, the large-tube design produces better contrast than the small-tube design in this example. It shall be noted that the contrast values given in this example for the small-tube design differ from those presented earlier because of the different method for approximating the contrast used in this analysis.

In this example, the large-tube design utilizes a lensed fiber with a small MFD (~0.5 to 1.26 µm) for a larger image field (3.77 mm diameter) with greater magnification (4.7). The large tube design in this example provides for a larger field lens near the scanning fiber, which aids in avoiding aberrations near the outside margin of the lens. The large tube design may further lend itself to the 5.24 MPx applications as well, allowing the reduction in the number of fiber scanners and thus lowered costs, simpler or easier assembly and/or operations of the display. In addition or in the alternative, the higher scan frequency may provide that a 5.24 MPx display may have a frame rate as high as around 90 Hz.

Devising a tiled array of FSDs provides total resolutions in excess of the capabilities of a single projector or display on its own. Various techniques described herein produce ultra-high resolution displays that appear visibly seamless. Two challenges to seamless displays are image misalignments between individual scanning fibers and the brightness increase in the overlapping region between scanning fibers. In some embodiments, these misalignments may take the form of rotations, translations, and "keystoning", which occurs when the projection axis of a scanning fiber is not normal to the display surface.

Figure 34:
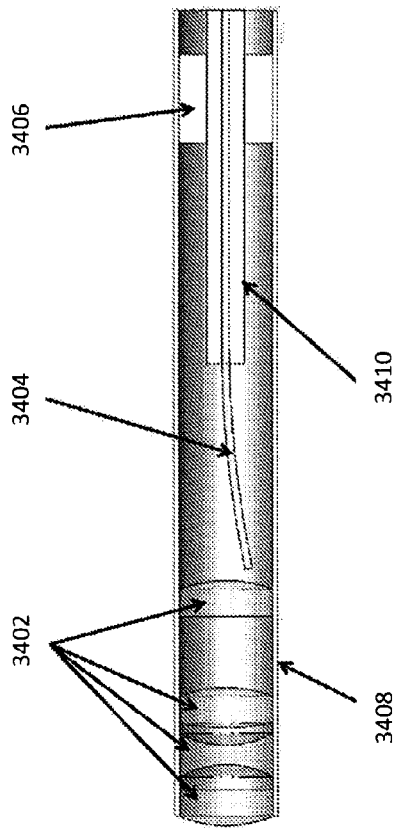
FIG. 34 illustrates a cross-section view of a simplified fiber scanned display assembly in some embodiments.

Some techniques use geometric image registration that registers individual scanning fiber images within the larger, overall image to achieve a seamless display. Geometric image registration may include mechanically ensuring sufficiently tight manufacturing tolerances and digitally processing the images with image processing techniques. In FIG. 34, the cross-section view of a FSD assembly includes the projection optics (3402), the vibrating optical fiber (3404), the mounting collar (3406), the housing tube (3408), and the piezo tube (3410).

A tiled array of fiber scanned displays design by controlling one or more characteristics based in part or in whole upon, for example, the total resolution for the tiled array, the individual resolution of a fiber scanner, etc. The one or more characteristics may include, for example, image misalignments between individual fiber scanners, an increase in the brightness or luminance in overlapping regions produced by individual fiber scanners, etc.

The individual fiber scanner display image may be registered within the overall image of the tiled array of FSDs. One or more deviations in misalignment may be reduced or minimized. One or more deviations in the assembly process for the tiled array of FSDs may be reduced by controlling measurements. For example, measurement errors caused by the measurement equipment may be reduced. Deviations in manufacturing and/or assembly of the fiber scanners and the tiled array of FSDs may be reduced. Misalignment of individual fiber scanners in a tiled array may be due to a stack up of tolerances in the manufacturing of individual components or in the assembly process of the tiled array of FSDs.

The image registration may be accomplished by controlling manufacturing tolerances in order to reduce or minimize the deviations from perfect projector positioning in some embodiments. In some embodiments, the fiber scanned display includes a set of cylindrical components assembled concentrically. Each of these cylindrical components has one or more manufacturing tolerances associated therewith. The optical fiber is usually mounted concentrically (as designed) inside of a tube structural component (e.g., a piezo tube), which in turn is mounted concentrically within a base collar. This entire assembly is then mounted inside one end of another tube (e.g., a steep tube) with the base collar fitting within the inner diameter of the tube with tight clearances as illustrated in FIG. 34, which illustrates a cross-section view of a simplified fiber scanned display assembly in some embodiments.

The tolerances of each concentric component within the piezo tube along with the inner diameter tolerance of the piezo tube itself may potentially stack up in such a way as to leave the concentric component slightly off center within the piezo tube (piezoelectric actuator tube). On the other hand, the current assembly process involves visual alignment using optical equipment such as a microscope, which helps to mitigate the manufacturing tolerances but introduces its own measurement errors, on the order of approximately 1 µm in concentricity tolerances. Such measurement errors may result in a fiber core that is approximately 3 µm off center with respect to the inside diameter of the scanner tube housing. In one embodiment, a piezo tube for the 11.5 kHz scan frequency may include a diameter of 0.4 mm. For faster scan designs, such as 23 kHz and 36 kHz for much higher frame rates, the higher frequency actuation may require a thicker tube in the range of about 1-2 mm diameters.

Figure 35:
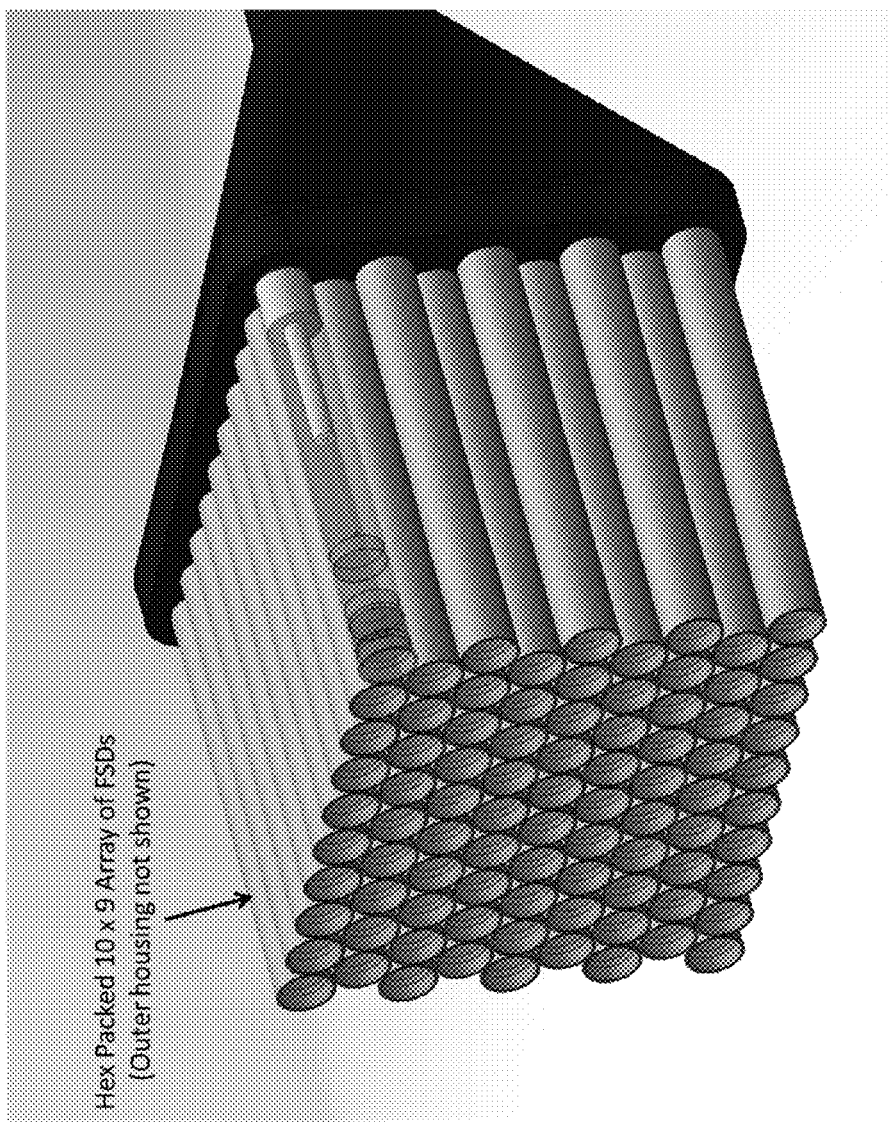
FIG. 35 illustrates an example of a simplified tiled projector array of fiber scanned displays in some embodiments.

There are two mechanisms in which the fiber scanners may be mechanically fixed into a tiled array. In the first mechanism, the fiber scanners may be fabricated into individual housing tubes, and the tubes may be stacked or arranged together rigidly in an enclosure that surrounds the array as illustrated in FIG. 35, which illustrates an example of a simplified tiled projector array of fiber scanned displays without showing the enclosure in some embodiments. In some embodiments, the housing tube may comprise outer diameter tolerances of +/−0.0003 in. (7.6 µm), inner diameter tolerances of +/−0.0005 in. (12.7 µm), and wall thickness as thin as 0.0016 in. (40 µm).

Figure 36:
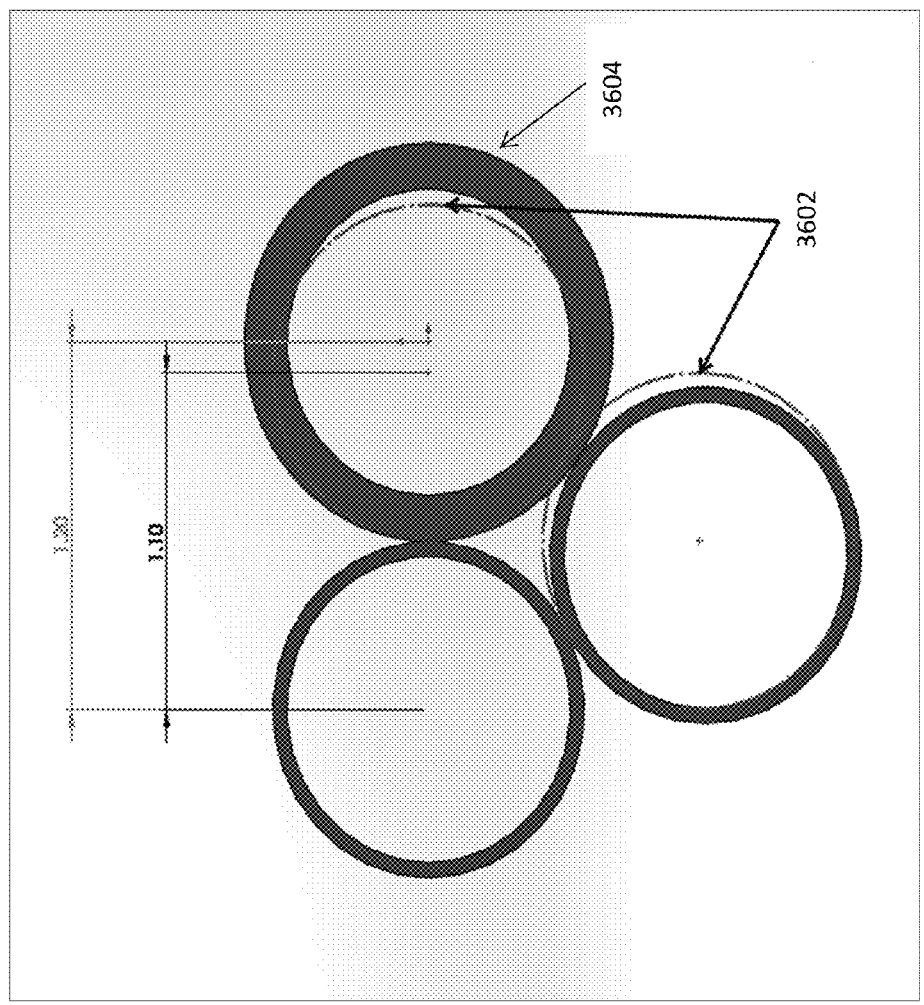
FIG. 36 illustrates an example of positional errors in a simplified tiled projector array in some embodiments.

The relative positions of the fiber scanners in this mechanism may depend on the manufacturing tolerances on the outer diameters of the individual tubes as shown in FIG. 36, which illustrates an example of positional errors in a simplified tiled projector array in some embodiments. In FIG. 36, (3602) indicates the desired scanner positions in light of positional errors in a stacked or tiled array, where the oversized tube (3604) is exaggerated for the sole purpose of illustration and explanations. In some embodiments, the steel tubes exhibit outer diameter tolerances of +/−0.0003 in. (or 7.62 µm). With these manufacturing tolerances, the center-to-center positioning error of fiber scanners may be approximately 14 µm, or about 4 pixels as shown in TABLE 14, which is included in FIG. 34A and illustrates some examples of positional errors due to manufacturing and assembly tolerances in some embodiments. As it may be seen from the examples in TABLE 14, the tolerances constitute very small deviations that can be easily corrected with software processing as described below.

Moreover, because the tiled array design may require or desire a housing tube wall thickness that may not be structurally or feasible or practical, an alternative design embodiment may eliminate the housing tube altogether. In these embodiments, rather than building the fiber scanners into individual tubes, the scan engines may be mounted into an array of apertures (e.g., holes) that may be precisely manufactured in a substrate material. In these embodiments, the projection lenses may also be housed separately from the scanner components as illustrated in FIG. 37, which illustrates an example of a simplified monolithic scanner and lens array assembly in some embodiments.

Figure 37:
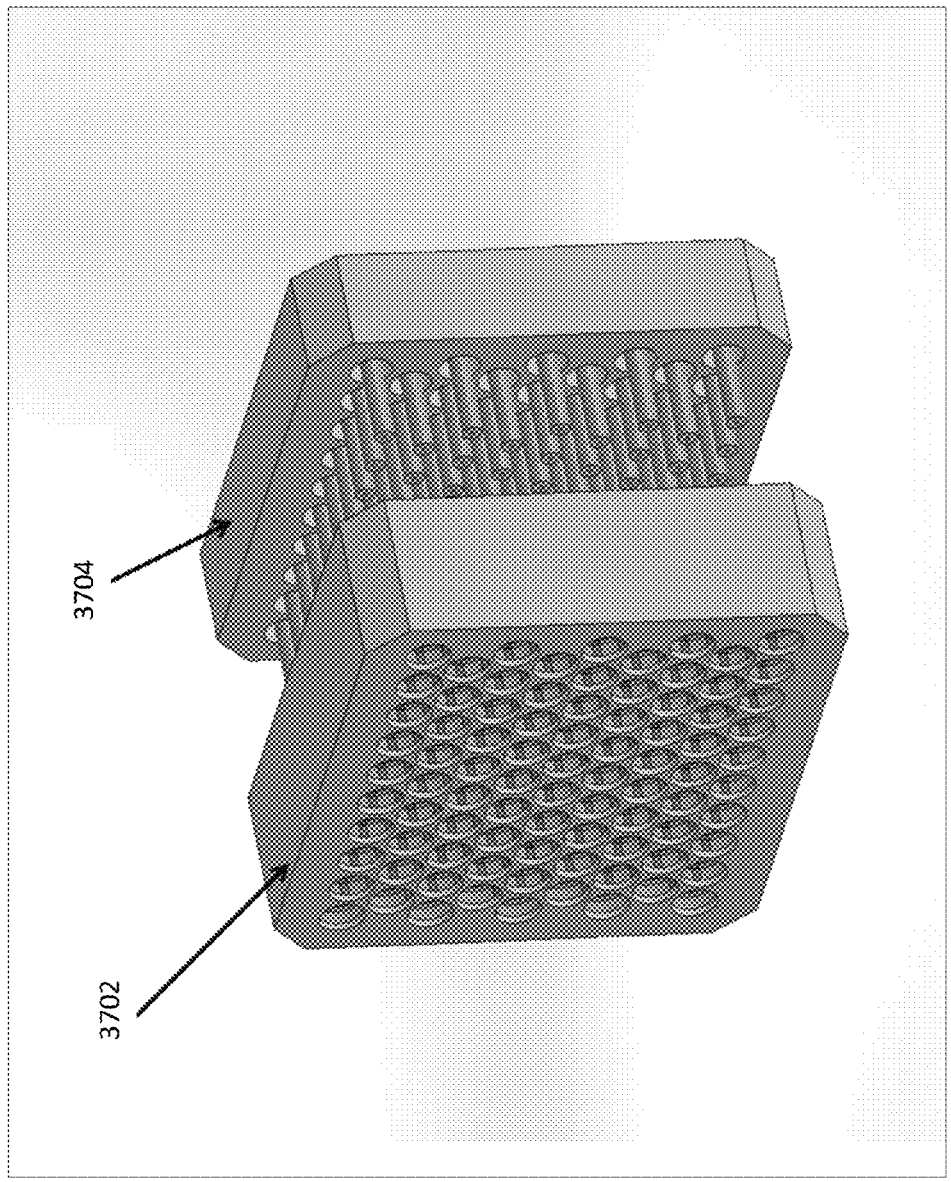
FIG. 37 illustrates an example of a simplified monolithic scanner and lens array assembly in some embodiments.

In FIG. 37, the monolithic scanner and lens array includes a monolithic lens array (3702) and a monolithic scanner array (3704). The fabrication of the array of apertures may be achieved with similar tolerances to that of the stacked assembly described above. Besides machining, this substrate accommodating the apertures may be manufactured with very tight tolerances using a process such as metal or ceramic powder injection molding, laser cutting, or sintering for the array of apertures. The alignment between the scan engines and the projector optics may also be controlled by various control mechanisms described herein such as the position control mechanism with optical feedback.

Manufacturing and or assembly tolerances after one or more reductions of manufacturing and/or assembly deviations may be further compensated for by performing software controlled optical corrections. In some embodiments, one or more misalignment components may be identified for compensation. In some of these embodiments, an identified misalignment component may be optionally controlled by clocking a fiber scanner with respect to a piezo scan axis during the assembly process.

Figure 38:
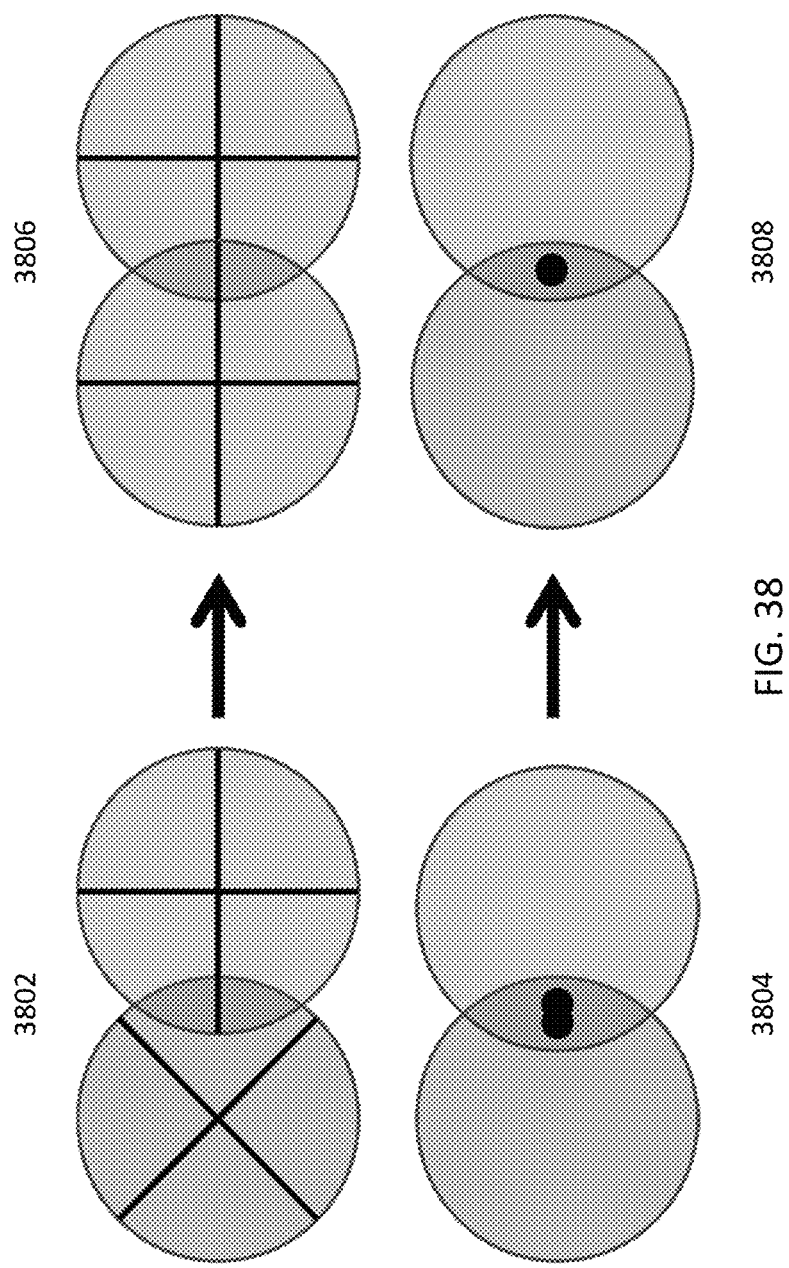
FIG. 38 illustrates an example of misalignment between projectors in some embodiments.

In some embodiments, because the fabrication of the assembly is held to sufficiently tight tolerances, the primary misalignments between individual projectors may now include rotational and translational misalignment components as illustrated in FIG. 38, which illustrates an example of misalignment between projectors in some embodiments. Rotational misalignment may be controlled by clocking each scanner rotationally with respect to the piezo scan axes upon assembly in some embodiments, although at a higher cost and complexity in the assembly process. In some other embodiments, rotational adjustments may be included in software to avoid the potentially higher manufacturing cost and complexity.

Keystoning, where a projected image is distorted due to off-angle or off-axis projection with respect to the screen or image plane, is not expected to be a perceivable artifact in some embodiments. In FIG. 38, (3802) indicates rotational misalignment; (3804) indicates the tiled image from these two fiber scanner component images due to the rotational misalignment; (3806) indicates software controlled correction to the left scanner or clocking the left scanner rotationally with respect to the piezo scan axis on the hardware side; and (3808) indicates the tiled image from these two fiber scanner component images after the correction in the rotational misalignment.

A mapping between individual fiber scanners and the overall image may be determined by registering tiled fiber scanner images based in part or in whole upon one or more factors. In some embodiments, the one or more factors may include, for example, the type of display surface (e.g., simple display surfaces), the non-linearity in the optics, etc. A number of different methods may be used to register tiled scanner images, and the method may be selected based in part or in whole on the type of display surface as well as any potential non-linearity in the projector optics.

Registering individual scanner images with respect to the overall desired image display determines or helps to determine a mapping between the individual scanners and the overall desired image at the display plane to not only perform geometric image registration but also produce color and photometric seamlessness (e.g., no perceivable seams by a normal person at an appropriate viewing distance). Moreover, simple display surfaces, such as planes or cylinders, may be easily parameterized using linear "homographies" (e.g., a 3×3 transform matrix) to reliably map the coordinates of the display surface to the coordinates of each scanner's image. This mapping may be expressed as in Eq. (6) below $$G_{(xi,yi) \to (s,t)}, \quad (6)$$

In Eqn. (6), (xi, yi) denote the coordinates of each scanner's image coordinates, with the fiber scanner labelled as Pi. The mapping may be processed by using a high resolution camera to view the display, with the camera having its own coordinates, C(u,v). The transformation between the projector image coordinates and the camera's coordinates are expressed as in Eqn. (7) below.

$$H_{(xi,yi) \to (u,v)}, \quad (7)$$

The transformation between the camera and the display surface is expressed as in Eqn. (8)

$$H_{(xi,yi) \to (u,v)}, \quad (8)$$

The total transformation is then given by Eqn. (9)

$$G = F*H \quad (9)$$

In some embodiments, the tiled array presents an image at an image plane that is to be relayed through viewing optics to the viewer's eye (e.g., via a head-mounted display). In these embodiments, the transform that may otherwise describe the mapping of the camera to the display surface may be eliminated, and a non-parametric methodology that equates the camera-projector transform to the projector-image transform may be used instead in these embodiments as expressed in Eqn. (10) below.

$$G_{(xi,yi) \to (s,t)} = H_{(xi,yi) \to (u,v)}, \quad (8)$$

Figure 39:
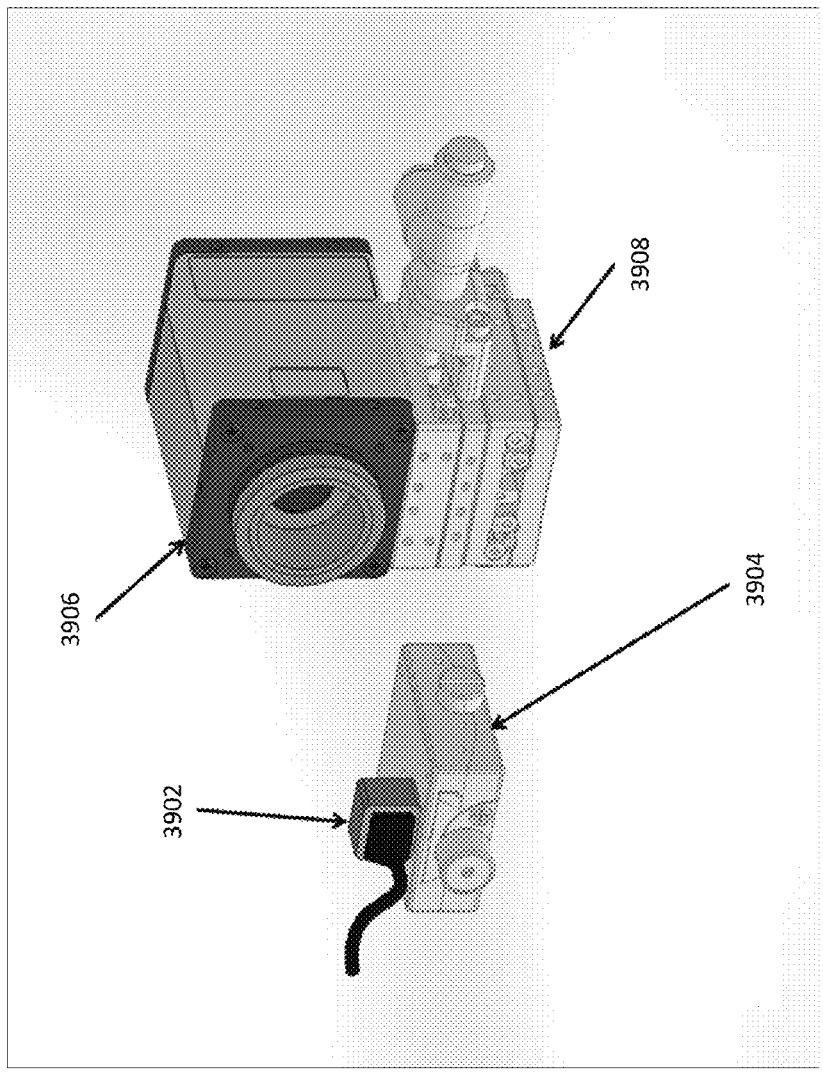
FIG. 39 illustrates a perspective view of a simplified image registration station in some embodiments.

Registration may be performed after the assembly of the fiber scanners into the tiled array in some embodiments. The image registration and inspection station may comprise precision tooling and movement stages that position a high resolution color camera, such as some models illustrated in FIG. 39, which illustrates a perspective view of a simplified image registration station in some embodiments. While a black and white camera may suffice for image registration, the same inspection station may also be used to perform luminance and chrominance adjustments for photometric seamlessness. In FIG. 39, the image registration station include a tiled projector array (3902), a goniometer stage (3904) (e.g., for ensuring the mange plane is parallel to camera sensor plane), a high-resolution camera (3906), and translation stages (3908) for alignment and focus purposes.

Some embodiments are directed at a tiled projector array display with improved photometric seamlessness in some embodiments. More specifically, various techniques described herein may manage or manipulate the brightness in overlapping regions. In these embodiments, an alpha blend may be applied across an overlapping region, and a pattern may be projected using a fiber scanner in a tiled array of FSDs. The orientation information may be identified by applying a binary encoding scheme to the pattern based on a rule.

A feature may be identified with an identifier in, for example, a binary format, and the features having the corresponding value (e.g., "1" in a binary format" in the corresponding position that matches the frame number of a frame may be included in the frame. The rotational orientation of each individual fiber scanner may be accessed by referencing the binary encoding scheme, and it may be determined which features appear in which frames. The binary identifiers for features as seen by optical inspection equipment may be extrapolated based in part or in whole upon the determination results of which features appear in which frames. Geometric registration may be performed by transforming feature position to corresponding desired positions using image processing techniques.

For example, during the operation each fiber scanner, one at a time, projects a pattern of regularly spaced features that the camera observes. The pattern need not be dense, but the denser the pattern, the more accurate the mapping may be in some embodiments of radial distortions in the projector optics. In addition, because the rotational orientation of the projectors may be unknown, the feature pattern may be binary-encoded to provide orientation information. The encoding may follow the following rule: the number of bits required to represent the total number of features determines the quantity of frames that must be presented to establish orientation. Each feature may be provided with a serial numerical ID (e.g., from 1 to N, where N denotes the total number of features). For example, if 25 features are projected in a 5×5 grid, five bits may be needed to represent the number 25. Each ID may then be represented by a five-bit binary number as shown in TABLE 15, which is included in FIG. 39A and illustrates some examples of a binary identification scheme in some embodiments.

Each frame may then contain only the features whose ID's have a binary "1" in the bit position that matches the frame number in these embodiments. The feature with ID="1" (e.g., 00001) may appear in the first frame, but none of the other frames. The feature with ID="3" (e.g., 00011) may appear in the first and second frames only. In these embodiments, the camera is first shown the entire field of features and determines if the camera has detected all of these features. The camera is then shown each of the frames in succession as illustrated in FIG. 40, which illustrates some examples of projected features with the binary encoding scheme in some embodiments.

Figure 40:
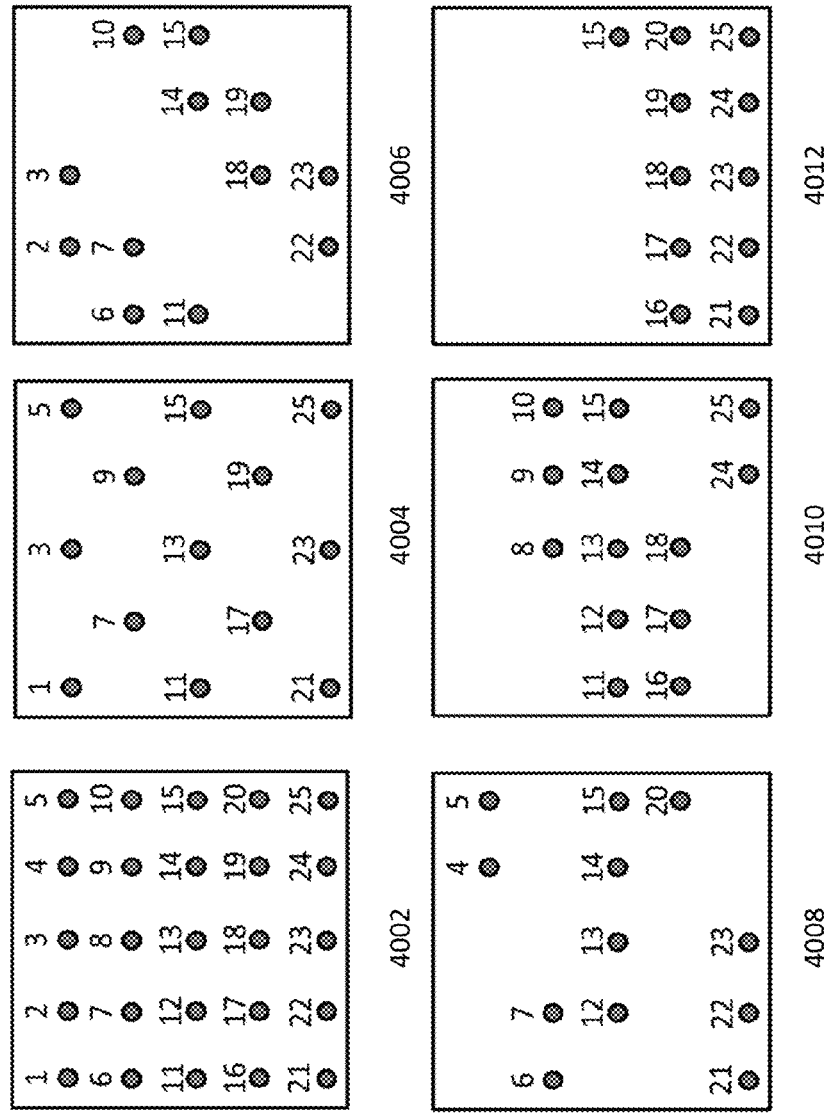
FIG. 40 illustrates some examples of projected features with the binary encoding scheme in some embodiments.

In FIG. 40, (4002) represents the initial feature image including 25 features having their respective identifications; (4004) represents the first frame in the sequence; (4006) represents the second frame in the sequence; (4008) represents the third frame in the sequence; (4010) represents the fourth frame in the sequence; and (4012) represents the fifth frame in the sequence. The binary encoding scheme may serve to allow the camera system to accurately assess the rotational orientation of each individual fiber scanner component image. By analyzing which features appear in which frames, the system may extrapolate the binary IDs for each feature as seen by the camera, and then transform the observed feature positions to their desired positions using common image processing techniques in some embodiments.

Figure 41:
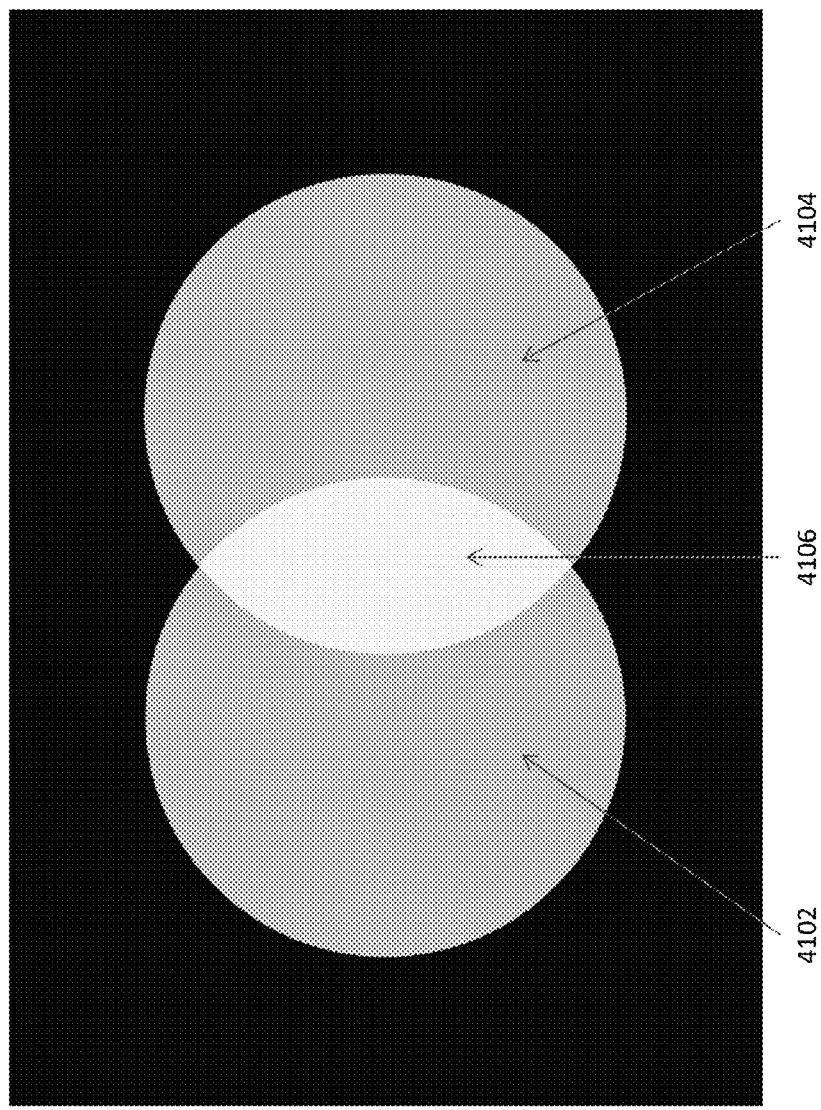
FIG. 41 illustrates an example of an increase in luminance in an overlapping region produced by two fiber scanners in some embodiments.

In addition to geometric registration, various techniques apply to produce a uniform display is photometric seamlessness as perceived by a normal person at the image plane or at an appropriate distance. For the tiled FSDs, the luminance in overlapping regions between fiber scanner component images may be a characteristic of interest. In an overlapping region, the luminance may be the sum of the luminances of the individual fiber scanners as shown in FIG. 41, which illustrates an example of an increase in luminance in an overlapping region produced by two fiber scanners in some embodiments. The image illustrated in FIG. 41 includes two regions (4102) and (4104) produced by two individual fiber scanners and the overlapping region (4106) between the two regions (4102) and (4104).

One embodiment to solving this problem with increased luminance is to apply an alpha blend across an overlapping region. Alpha blend may include linear blends and power law blends. In some embodiments, a simple power law blend may be applied without optical (e.g., camera) feedback. Full photometric compensation, for both inter- and intra-projector luminance and chrominance differences, may be utilized in some embodiments. In addition or in the alternative, camera or other suitable optical equipment based analyses may be utilized to compensate for these undesirable effects (e.g., increased luminance in an overlapping region) in addition to the blending process. For example, the alpha blend (e.g., the power law edge blend) may be simulated to determine adjustments to the intensity of pixels in the overlapping region so that the sum of the intensities approximately or exactly matches the desired intensity (e.g., the intensity as if projected by a single fiber scanner).

Figure 42:
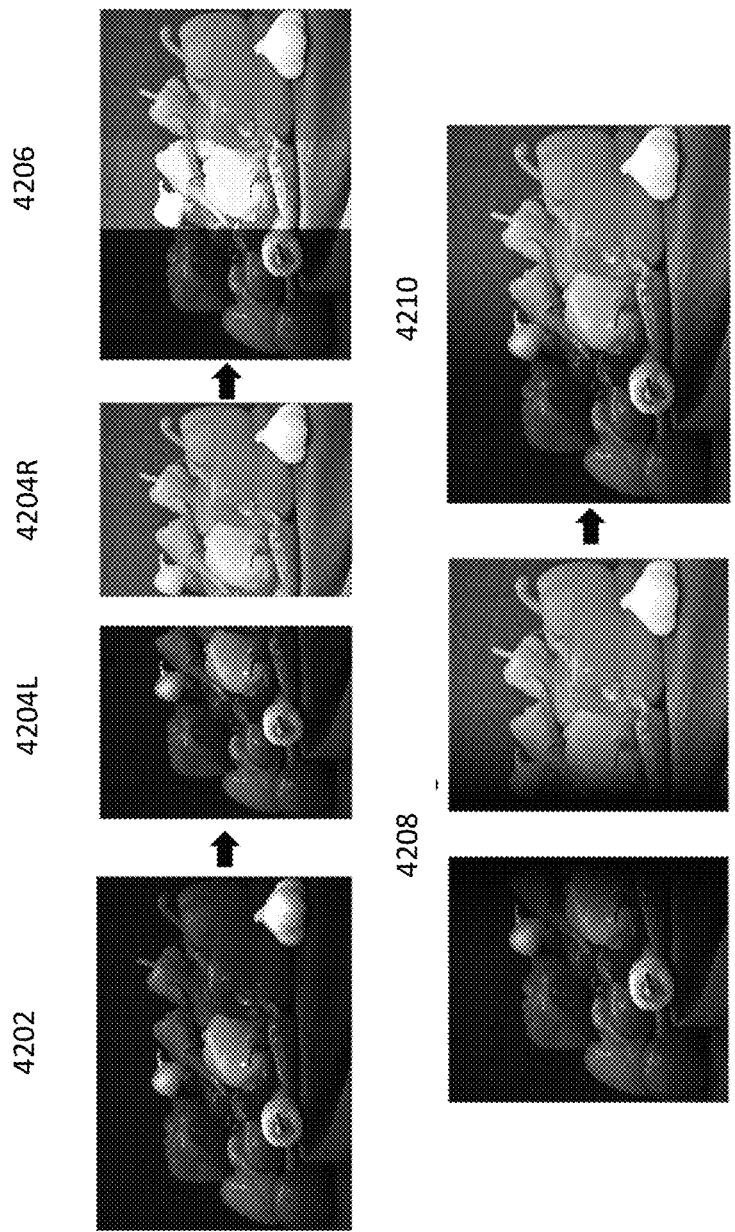
FIG. 42 illustrates an example of the application of power law blend to some images in some embodiments.

FIG. 42 illustrates the effect of the blend. A sample image (left) is subdivided into two component images (top middle) with a common region in which they will overlap. The bright overlapping region can be seen in the top right of the figure. The power law gradient is applied to each component image (lower left), and then re-projected, with the formerly bright seam now smoothed (lower right). In these images illustrated in FIG. 42, (4202) indicates the original image; (4204L) and (4204R) indicate two subdivided images with a common region in which these two subdivided images will overlap; (4206) illustrates uncorrected overlapped image with increased brightness in the overlapping region; (4208) illustrates the application of complimentary blend functions to each image; and (4210) illustrates a corrected overlapped image from the two fiber scanners.

It shall be noted that in this simulation, the component image (4204L) or (4204R) is lighter than the other images. This makes the smoothness of the blended transition clearer for the purpose of demonstration and also demonstrates the potential inter-scanner luminance variation that may be present. In other words, while the example of the tiled image in the FIG. 41 may be visibly seamless to a normal person, the tiled image is nevertheless not uniform in this example. The use of multi-core fibers may be used as a replacement component for the single-core fiber currently used in conventional FSD.

One of the advantages of multi-core fibers is that for every scan cycle, multiple pixels may be produced in parallel, rather than just one pixel produced serially along the scan, and thus may dramatically reduce the required scan rate, increase the individual image field size per scanner, and/or greatly reduce the total number of scanners (even to one scanner). The optics design for a multi-core fiber may depend on the total number of cores in the multi-core fibers, the spacing between two neighboring cores, and/or the overall size of the emitting region. The spacing two neighboring cores may be influenced by "cross-talk" between the fiber cores so the cores may be maintained at a minimum distance greater than or equal to the evanescent field penetration depth in some embodiments.

As a wave is guided down an optical fiber, a fraction of the power exists in the cladding as an exponentially decaying field known as an evanescent wave. The evanescent wave penetrates to some depth into the cladding usually on the order of no more than a few wavelengths. On the other hand, at angles of incidence near the critical angle at the core-to-cladding interface, the penetration depth may be larger and lead to evanescent wave coupling if another waveguide is close enough to be stimulated by the decaying field. This evanescent wave coupling may lead to a loss of transmitted power in the parent core, and added power to the stimulated core. Crosstalk in a multicore fiber may be analyzed by approximating the minimum distance at which cores are to be separated by analyzing the penetration depth of the evanescent field component for an existing core in some embodiments. The penetration depth is given by Eqn. (11) below.

$$d = \frac{\lambda}{4\pi n_1 \left[\sin^2(\theta) - \left(\frac{n_2}{n_1}\right)^2\right]^{0.5}} \quad (11)$$

In Eqn. (11), $\lambda$ denotes the wavelength of interest, and $n_1$ and $n_2$ respectively denote the indices of refraction for the core and cladding. The penetration distance represents the distance at which the magnitude of the electric field, E, drops to 1/e of the value at the interface. In some embodiments where a single mode fiber similar with specifications as shown in TABLE 16 included in FIG. 42A, the indices of refraction may be estimated from the NA. Moreover, TABLE 16 illustrates some examples of specifications for a fiber scanner in some embodiments.

It may be assumed that the cladding constitutes silica glass, and that the core includes silica glass doped with some compound to slightly raise the index. From single mode fiber fundamentals, the parameter "delta" may be expressed in Eqn. (12) below.

$$\Delta = \frac{n_1^2 - n_2^2}{2n_2^2} \quad (12)$$

In Eqn. (12), $n_1$ and $n_2$ respectively denote the indices of refraction for the core and cladding, and $\Delta$ denotes the ratio of the difference in the indices to that of the cladding. The numerical aperture may also be expressed in terms of the indices of refraction as expressed in Eqn. (13) below.

$$NA = \sqrt{n_1^2 - n_2^2}. \tag{13}$$

Therefore, may also be expressed in Eqn. (14) below.

$$\Delta = \frac{NA^2}{2n_2^2} \tag{14}$$

In some embodiments, the process may first solve for $\Delta$ and then for the core refraction index ($n_1$) to determine the estimated indices as shown in TABLE 17, which is included in FIG. 42B and illustrates some examples of estimated indices of refraction by laser diode wavelength in some embodiments. The process may further solve for "d", the penetration depth, for various angles greater than the critical angle for the core-cladding interface (e.g., for NA=0.13, θc=84.938°), and some examples of the results are shown in TABLE 18, which is included in FIG. 42C and illustrates some examples of evanescent field penetration depth in some embodiments.

As it may be seen from TABLE 18, the evanescent field of the red channel has the greatest reach to the first order, and that the cores may be separated by a minimum of 9 µm from outer diameter to outer diameter, or at 11.5 µm center-to-center spacing. It shall be noted that as the angle of incidence of the wavefront increases (e.g., measured from the normal to the core-cladding interface), the penetration depth quickly decreases to on the order of a wavelength in this example illustrated in TABLE 18.

In some embodiments comprising a single core fiber, if only a single scanner is used to fill the entire display area, an image field that is 12-mm in diameter need to be generated in order to cover an entire rectangular 5:4 display area with a 12 mm diagonal. For a 5 MPx display, this 12-mm image field requires a pixel pitch of 3.66 µm. Over the 12-mm diameter, this pixel pitch of 3.66 µm equates to 3279 pixels, or approximately 1639 scan cycles (spirals). For a frame rate of 72 Hz, this scan cycle requires a scan frequency of 118 kHz, which may be so high as to be generally impractical because the fiber cantilever may then be on the order of 0.7-mm long for an 80 µm diameter fiber scanner.

While this fiber cantilever is physically attainable, the vibration dynamics of such a fiber cantilever may require large magnifications (e.g., magnifications>10) in the projector optics in order to produce the desired or required image dimensions. This magnification requirement may in turn require a small Gaussian beam diameter at the image plane. Adding cores to the fiber indicates that several pixels may be produced at once to potentially fill the image space using a lower scan frequency. The use of multiple cores may lend itself to reducing the overall magnification of the system. Analyses of FSD scan frequencies have shown that a variation of as much as +/−200 Hz has been evident in some fiber scanners.

Figure 75:
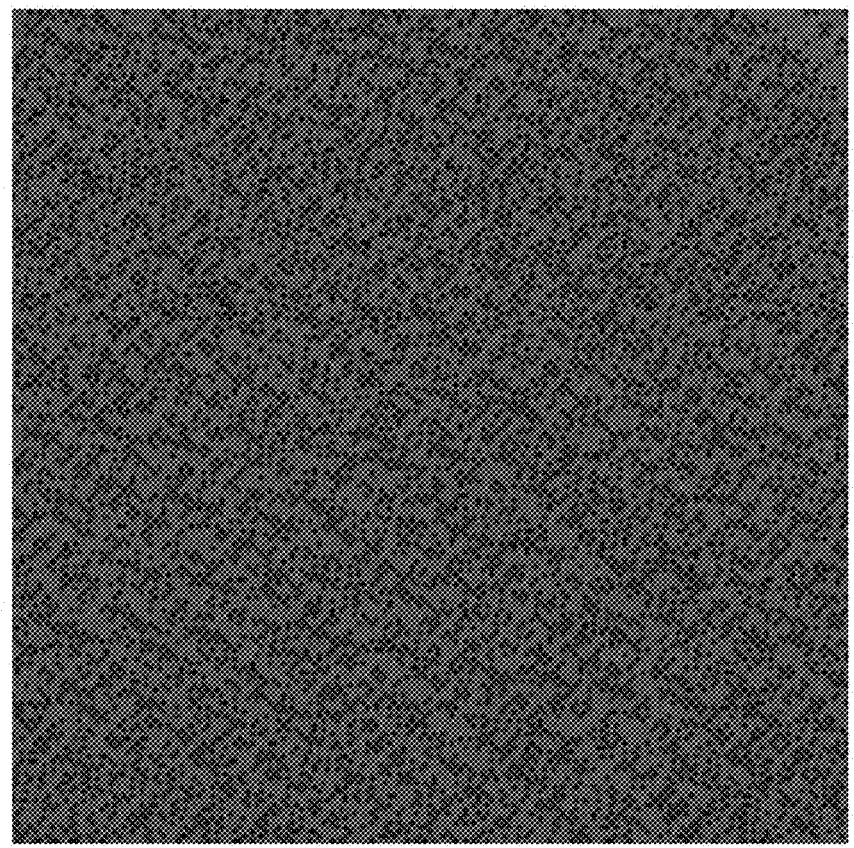
FIG. 75 illustrates an example of a close-up view of the pixel coverage map for 38 kHz scan frequencies and 17 μm core spacing with a 20-degree rotation compensation of the core pattern in some embodiments.

A fiber scanner that vibrates at resonance slightly faster (e.g., +200 Hz than its nominal vibrating frequency) than its nominally vibrating neighbor (e.g., at exactly 11.5 kHz) may produce more lines per frame in the same frame time. However, if a fiber scanner is vibrating more slowly (e.g., at −200 Hz than its nominal vibrating frequency), the fiber scanner may produce fewer lines in the same frame time. This difference as shown in TABLE 20 which is included in FIG. 75A and illustrates the scan frequency sensitivity analysis results amounts to no more than about +/−6 lines in the worst case (72 Hz).

This is well within the degree of overlap between the scanners and may therefore be accounted for in the image registration and photometric seamlessness processing without negatively impacting the performance of the display. On the other hand, if each fiber scanner is forced to produce exactly the desired lines of resolution, the frame rates may differ among some of the fiber scanners in a tiled array. This may not be a desirable outcome because it may result in a perceivable flicker or image tearing artifacts in the display.

Figure 43:
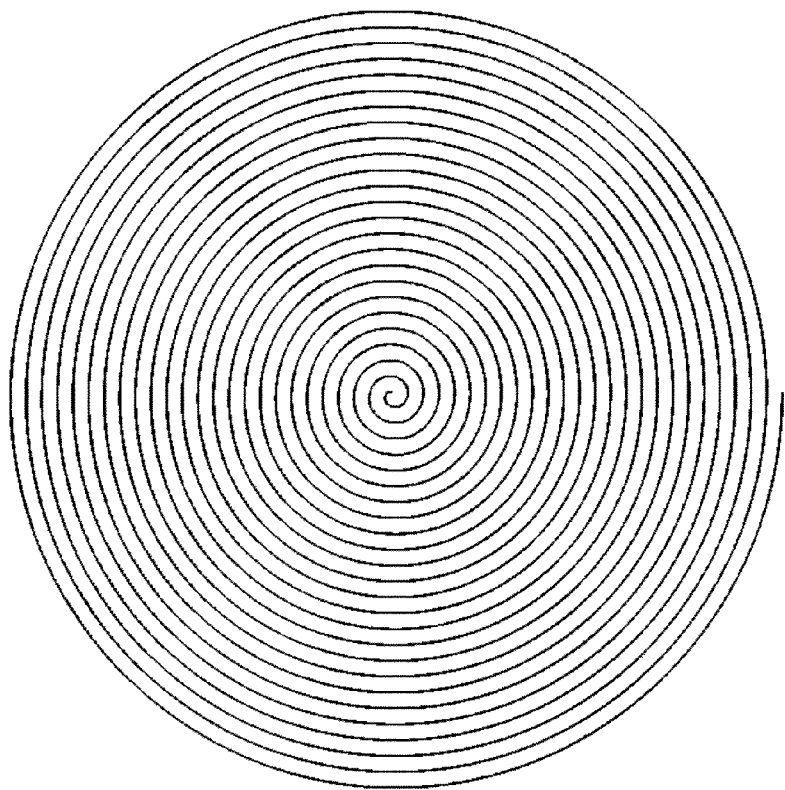
FIG. 43 illustrates an example of a spiral scan pattern with a single core in some embodiments.
Figure 44:
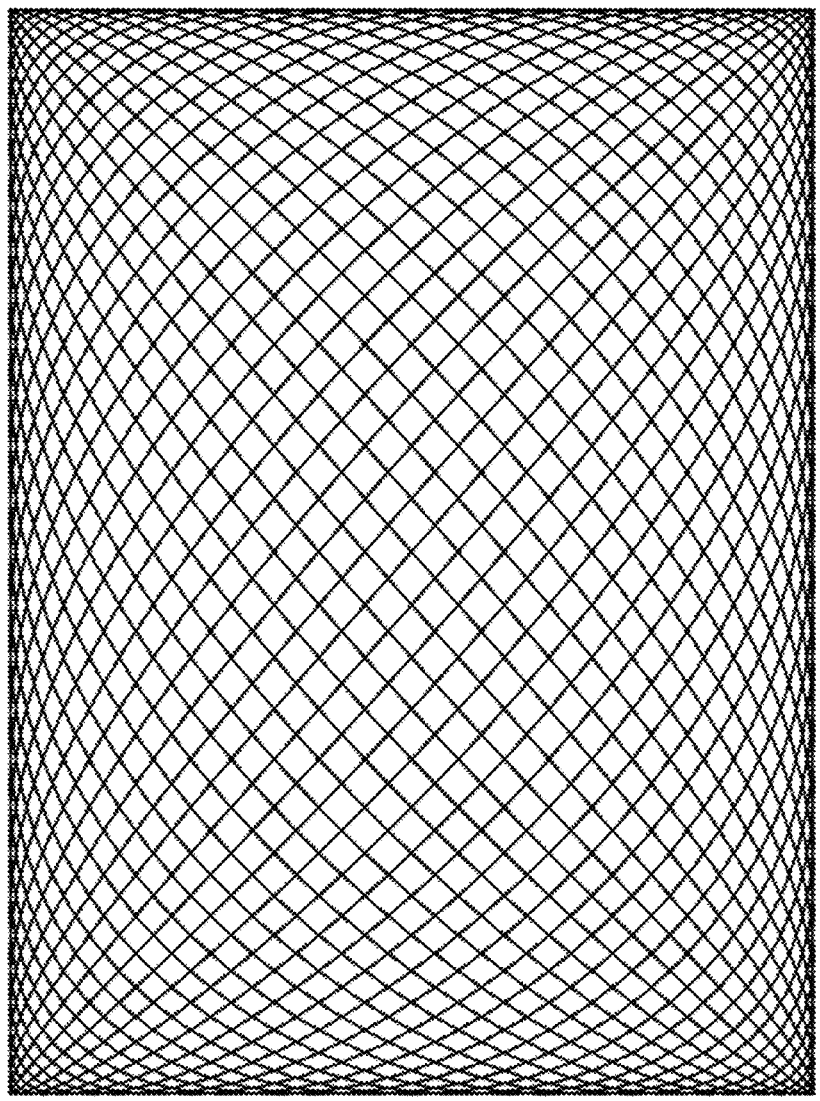
FIG. 44 illustrates an example of a Lisssajous scan pattern with a single core in some embodiments.

Some embodiments are directed at one or more analysis tools to analyze pixel coverage based in part or in whole on scan pattern, core quantity, core separation, and/or the scan frequency. In the following examples and description, two scan patterns—the spiral scan pattern usually used for display purposes as illustrated in FIG. 43 and a Lissajous scan pattern as illustrated in FIG. 44—are referenced for the purpose of illustration and explanation and are not intended to limit the scan patterns only to these two patterns. In some other embodiments, other patterns, such as so called 'propeller' scans, may also be used to achieve identical or substantially similar purposes. In order to visualize the uniformity of the pixel distribution for a given scan pattern, simulations by dividing the image field area into discrete pixels are run, and the frequency with which each pixel is crossed by the path of the fiber cores is observed. The result includes a histogram showing a range of values that indicate the degree to which space is filled by a particular scan pattern.

Figure 45:
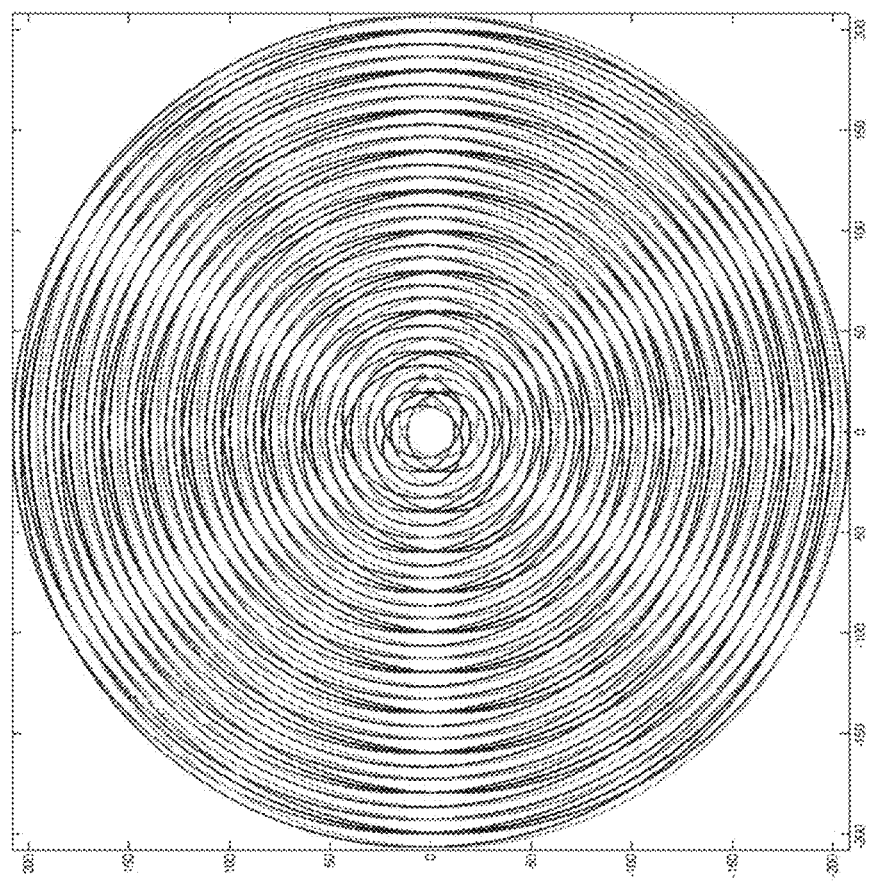
FIG. 45 illustrates an example of a circular scan pattern with seven cores in some embodiments.
Figure 46:
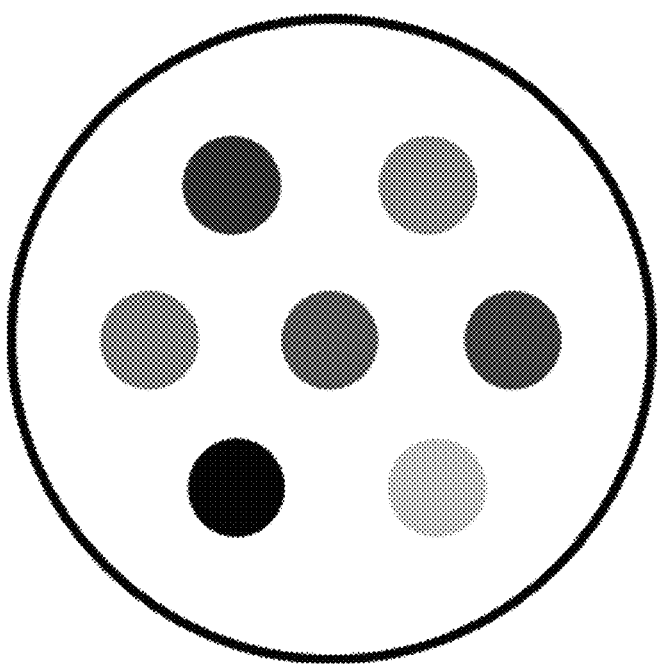
FIG. 46 illustrates an example of a hexagonal scan pattern with seven cores in some embodiments.

As a demonstration of the application of these analysis tools, FIG. 45 illustrates a circular approximation to a spiral scan pattern. It shall be noted that FIG. 45 does not represent an actual, typical scan pattern but is a sparse pattern that allows the user to better visualize how the core paths, overlaps, and gaps are mapped to the pixel space in these embodiments. In addition, FIG. 45 includes seven "cores" represented (see FIG. 46 where cores are color coded to the paths in FIG. 45) or arranged in a close-packed hexagonal pattern with one central core.

Figure 47:
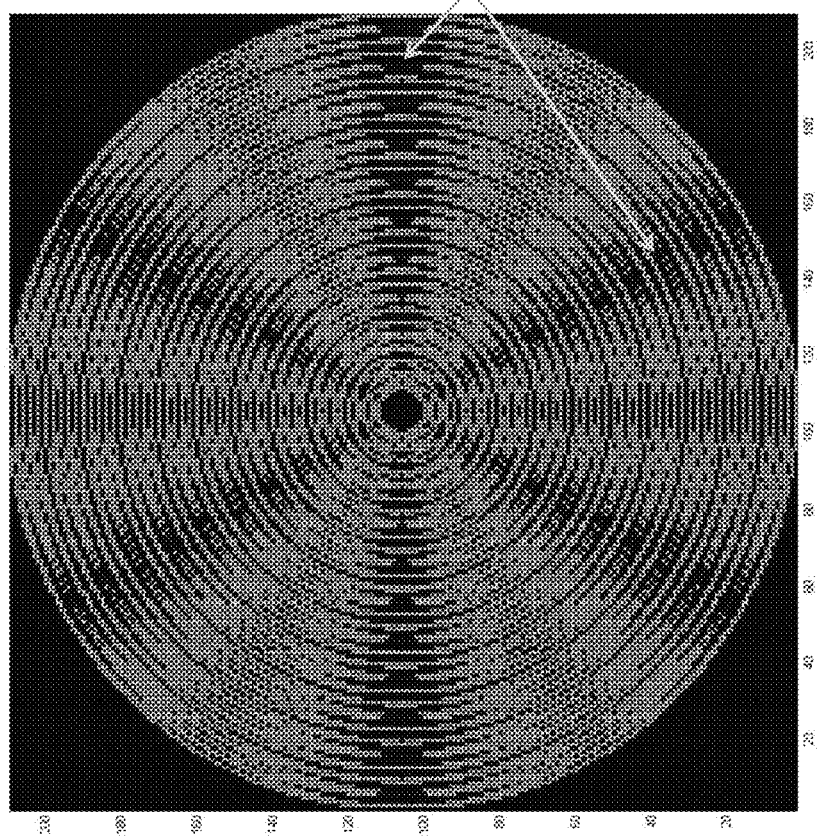
FIG. 47 illustrates an example of a histogram of an approximated spiral scan in some embodiments.

It may be seen that there are regions where the paths of the cores overlap heavily and regions where the paths of the cores are well distributed. The overlaps occur where different core paths overlap, both within a single revolution as well as between different revolutions. FIG. 47 shows the result of binning the path into the pixels. In FIG. 47, darker color represents regions of blank pixels, while lighter color represents few passes through the pixel. The highest degree of overlap occurs in the regions indicated by (4702). By varying core spacing and scan pattern parameters, these analyses may help to visualize how space filling is affected and optimize one or more pertinent design parameters in some embodiments.

Figure 48:
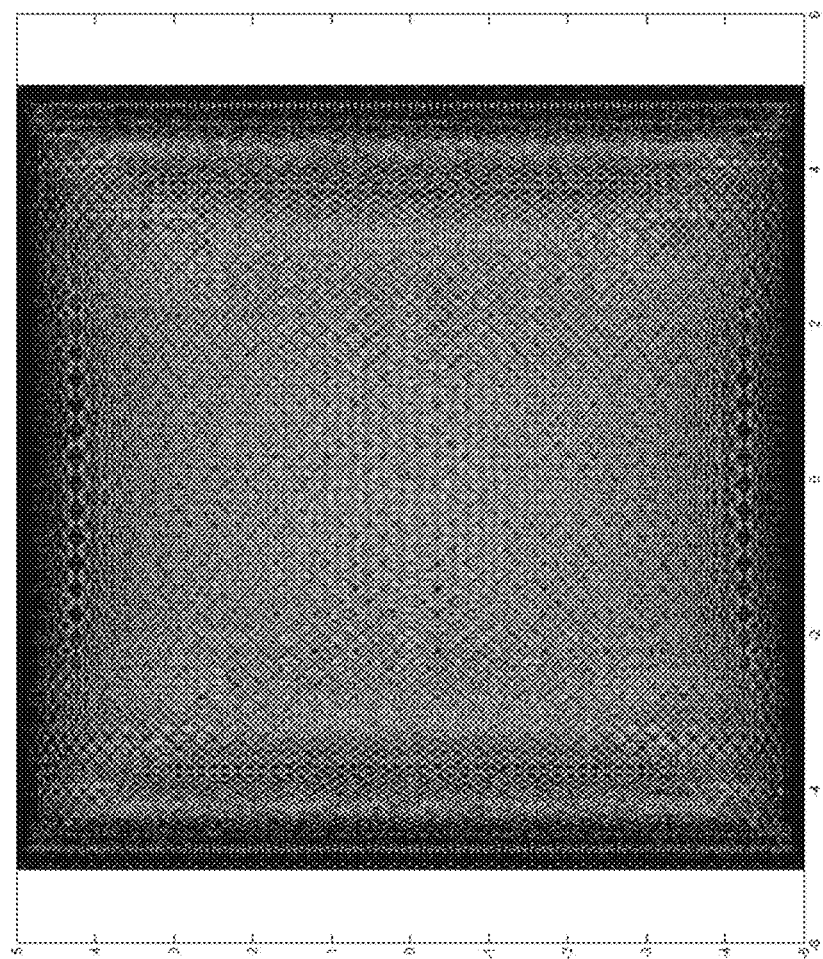
FIG. 48 illustrates an example of a dense Lissajous scan pattern in some embodiments.
Figure 49:
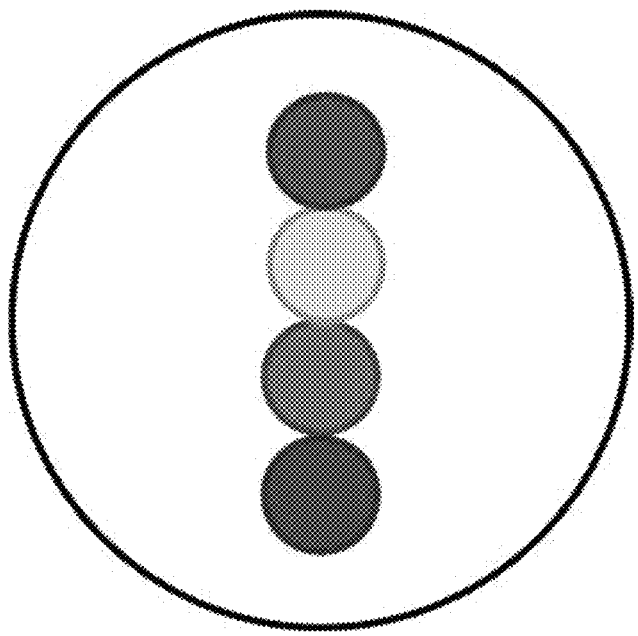
FIG. 49 illustrates an example of a four core linear pattern in some embodiments.
Figure 50:
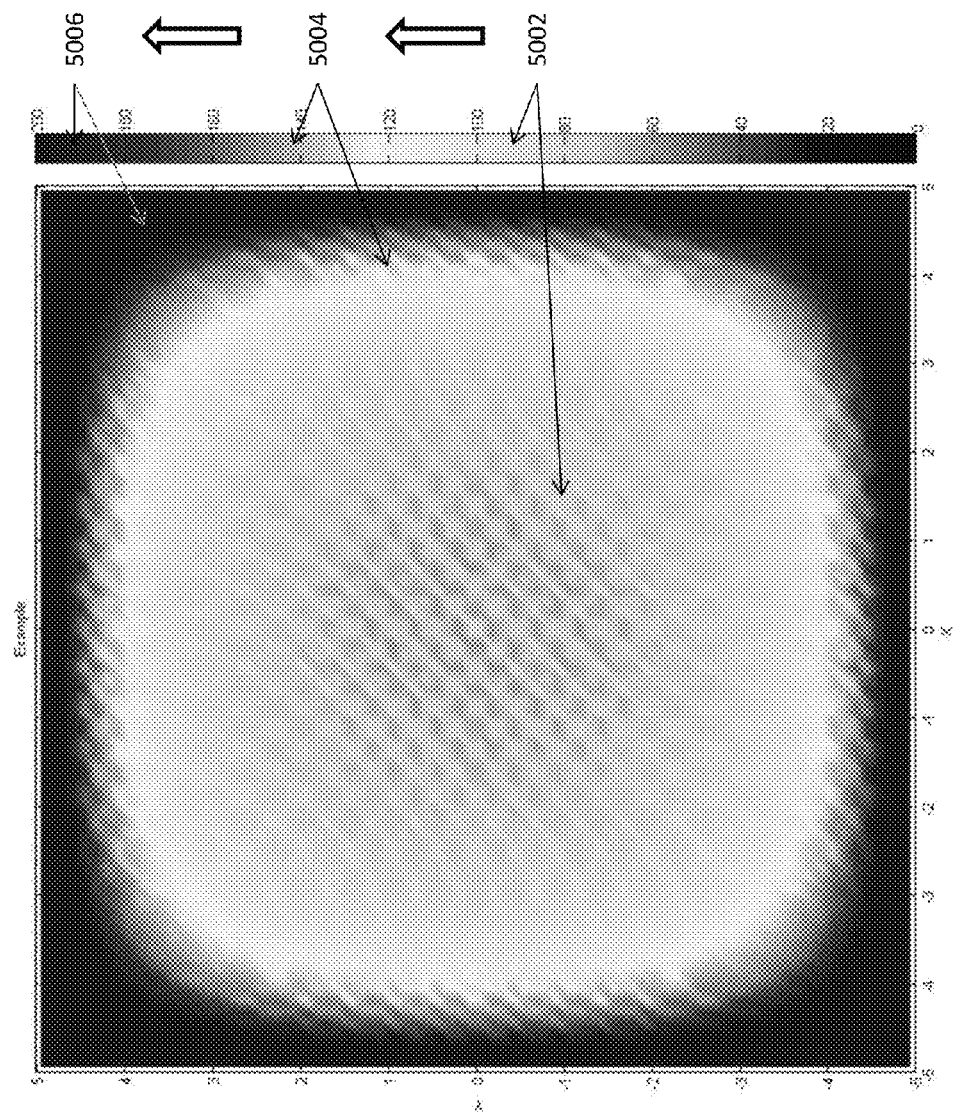
FIG. 50 illustrates an example of a space filling histogram for a Lissajous scan pattern in some embodiments.

A similar analysis for the Lissajous scan pattern is also performed. FIG. 48 illustrates a Lissajous path of four cores illustrated in FIG. 49, and the resulting histogram of pixel crossings in FIG. 50, where regions corresponding to increasing vertical axis value corresponds to increasing redundant coverage. For example, regions corresponding to (5002) less coverage than regions corresponding to (5004) which in turn corresponds to less coverage than regions corresponding to (5006) in FIG. 50.

Given the preliminary analysis, how the core paths map to pixel coverage may be better described. This better description of the mapping may further lead to refinement of the analysis tools to more accurately simulate display conditions including, for example, display dimensions, scan frequencies, and/or scan patterns in some embodiments. In addition or in the alternative, data from the crosstalk analysis may be used in further space filling analyses. In one embodiment, the spacing filling analysis may be constrained by a requirement that the pixel pitch be 3.66 μm at the image plane. An approximate fiber dimensions and vibration characteristics may be approximately determined (e.g., a first order solution) by assuming, for example, a workable line-on line-off Michelson contrast of 50%.

At this Michelson contrast level, the GBD (Gaussian beam diameter) of the beam at the image plane should be no larger than twice the pixel pitch, or 7.3 μm. In some embodiments, one extreme condition of the design space may be considered where conventional single core fiber with standard specifications is used to scan the image. For example, a fiber core with 2.5 μm in diameter with a MFD (mode field diameter) of 3.5 μm may be used as the extreme condition in some embodiments. In order to meet the assumed Michelson contrast criterion, the magnification introduced by the projector optics may be no more than 7.3/3.5, or about 2.1×. For a 13-mm image diameter (12-mm for the display area and a small margin to account for incomplete pixel coverage at the outer edge) using this 2.1× magnification, the scan diameter at the fiber tip may be determined to be about 6.2 mm, which constitutes a preliminary estimate as a starting point for further analysis.

Figure 51:
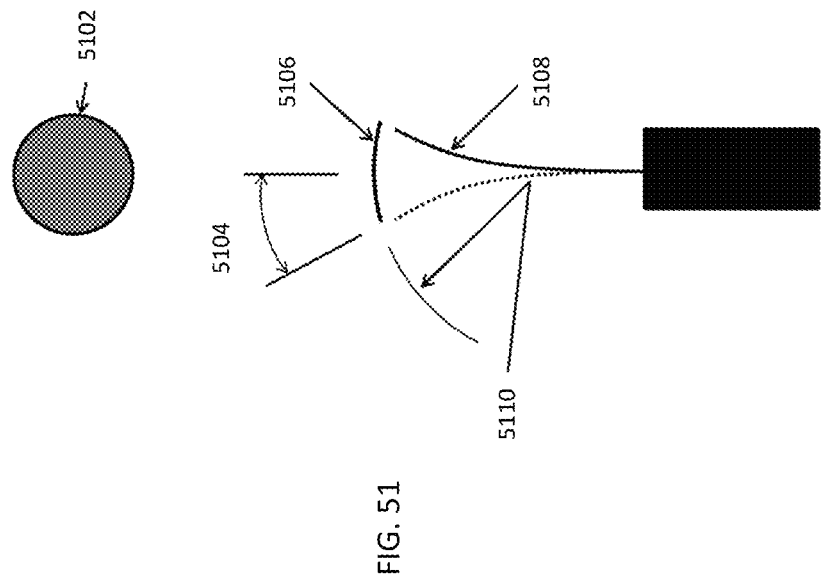
FIG. 51 illustrates a schematic representation showing a vibrating fiber geometry that affects optical designs in some embodiments.

To simplify the optical design, it may be desirable for the geometry of the scanning fiber to be mechanically proportional to that of the fiber in an existing FSD. The fiber cantilever may comprise an aspect ratio of about 29:1. The first-mode shape with a fixed input amplitude results in a scan angle of the vibrating fiber of about 18° from the optical axis. This scan angle helps to ensure that the field curvature may be reduced or minimized to facilitate the lens design. The scan radius for this fiber in the current example as shown in FIG. 51 is approximately 82% of the length of the fiber.

Using these parameters a guideline, an approximate fiber length may be estimated to produce the 6.2-mm diameter scan, which is about 12-mm. In FIG. 51, (5102) indicates the image field diameter when looking down at the fiber tip; (5104) indicates the scan angle; (5106) indicates the image field; (5108) indicates the vibrating fiber; and (5110) indicates the scan radius of curvature in this example. Once the scan frequency is determined from the space filling analysis, the scan frequency may be further used to determine the fiber mechanical parameters needed to achieve a resonant frequency equal to the required scan frequency. TABLE 19 is included in FIG. 51A and shows how, to first order, the fiber length may vary depending on the mode field diameter of the fiber cores in some embodiments. This fiber length is approximately comparable to the mechanical parameters that are driven by the scan frequency required for complete space filling at the desired frame rate.

Figure 52:
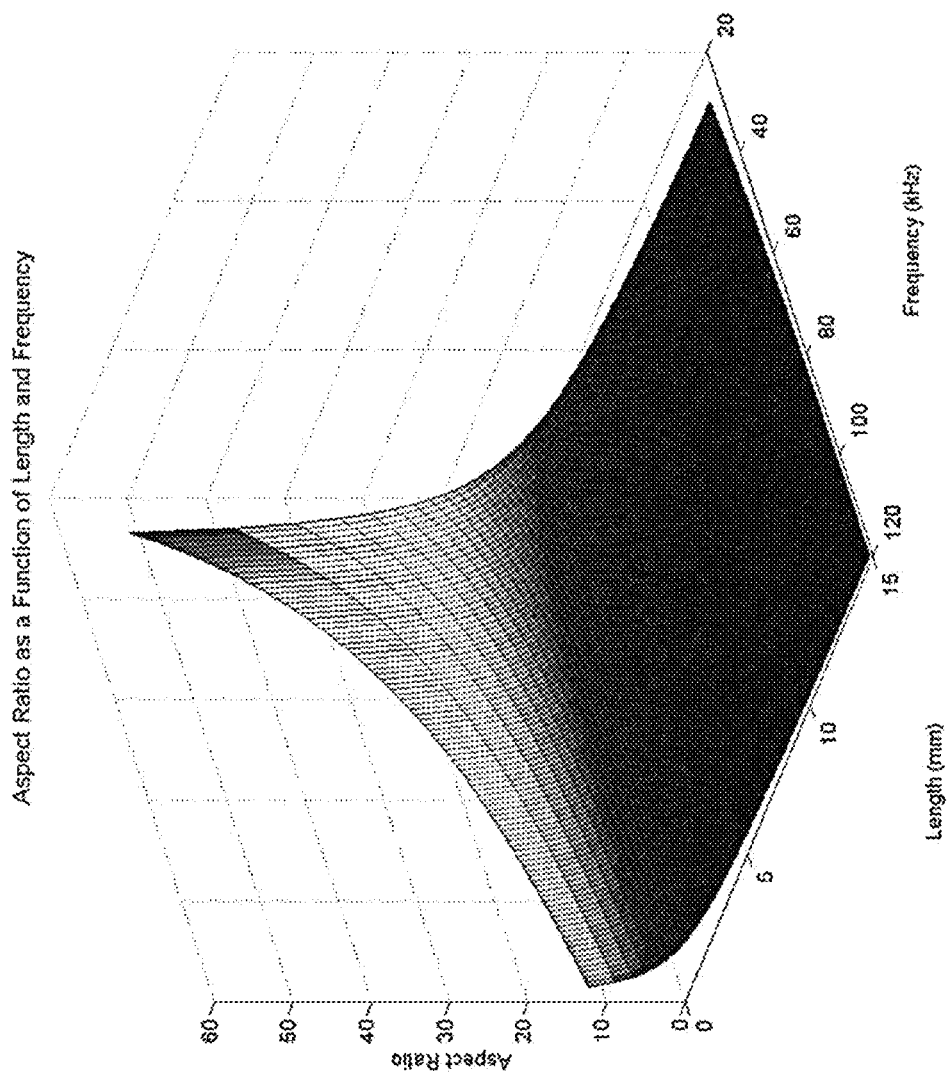
FIG. 52 illustrates an example of a surface plot showing a relation between the aspect ratio, resonant frequency, and the fiber length in some embodiments.
Figures 53A, 53B:
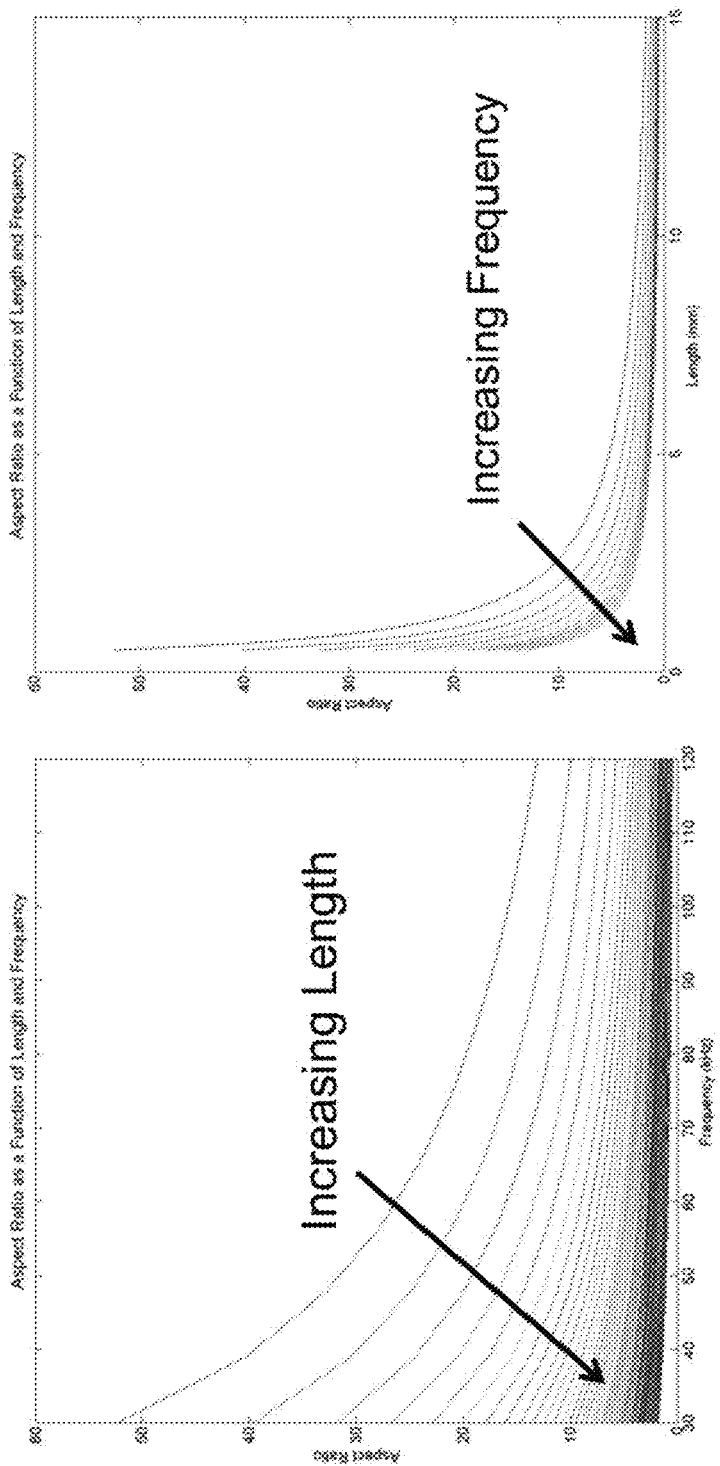
FIGS. 53A-B illustrate an example of the relations between the fiber length and the aspect ratio for a given frequency as well as between the resonant frequency and the aspect ratio for a given length in some embodiments.
Figure 54:
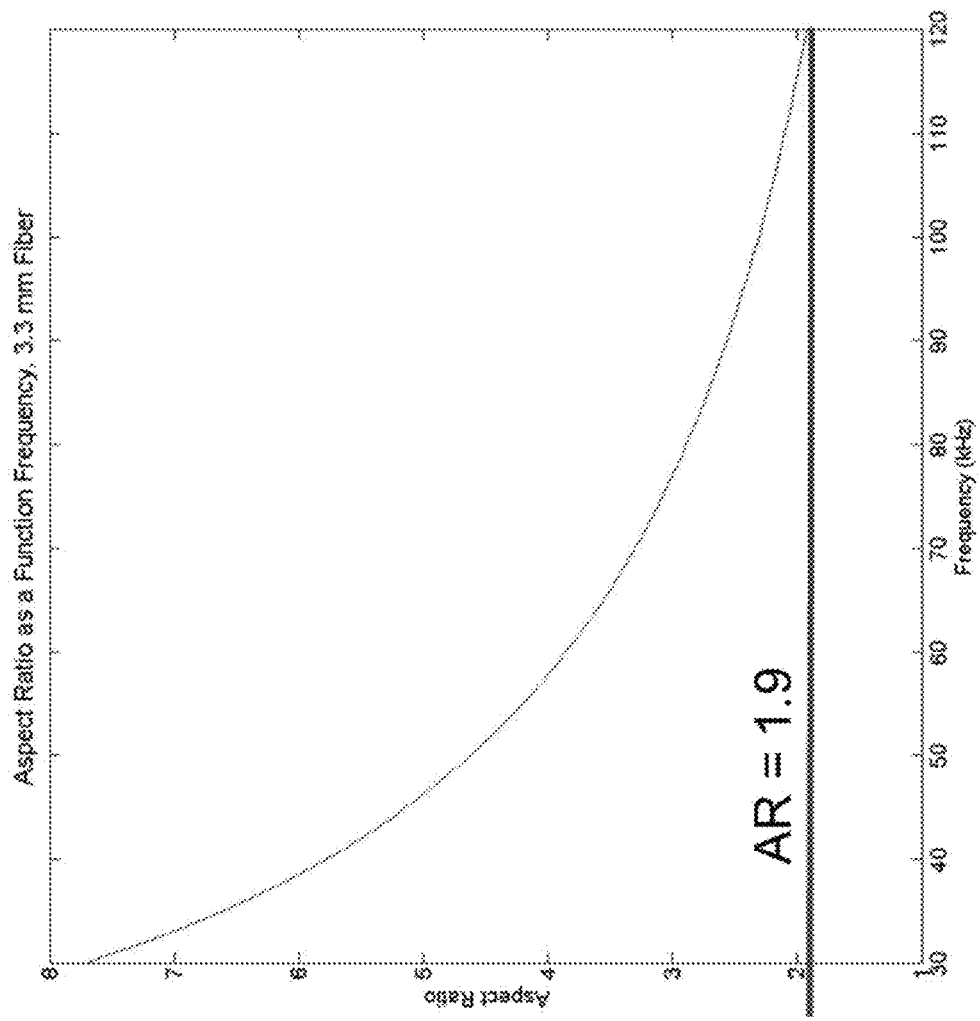
FIG. 54 illustrates an example of a plot of the relation between the aspect ratio and the resonant frequency of a fiber scanner in some embodiments.

FIG. 52 illustrates the relationship between the aspect ratio, the resonant scan frequency, and the fiber length. FIG. 53 breaks these relationships out in two-dimensional representations of the data from FIG. 52. It may be seen that for a given length of fiber, high resonant frequencies are produced at smaller aspect ratios. Similarly, for a given resonant frequency, increasing the fiber length may also drive the aspect ratio down. As the aspect ratio becomes smaller, resonating the cantilever at appreciable amplitude needs to be accounted for. For example, in order for an individual single-fiber single-core FSD with a 3.5 μm fiber to fill a 12-mm display with 5 MPx at 72 Hz, the desired or required scan frequency is about 118 kHz. At this extreme of the design space (e.g., single fiber, single core, large MFD, large scan field) with a cantilever length of 3.3 mm, the aspect ratio is 1.9:1 as illustrated in FIG. 54. Some embodiments are directed at optimize the scan frequencies to allow these constraints to meet their respective desired values.

Figure 55:
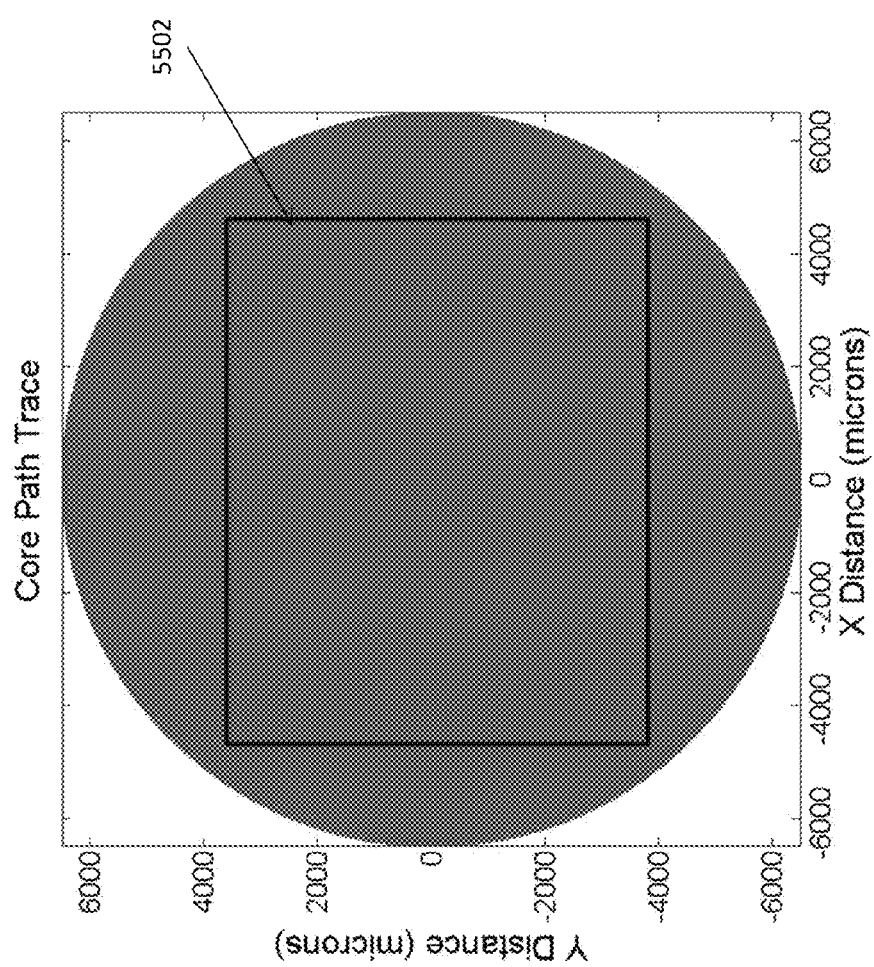
FIG. 55 illustrates an example of a 12-mm image field and the 13-mm diameter total scan field size of a seven-core fiber design in some embodiments.
Figure 56:
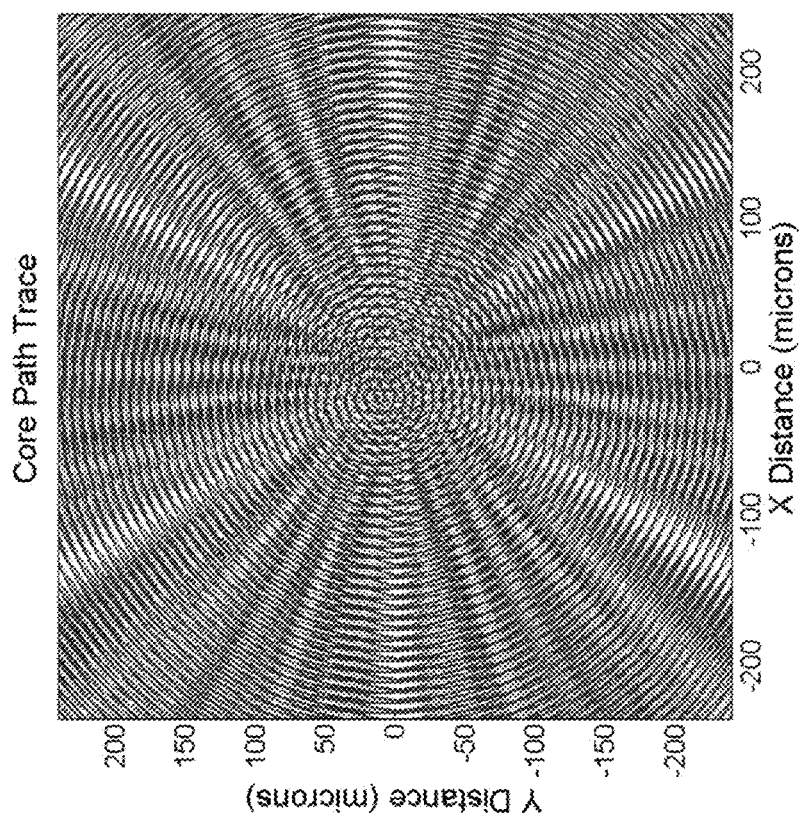
FIG. 56 illustrates an example of a core path trace at a mid-level zoom of a seven-core fiber design in some embodiments.
Figure 57:
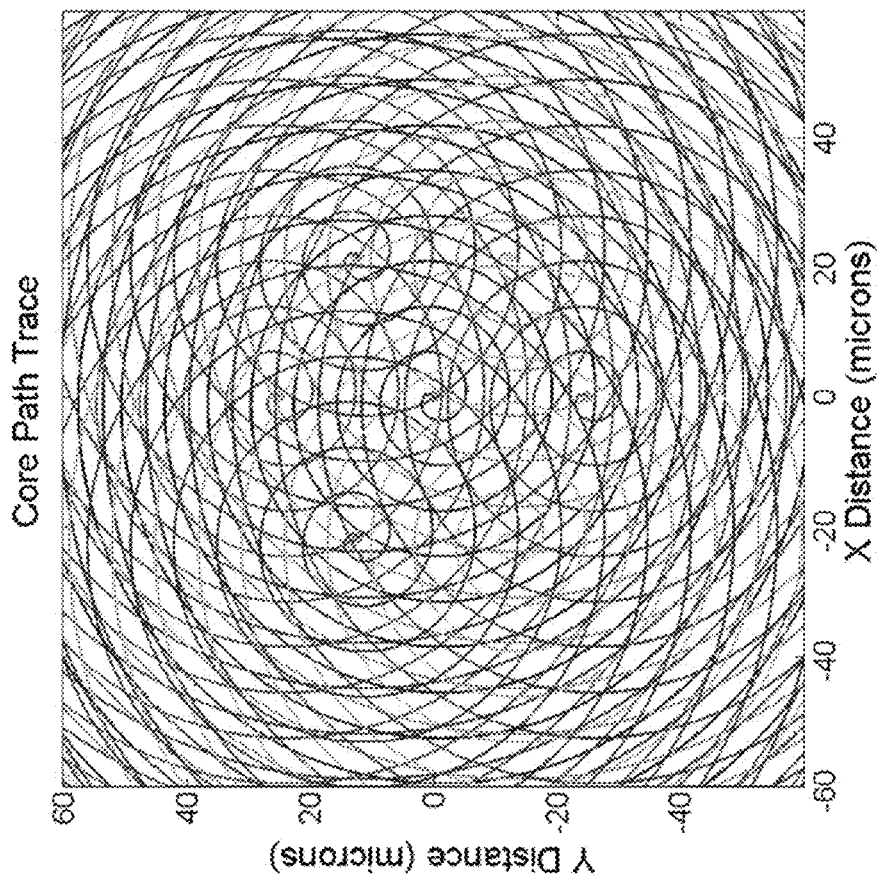
FIG. 57 illustrates an example of another core path trace at a close-up zoom of a seven-core fiber design in some embodiments.

In some embodiments, a spiral scan may be analyzed. The three free-parameters that are under control in the analysis include the core quantity, the core-core spacing, and the scan diameter step size, as seen at the image plane. The analysis is to increase or maximize the efficiency of the space filling and ensure complete coverage. Space filling efficiency refers to the minimization or reduction of redundant, overlapping pixels in some embodiments; and complete coverage means that each pixel in the display area is crossed at least once by a core center in some embodiments. A seven core fiber design with a large core spacing of 25 μm is first analyzed with the spiral radius increased by 8 μm every cycle and a scan frequency of 58 kHz. The core path trace may be seen in FIGS. 55-57. In FIG. 55, the full 12-mm diameter image field is shown (with 13-mm diameter total scan field size).

Figure 58:
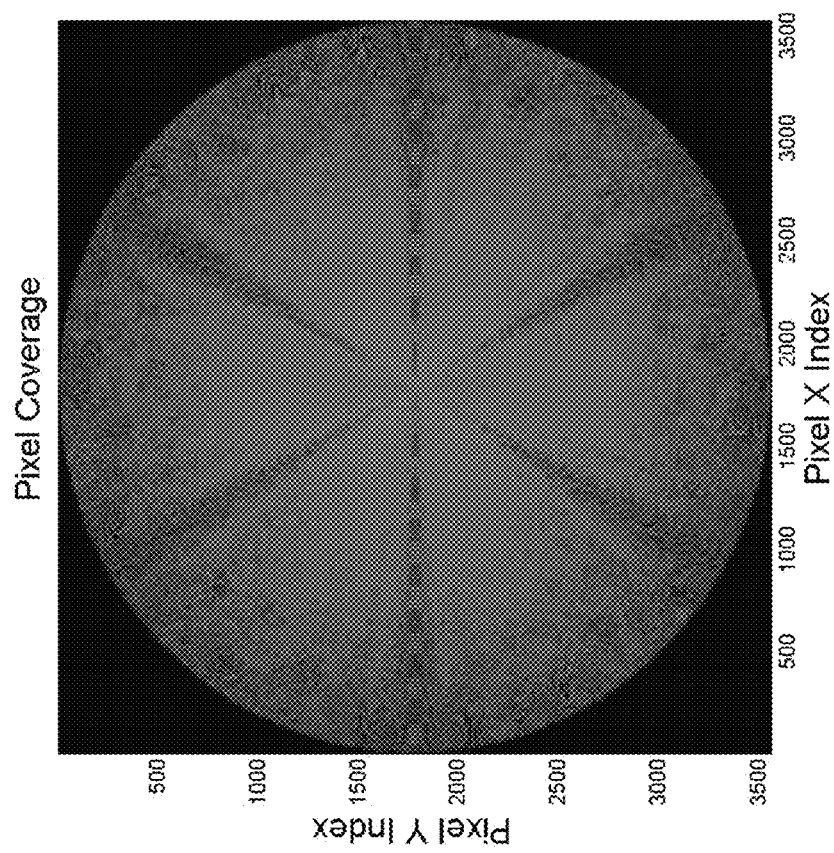
FIG. 58 illustrates an example of a pixel coverage map of a seven-core fiber design in some embodiments.
Figure 59:
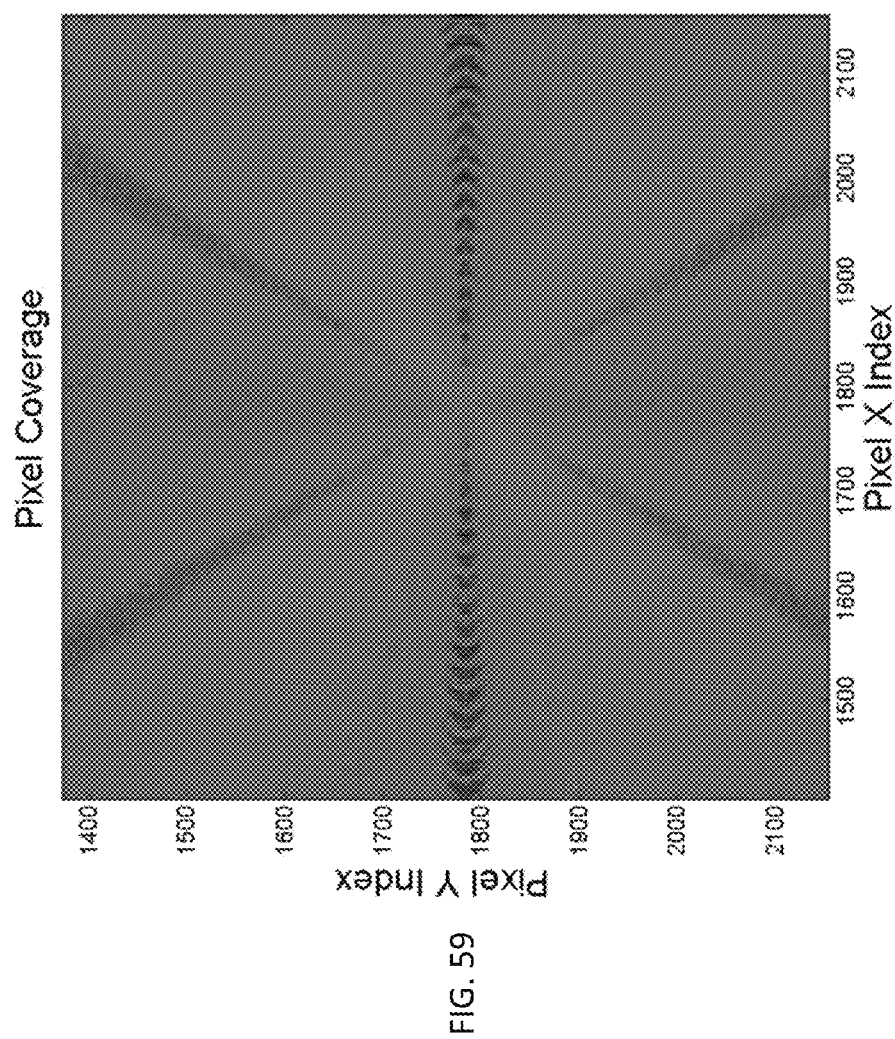
FIG. 59 illustrates another example of a pixel coverage map at a mid-level zoom of a seven-core fiber design in some embodiments.
Figure 60:
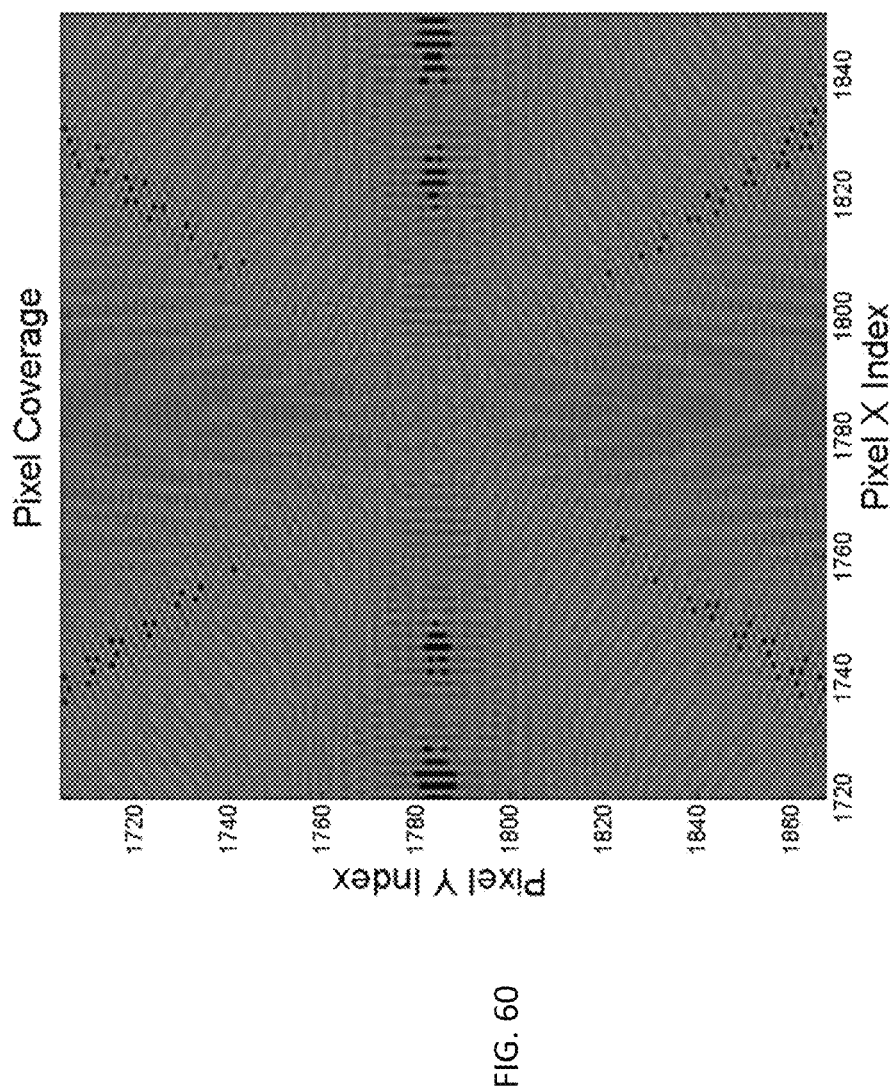
FIG. 60 illustrates another example of a pixel coverage map at a close-up zoom of a seven-core fiber design in some embodiments.

The black rectangle (5502) defines the boundary of the 12-mm diagonal display area with 5:4 aspect ratio. At the level of magnification in FIG. 56, no detail of the path may be seen, but magnifying the center region of the plot (e.g., FIGS. 56-57) reveals the detail of the overlapping core paths in the spiral pattern. Close inspection of the pixel coverage map (e.g., FIGS. 58-60) reveals that there are missing pixels in the image field, represented by black pixels in the map. On the other hand, other regions receive a much higher density of scan lines. For the ease of illustration, shades of gray denote the pixels that have been crossed by a core path at least once. Complete coverage of the image field for a seven core spirally scanned fiber may be obtained by reducing the spacing between scan spirals and increasing the scan frequency, to cover the black pixels, but this may result in greater overrepresentation of scan lines in other parts of the image, lowering space filling efficiency.

Figure 61:
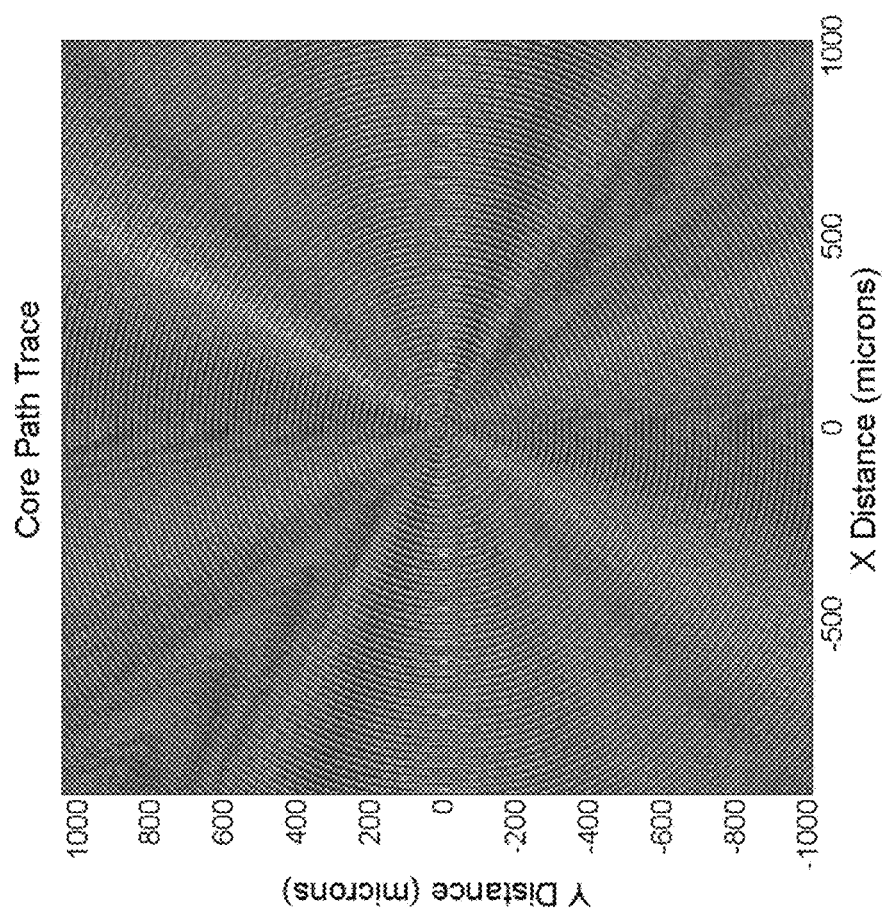
FIG. 61 illustrates an example of a core path trace at a mid-level zoom of a nineteen-core fiber design in some embodiments.
Figure 62:
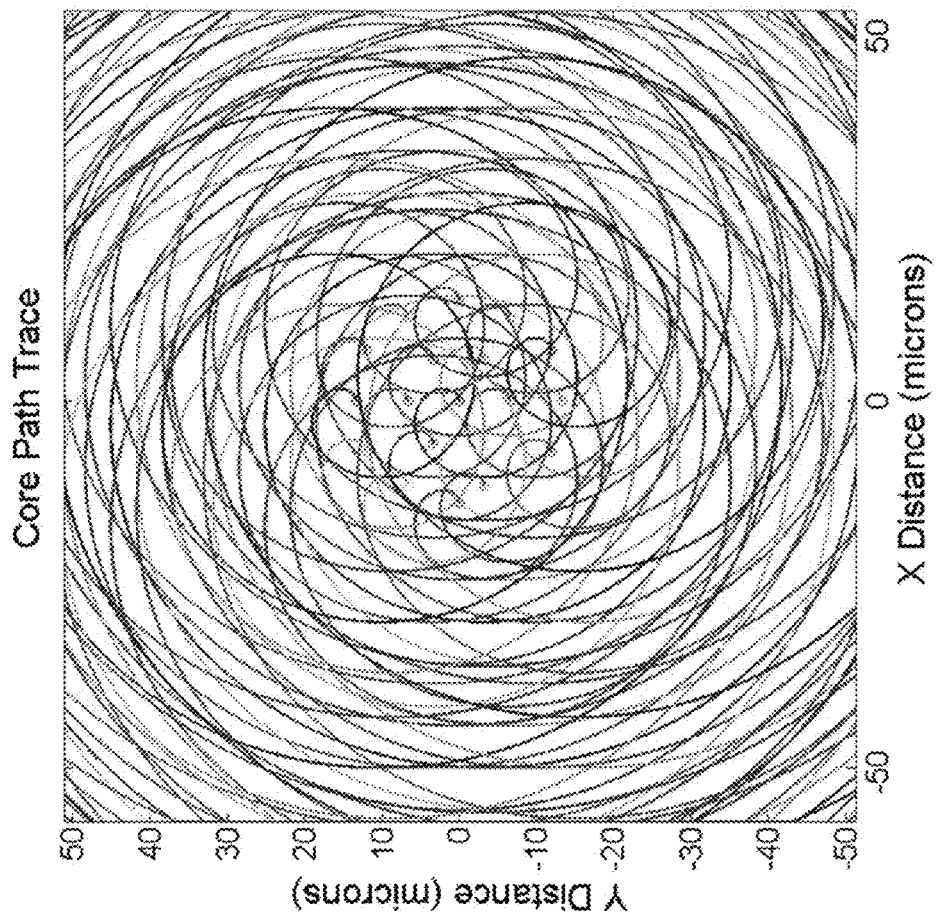
FIG. 62 illustrates an example of another core path trace at a close-up zoom of a nineteen-core fiber design in some embodiments.
Figure 63:
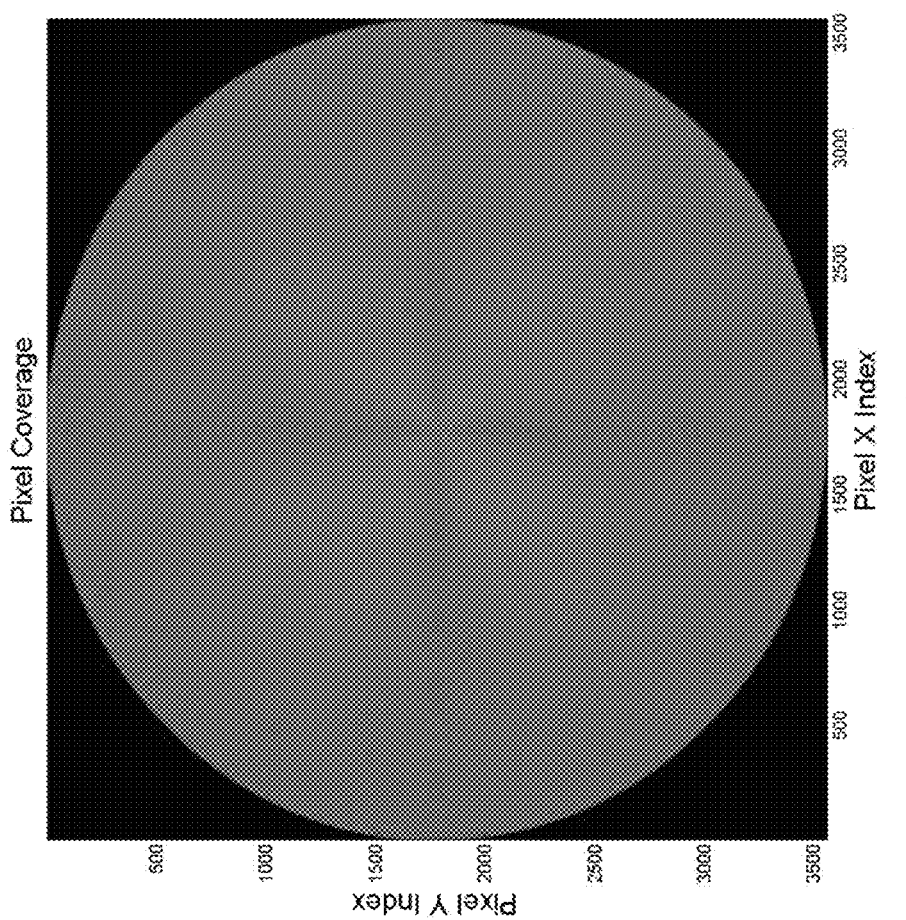
FIG. 63 illustrates an example of a pixel coverage map of a nineteen-core fiber design in some embodiments.
Figure 64:
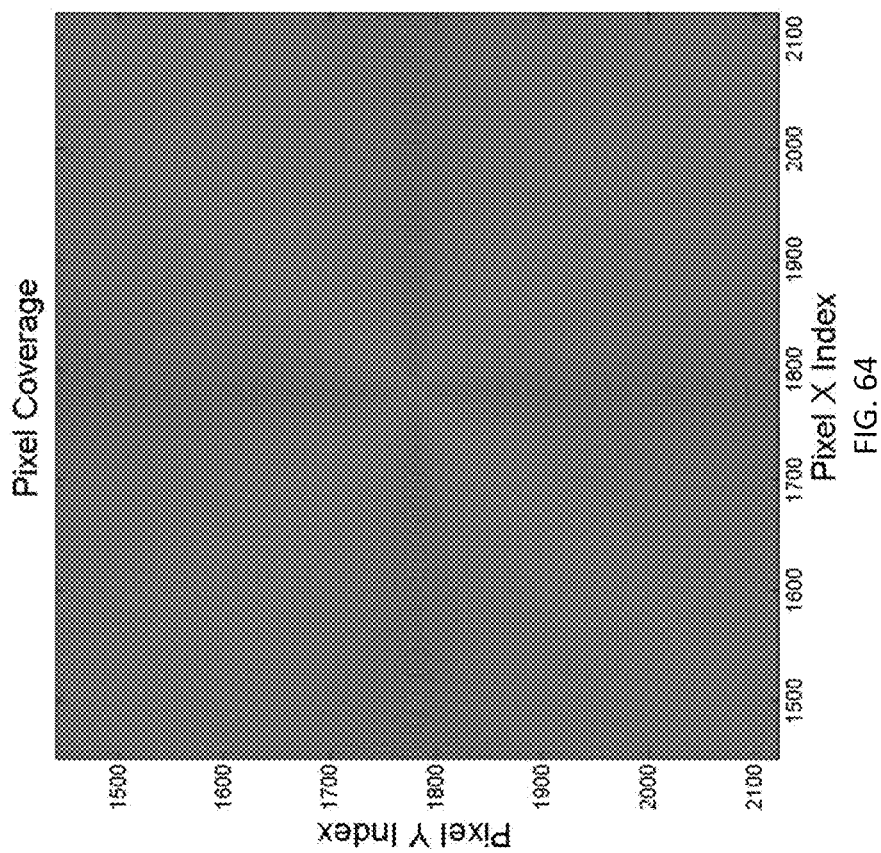
FIG. 64 illustrates another example of a pixel coverage map at a mid-level zoom of a nineteen-core fiber design in some embodiments.
Figure 65:
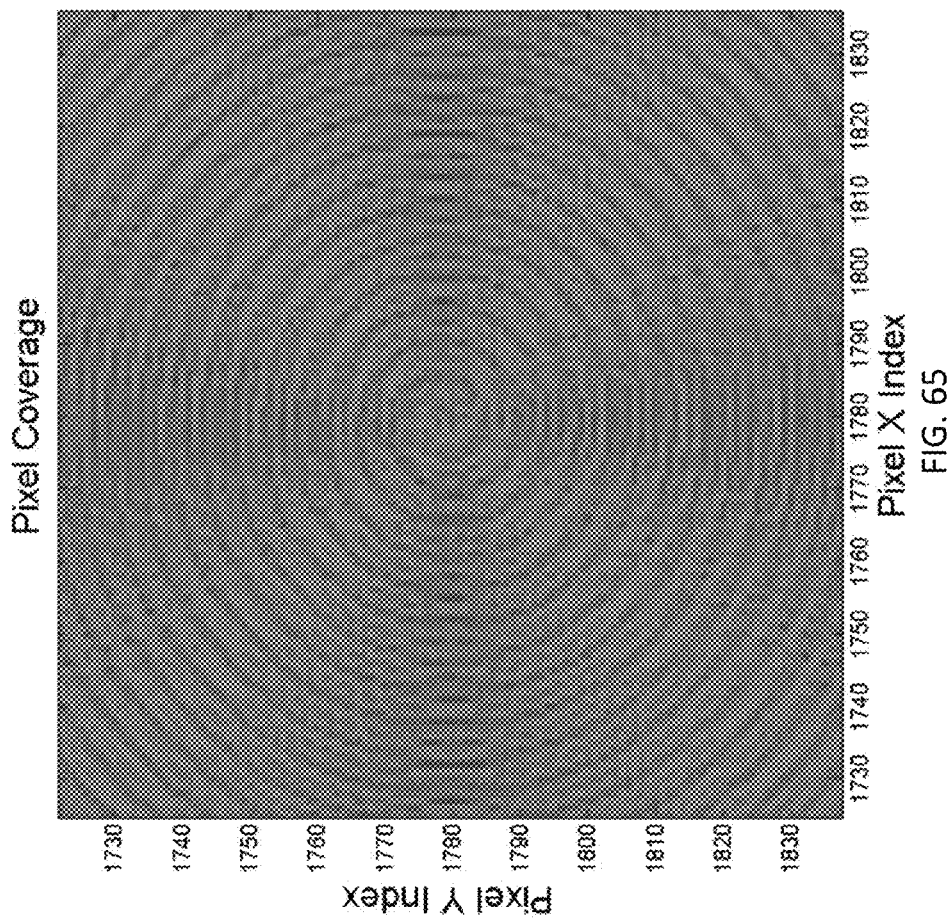
FIG. 65 illustrates another example of a pixel coverage map at a close-up zoom of a nineteen-core fiber design in some embodiments.

Alternatively, complete pixel coverage may be achieved using a spiral scan by increasing the number of cores, and thus reducing the spacing to stay within a desired total outer fiber diameter. For example, increasing the number of cores to 19, and reducing the core spacing to 7 μm, while loosening the radial spiral growth to 20 μm, results in a much denser scan. The full field core trace for 19 cores appears identical or similar to that for 7 cores, but magnified detail is shown in FIGS. 61-62. The pixel coverage for this arrangement is complete and shown in FIGS. 63-65. While every pixel is filled, a drawback with this arrangement is the increased number of modulatable light channels that may be needed to support a larger number of cores. These analyses suggest that overlapping spiral scan patterns may underrepresent some regions while over-represent others. On the other hand, the Lissajous scan pattern may be overlapped with greater efficiency.

Figure 66:
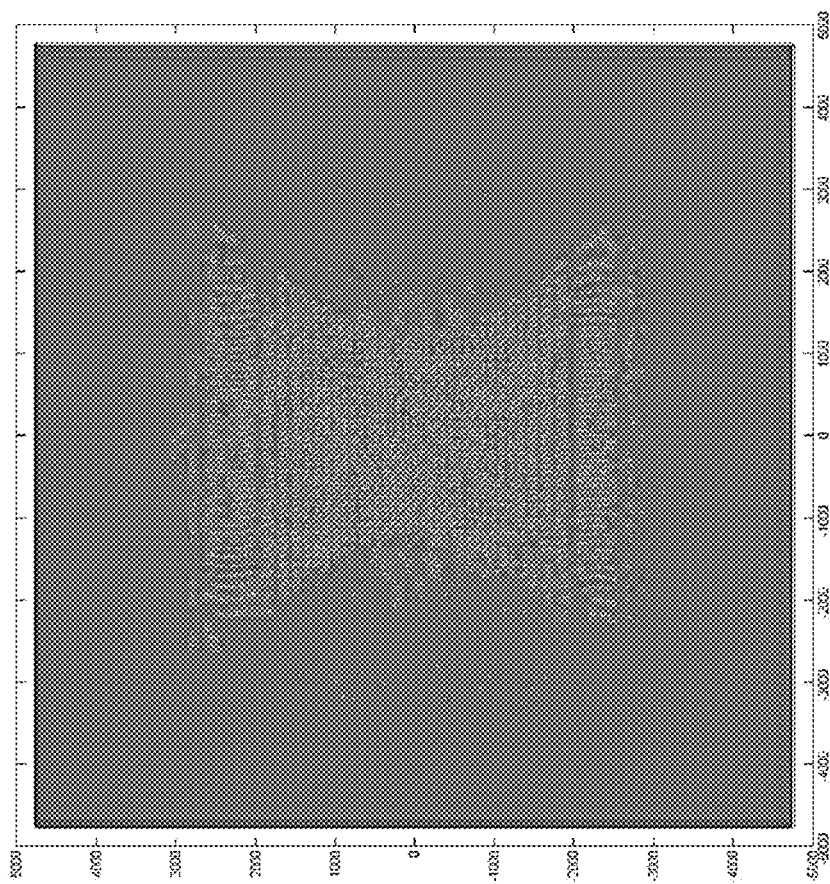
FIG. 66 illustrates an example of the Lissajous path trace for a seven-core Lissajous scan pattern with approximate scan frequencies of about 38 kHz in some embodiments.
Figure 67:
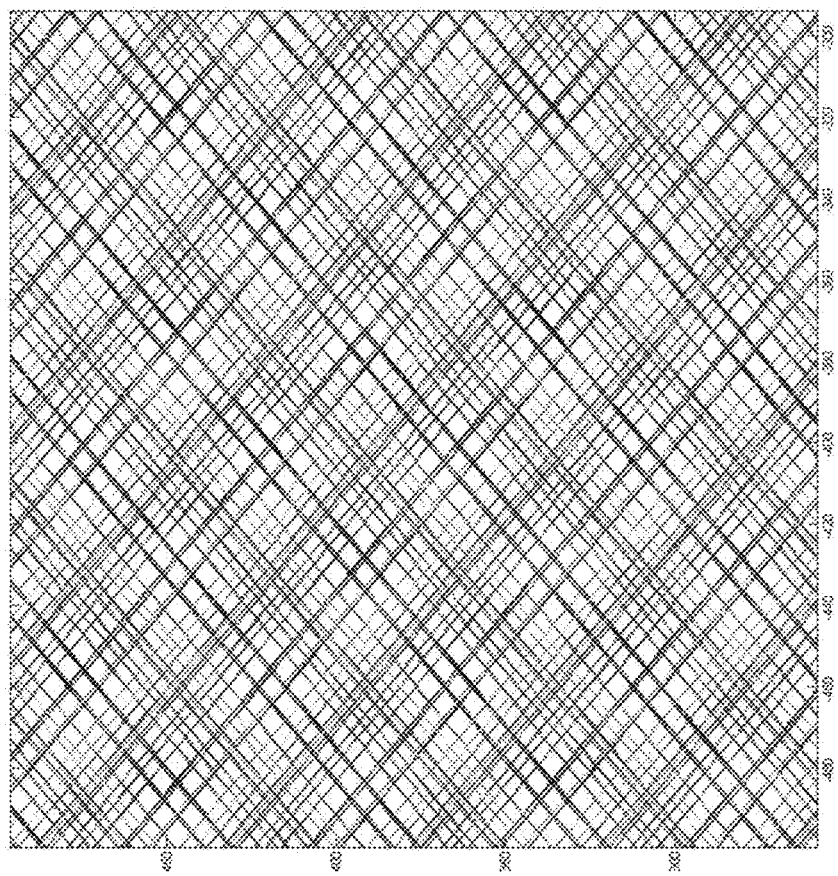
FIG. 67 illustrates an example of the Lissajous path trace for a seven-core Lissajous scan pattern at a close-up zoom level with approximate scan frequencies of about 38 kHz in some embodiments.
Figure 68:
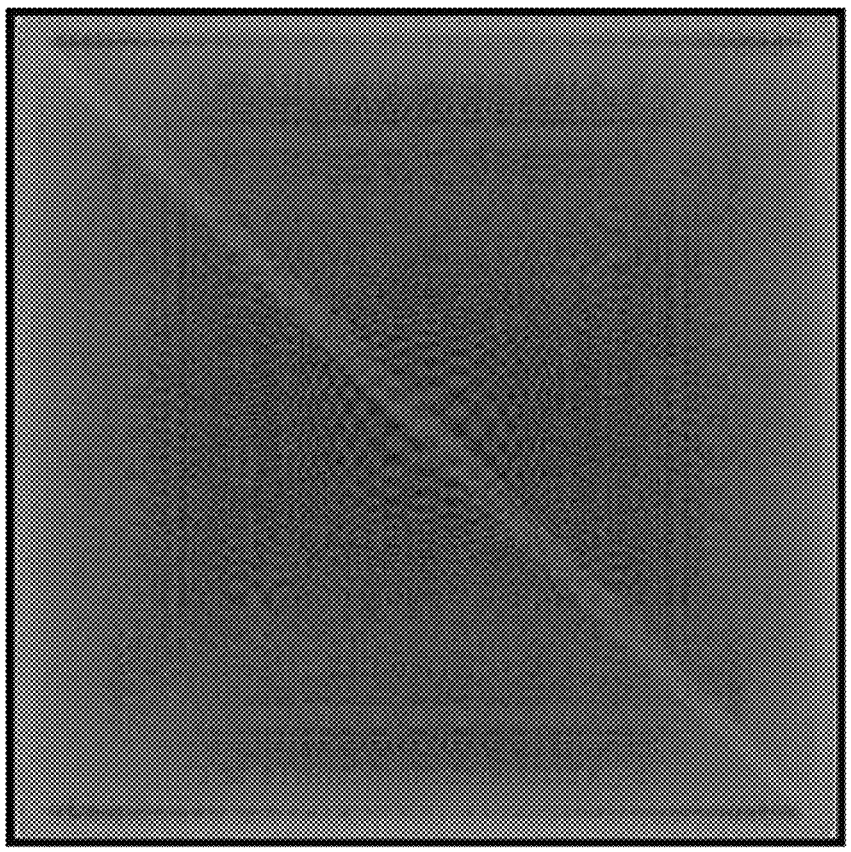
FIG. 68 illustrates an example of a pixel coverage map for a seven-core Lissajous scan pattern with approximate scan frequencies of about 38 kHz and 17 μm core spacing in some embodiments.
Figure 69:
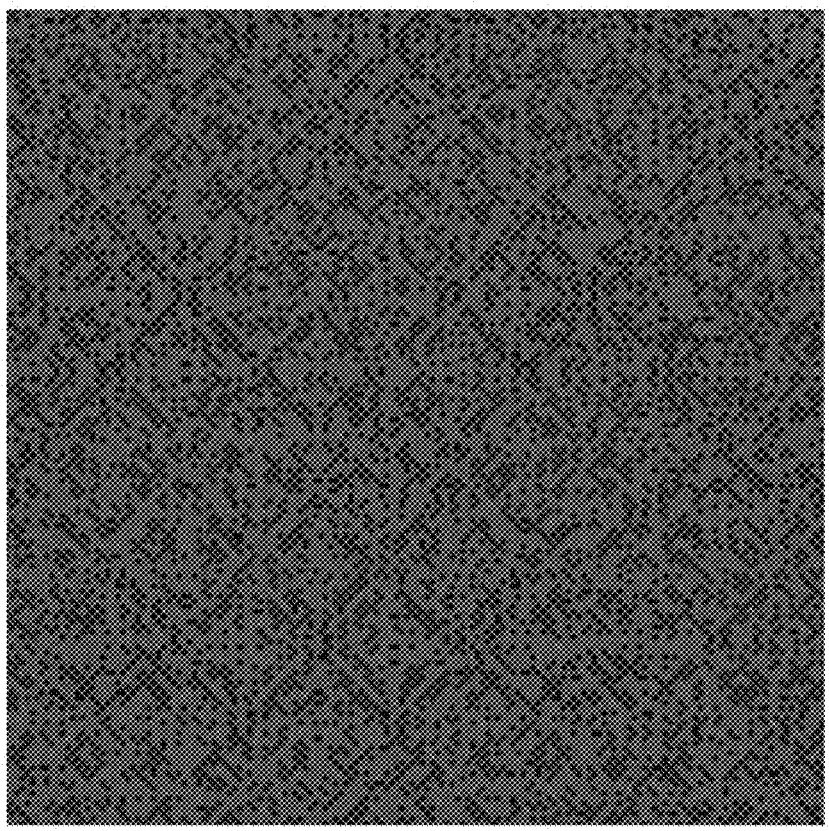
FIG. 69 illustrates a close-up region in the pixel coverage map illustrated in FIG. 68 in some embodiments.

Refinement of the Lissajous scan pattern analysis has yielded good results. Using an example with the 7-core pattern, nearly complete coverage is achieved at scan frequencies of approximately 38 kHz. FIG. 66 shows the path trace for this pattern, which as in the case of the spiral pattern is too dense to see any detail without magnifying a region of the plot as shown in FIG. 67. The resulting coverage shown in FIG. 68, while dense, exhibits a crisscrossing pattern of missing pixels in the close-up as shown in FIG. 69. Similar patterns are also evident in the close-up view of the path trace shown in FIG. 67, which shows uneven spacing of the core paths. The simulation is next tuned to ensure that the core geometry is used efficiently.

Figure 70:
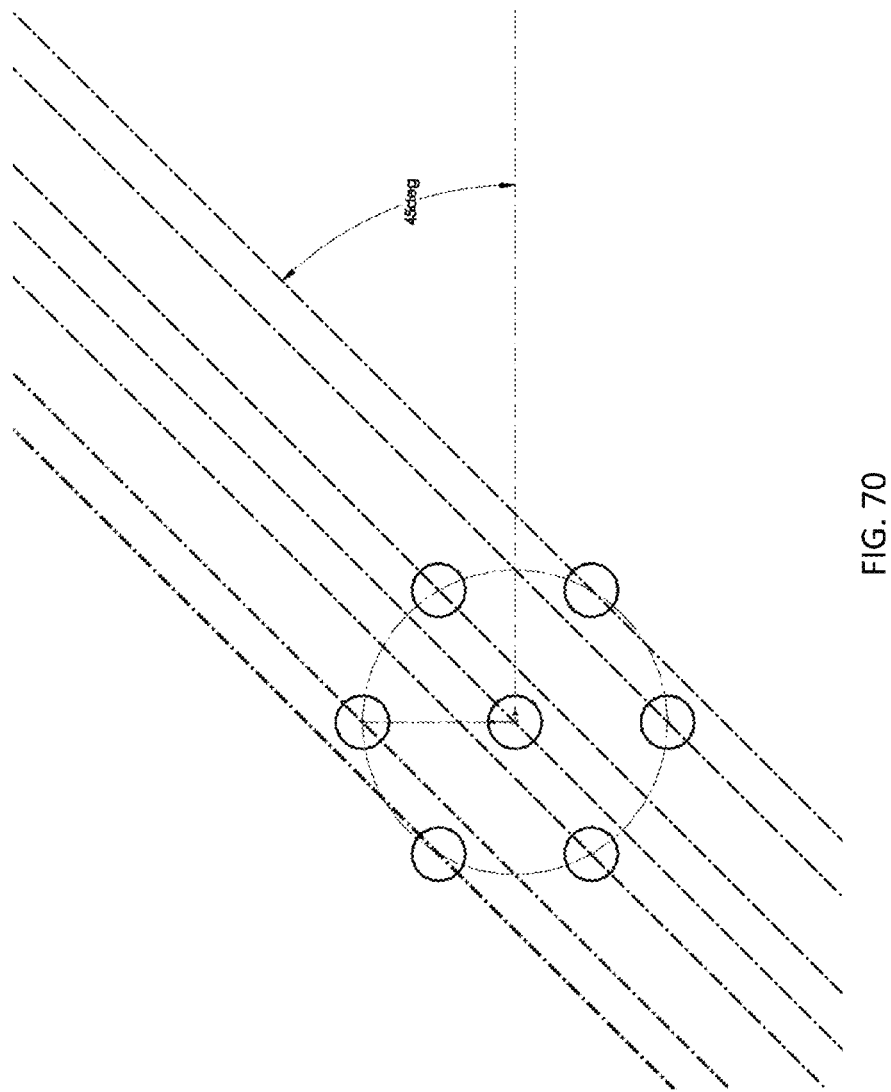
FIG. 70 illustrates a 45-degree scan angle between the core pattern and the slope of the Lissajous scan with no rotation of the core pattern in some embodiments.
Figure 71:
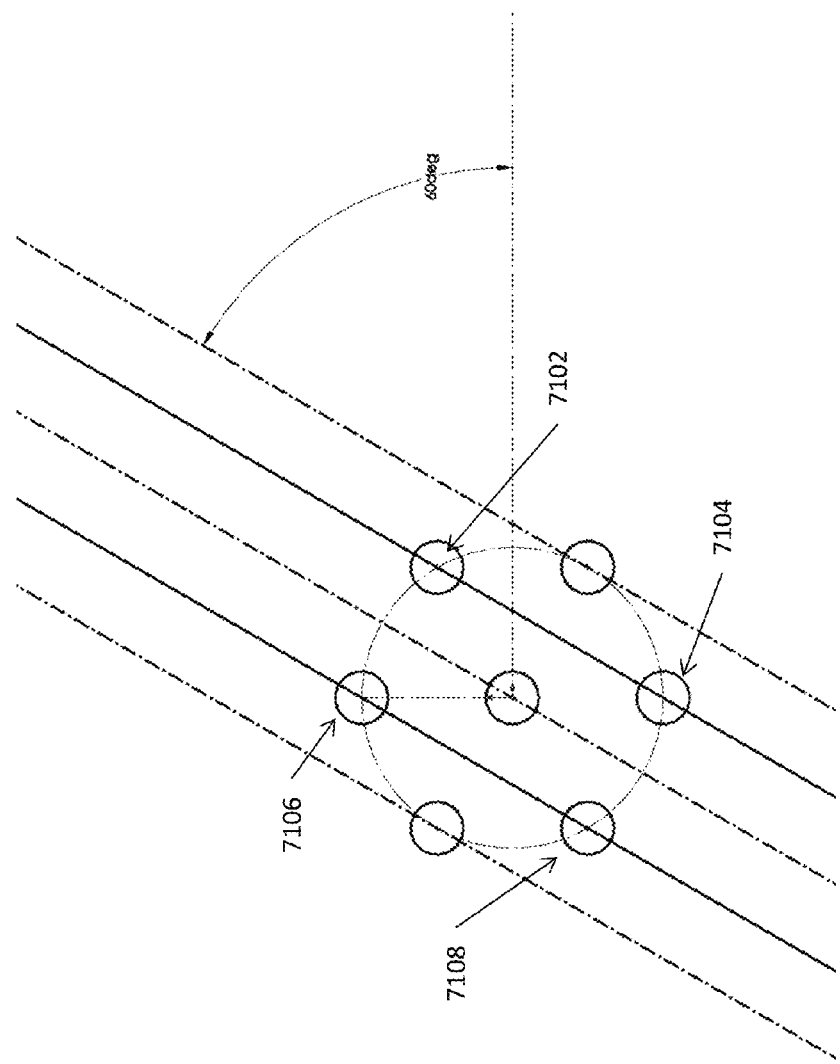
FIG. 71 illustrates a 60-degree scan angle between the core pattern and the slope of the Lissajous scan with no rotation of the core pattern in some embodiments.
Figure 72:
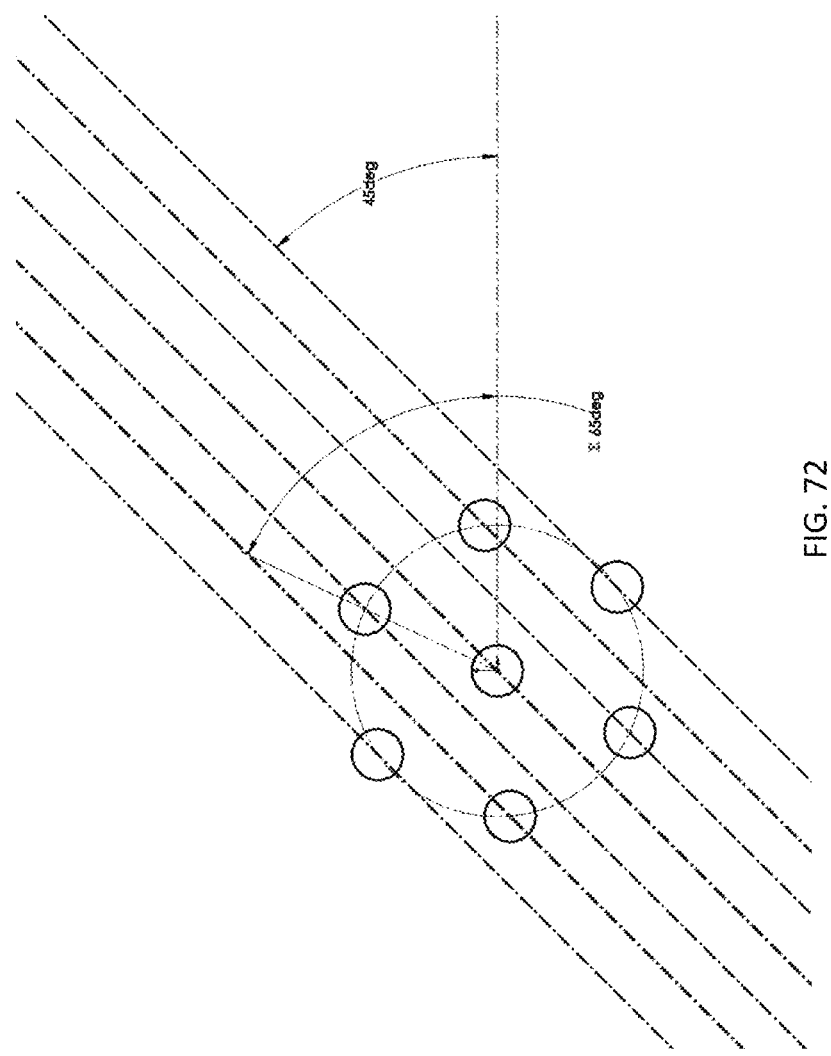
FIG. 72 illustrates a 45-degree scan angle between the core pattern and the slope of the Lissajous scan with a 20-degree rotation compensation of the core pattern in some embodiments.
Figure 73:
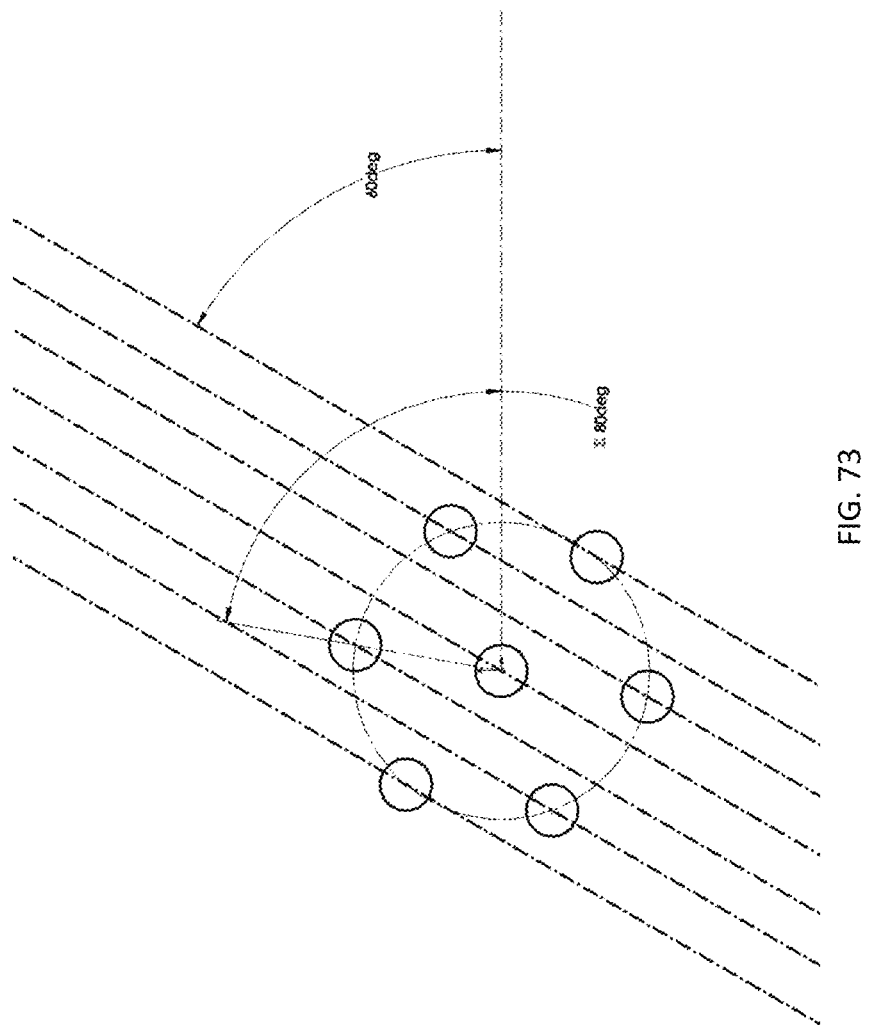
FIG. 73 illustrates a 60-degree scan angle between the core pattern and the slope of the Lissajous scan with a 20-degree rotation compensation of the core pattern in some embodiments.

The angle that the core pattern makes with respect to the slope of the Lissajous scan determines the spacing of the core paths in some embodiments. FIG. 70 illustrates a scan angle of 45 degrees, with no additional rotation of the core pattern. The result is that the traces of the individual cores group with a varying periodicity. At 60° as shown in FIG. 71, some cores (e.g., (7102) and (7104) as well as (7106) and (7108)) line up, reducing their efficacy for space filling. By rotating the orientation of the cores relative to the scan angle, uniform periodicity may be ensured between each core's path trace. For example, for an even hexagonal lattice of 7 cores, a rotation angle of the cores of 20° relative to the scan line angle produces even spacing between scan lines as shown in FIGS. 72-73. The angle that the core pattern must make with the scan angle may vary depending on the geometric arrangement of the cores (e.g., a hexagonal-pattern, circular, square, etc.)

Figure 74:
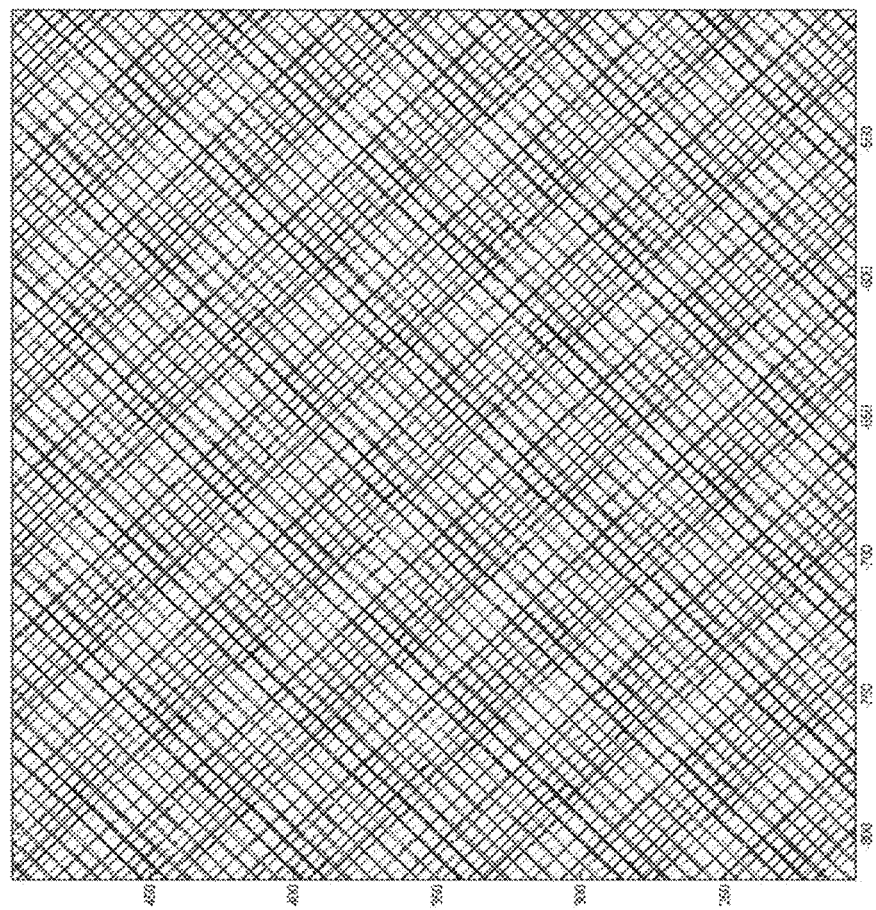
FIG. 74 illustrates an example of a close-up view of tuned core trace for 38 kHz scan frequencies and 17 μm core spacing with a 20-degree rotation compensation of the core pattern in some embodiments.

After tuning the scan, a close-up view of the new path trace reveals that the core paths are spaced more uniformly as shown in FIG. 74. Similarly, a close-up view of the pixel coverage shown in FIG. 75 now shows that the coverage is more uniform (though some periodicity in the missing pixels is still evident). This periodicity may be due to the fact that a standard Lissajous pattern may not scan in perfectly straight scan lines, but rather subtly curved scan lines with increased curvature at the periphery of the scan and straighter lines at the center of the scan. While a Lissajous pattern does not produce a perfect space filling efficiency, a Lissajous scan pattern may be significantly more efficient than a spiral scan pattern. Additional refinements may further lead to an improved or optimal balance between core spacing, orientation, and scan frequency to achieve full pixel coverage while increasing or maximizing space filling efficiency.

Besides the optical design performance, image quality in the FSDs may also depend on pixel modulation considerations. For both the tiled-array approach and the multi-core fiber enhancement, the pixels may be modulated such that the entire image space is efficiently utilized and the pixels are homogenous through the display in some embodiments. In a scanned beam display system, the rise and fall time of the modulated light source may constrain the spot size along the axis of the scan. Because the fiber tip is vibrating at a higher velocity near the outside of the scan than in the middle of the scan, a given modulation rate and pulse duration that yields individual pixels near the center may result in blurred pixels in the outer regions of the scan.

Figure 76:
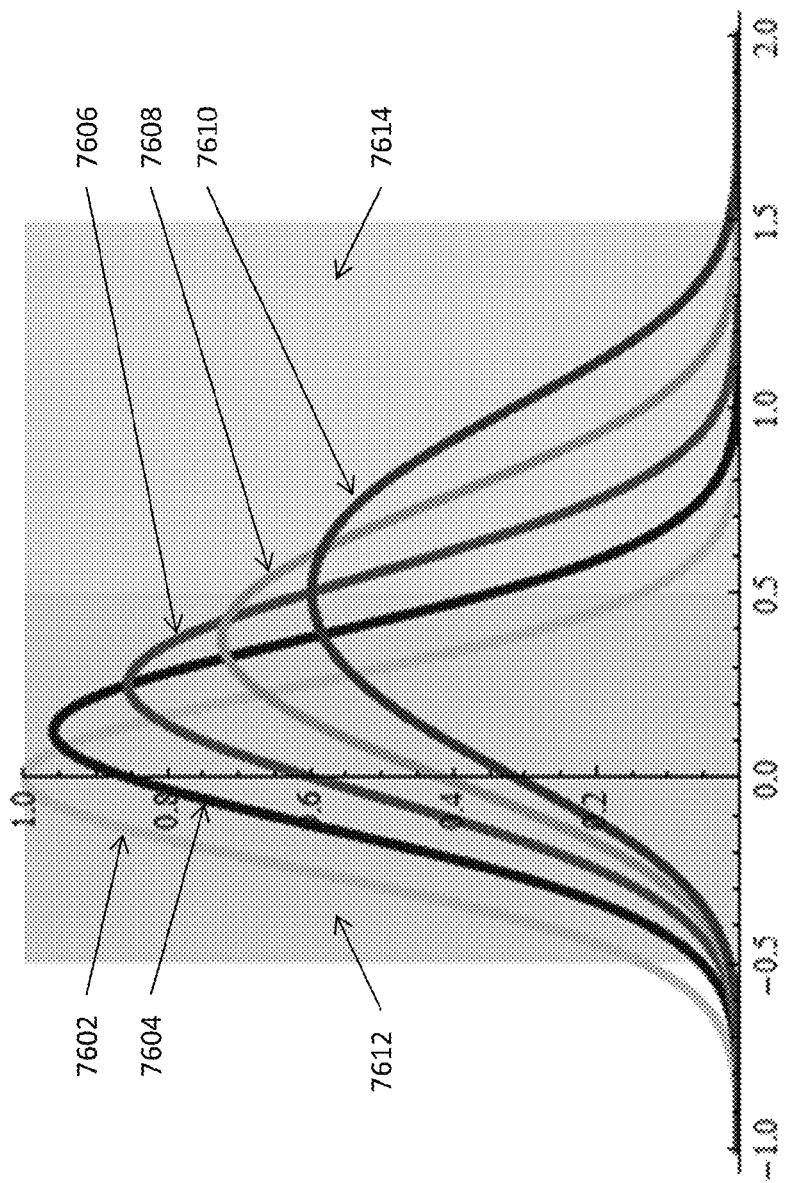
FIG. 76 illustrates an example of pixel motion blur for various pulse durations in some embodiments.

FIG. 76 illustrates this pixel motion blur for various pulse durations where the grey region (7612) and pink region (7614) designate adjacent pixels. It can be seen that longer pulse durations result in 'bleeding' of one pixel into the space of the next. Additionally, because there are more pixels near the outside vs. the inside of the scan, the modulation rate will need to vary from inside to outside. In FIG. 76, (7602), (7604), (7606), (7608), and (7610) denote different pulse durations. As discussed earlier, the Michelson contrast provides a metric for the relationship between the Gaussian beam diameter and the pixel pitch. For example, a GBD that is twice the pixel pitch will result in a Michelson contrast of 0.574.

Figure 79:
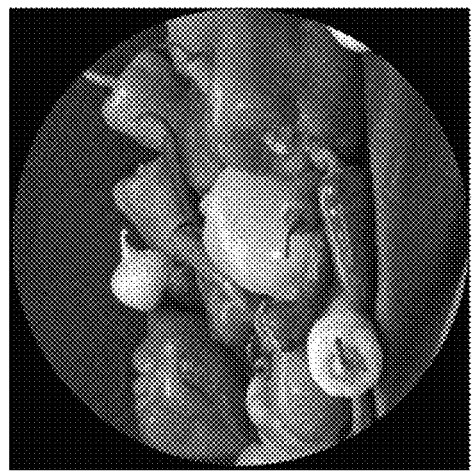
FIG. 79 illustrates a simulated image with the mode field diameter (MFD) to pixel pitch of 2:1 the original image illustrated in FIG. 77 in some embodiments.
Figure 78:
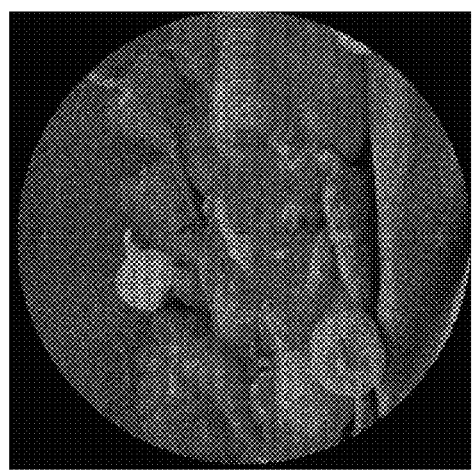
FIG. 78 illustrates a resampled image with a spiral scan pattern of the original image illustrated in FIG. 77 in some embodiments.
Figure 77:
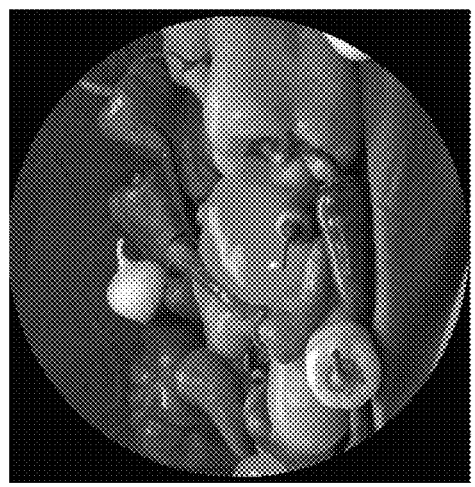
FIG. 77 illustrates an original image in a circular field in some embodiments.

The effect on the image quality may be simulated by modeling a Gaussian blur to each pixel in the spiral image. FIG. 77 shows an original image to be projected using the fiber scanner. The image is then mapped to a spiral scan pattern with the desired pixel pitch, shown in FIG. 78. Note that the resampled image is at a resolution of about ⅓ the original in this example, but this is not intended to display anticipated image quality of the display. Rather, this is to illustrate tools that analyze the display. By applying a Gaussian blur to the pixels, equivalent to the MFD-to-pixel-pitch ratio corresponding to the Michelson contrast to be evaluated, the image quality of a display with that contrast may be simulated as shown in FIG. 79 with the MFD to pixel pitch ratio of 2:1 and the Michelson contrast of about 0.57.

Figure 80:
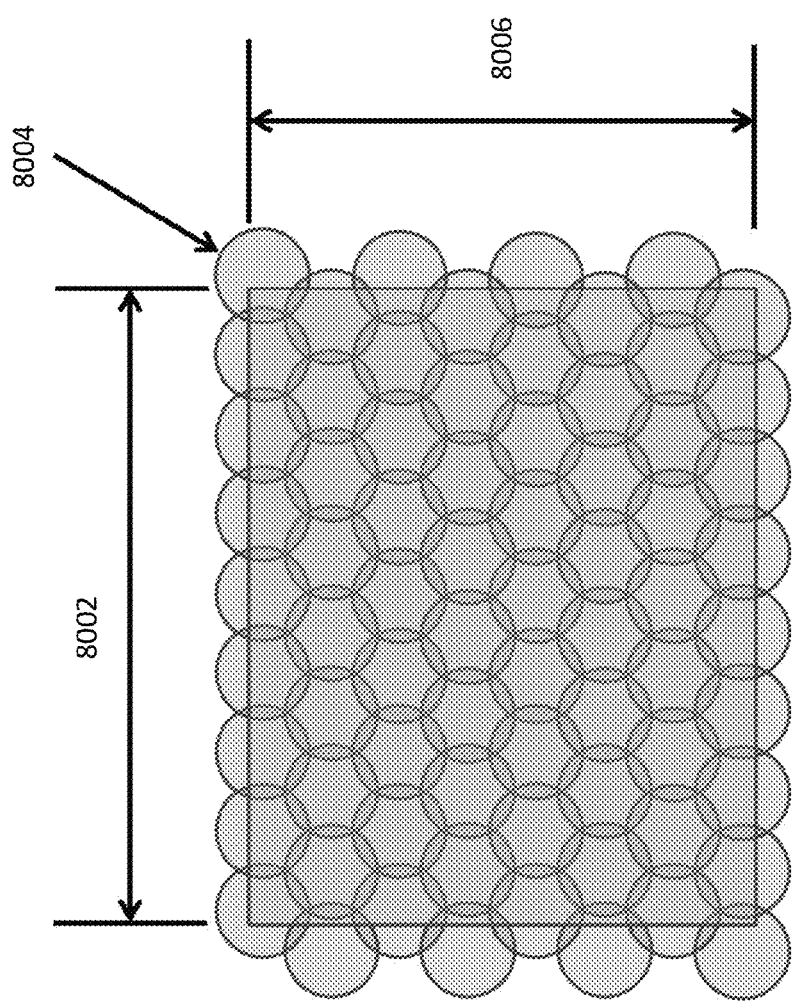
FIG. 80 illustrates a schematic representation of a fiber scanned display (FSD) tiled projector array having 72 fiber scanners in some embodiments.

In some embodiments, the opto-mechanical design for the 14 kHz fiber scanner including 72 individual fiber scanner projectors (8004) results in a 5:4 ratio display of 5.24 MPx, and 72 Hz refresh rate. The display includes a 12-mm diagonal with dimensions (8002) (H)×(8006) (V) (e.g., 9.37 mm (H)×7.50 mm (V)) as shown in FIG. 80. The fiber scanners are stacked together in a close packed hexagonal pattern in eight staggered rows of nine scanners in each row in this example illustrated in FIG. 80. The assembly of scanners is wrapped in a thin elastomeric sleeve that provides both damping to the assembly and a tolerance cushion between the outer housing and the scanner bodies.

This assembly is then potted into an outer housing, and the piezo drive leads and optical fibers are bound and pigtailed into a strain-relieved cable bundle affixed to the outside of the outer housing. An anti-reflection coated glass window mask is inserted into the front face of the display. The window serves to hermetically seal the scanner array from the environment, as well as to block stray light and reflections from the scanner bodies, tube edges, etc. The entire assembly (not including total cable length) is approximately 12 mm (8306)× 12.25 mm (8302)×15 mm (8304) and weighs approximately 4 g.

Figure 81:
FIG. 81 illustrates a perspective view of a fiber scanned display (FSD) tiled projector array assembly having 72 fiber scanners in some embodiments.
Figure 82:
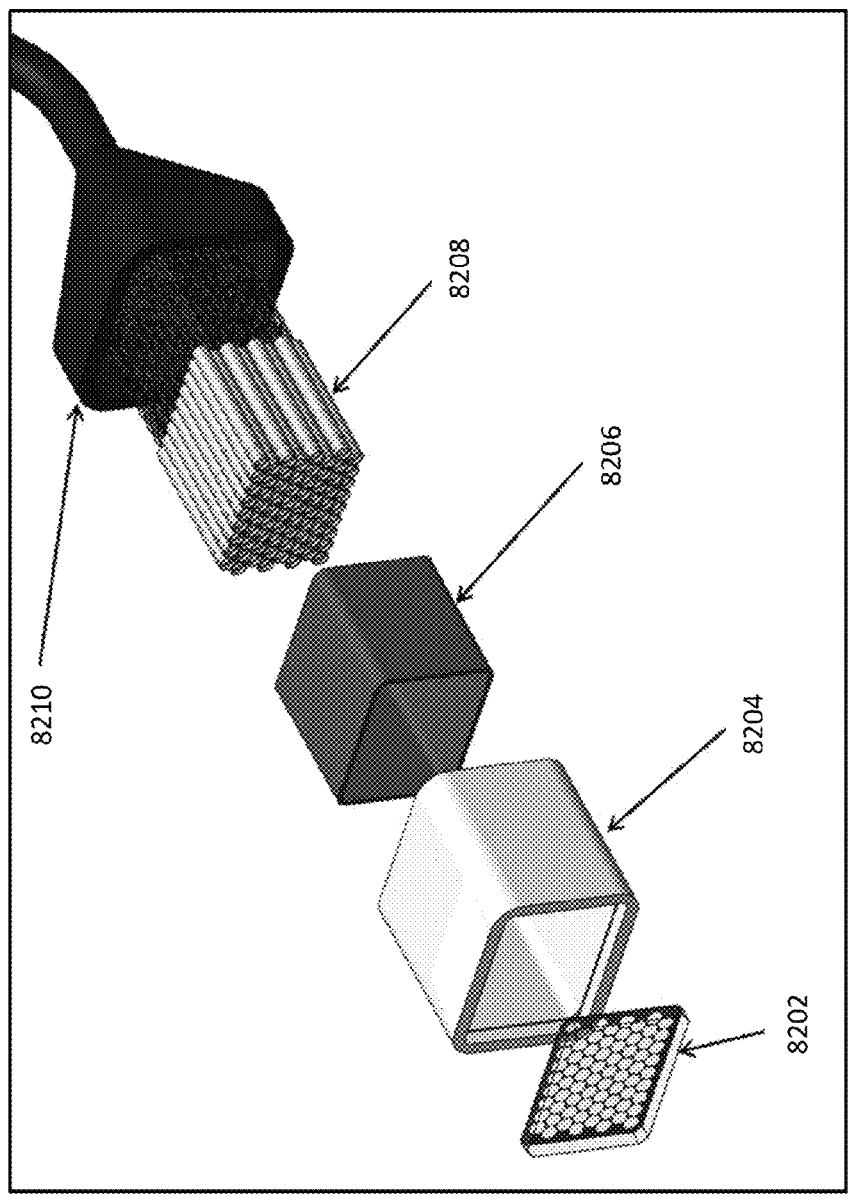
FIG. 82 illustrates an exploded view of the FSD tiled projector array assembly illustrated in FIG. 81 in some embodiments.
Figure 83:
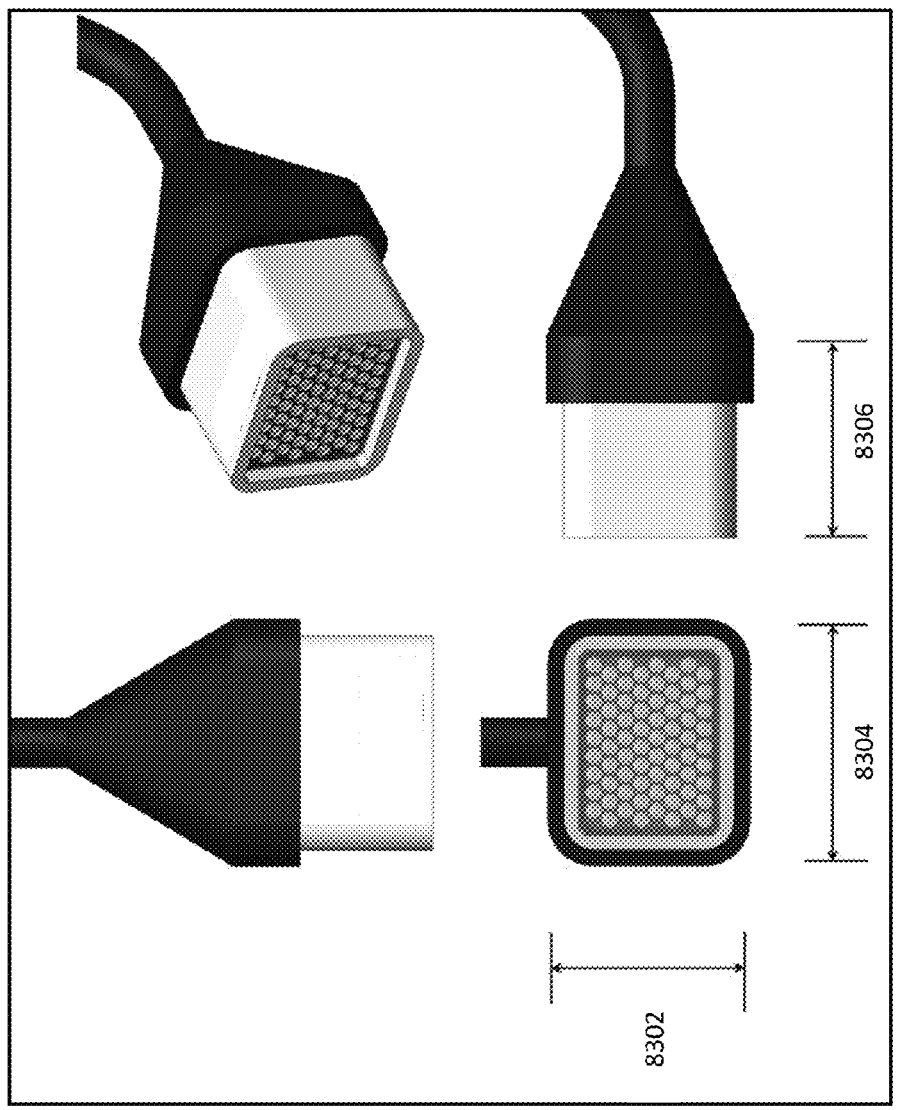
FIG. 83 illustrates dimensions of the FSD tiled projector array assembly illustrated in FIGS. 81 and 82 in some embodiments.
Figure 84:
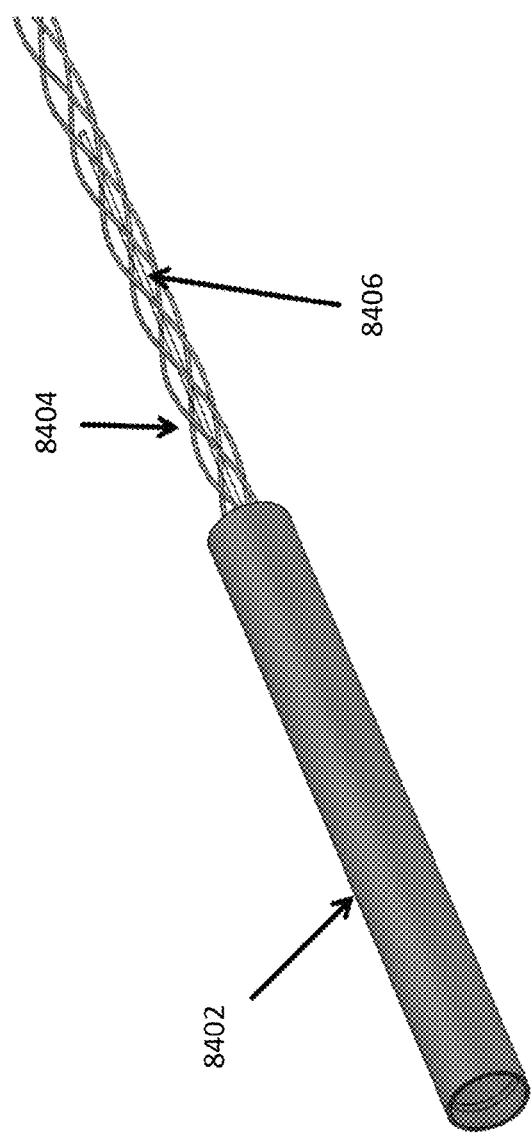
FIG. 84 illustrates an example of an individual fiber scanned display (FSD) in some embodiments.
Figure 85:
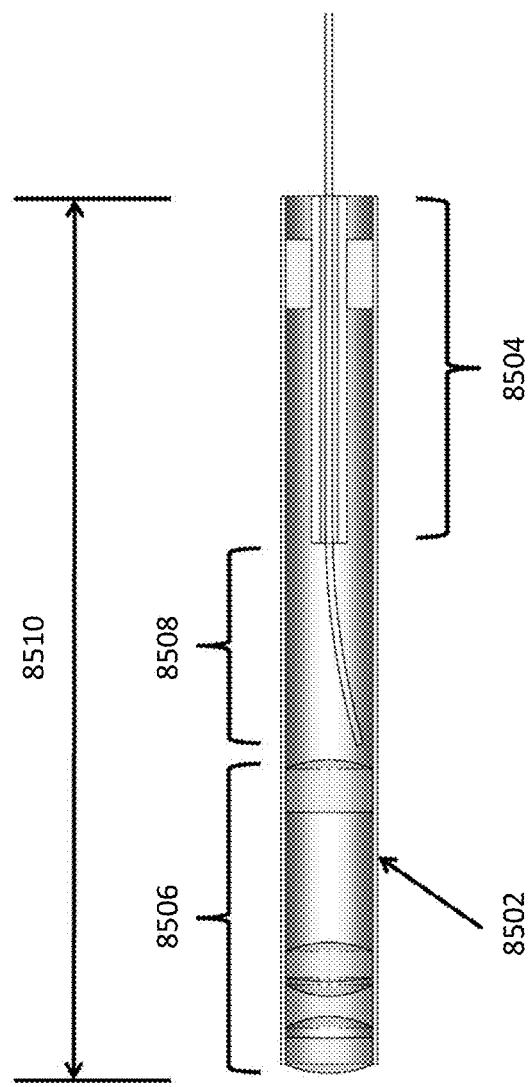
FIG. 85 illustrates a cross-sectional view of the individual fiber scanned display (FSD) illustrated in FIG. 84 in some embodiments.

The display assembly is shown in FIGS. 81-83, and the individual FSD design is shown in FIGS. 84-85. IN FIG. 82 illustrating an exploded view of the FSD tiled projector array assembly illustrated in FIG. 81 in some embodiments, the tiled array assembly includes the mask window (8202), the outer housing (8204), the elastomeric sleeve (8206), the FSD array (8208), and cable bundle and/or strain relief (8210). In FIG. 84, the fiber scanned display includes the piezo tube (8402), the piezo drive leads (8404), and the optical fiber (8406) in this example. In FIG. 85, the cross-section view of the fiber scanned display includes the housing tube (8502), the piezo tube (8504), the projector optics (8506), and the scan fiber (8508). The approximate length (8510) is about 10-mm.

Figure 86:
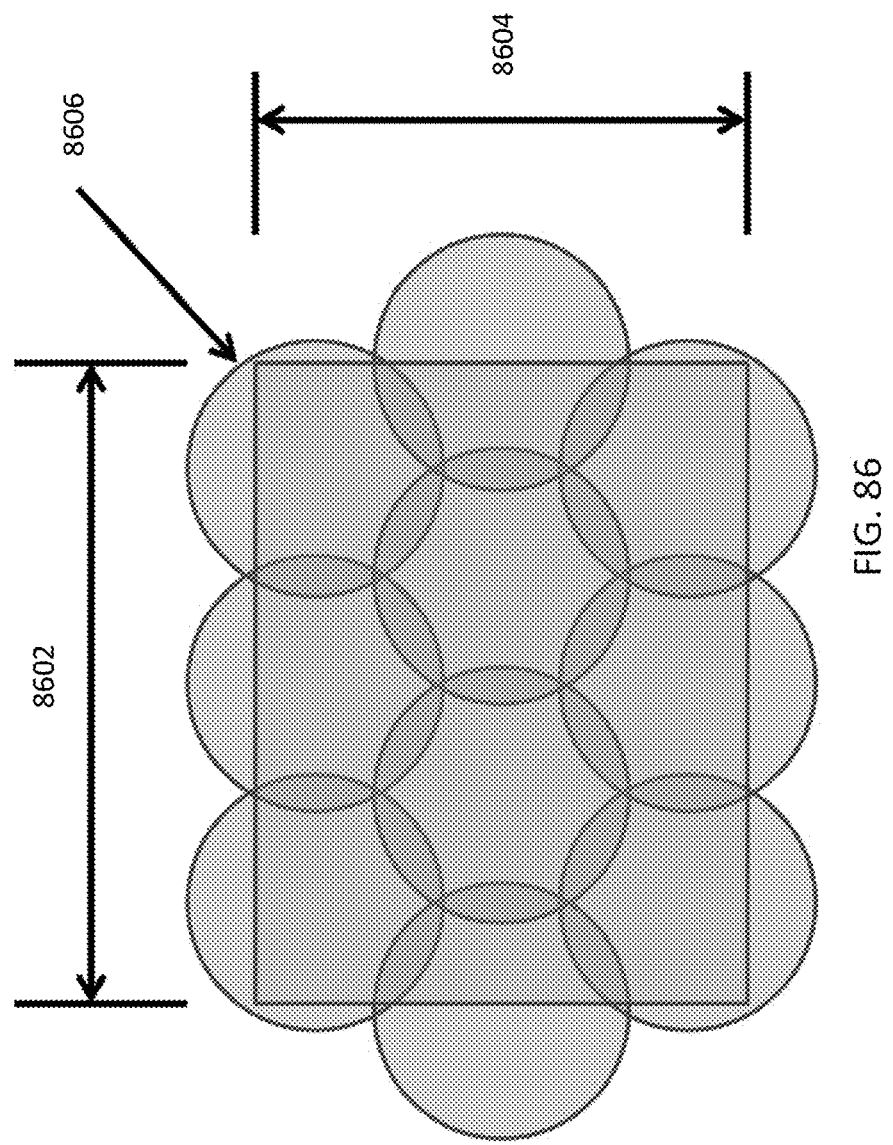
FIG. 86 illustrates a schematic representation of a 10-FSD tiled projector array assembly in some embodiments.
Figure 87:
FIG. 87 illustrates an example of a 10-FSD tiled projector array assembly in some embodiments.
Figure 88:
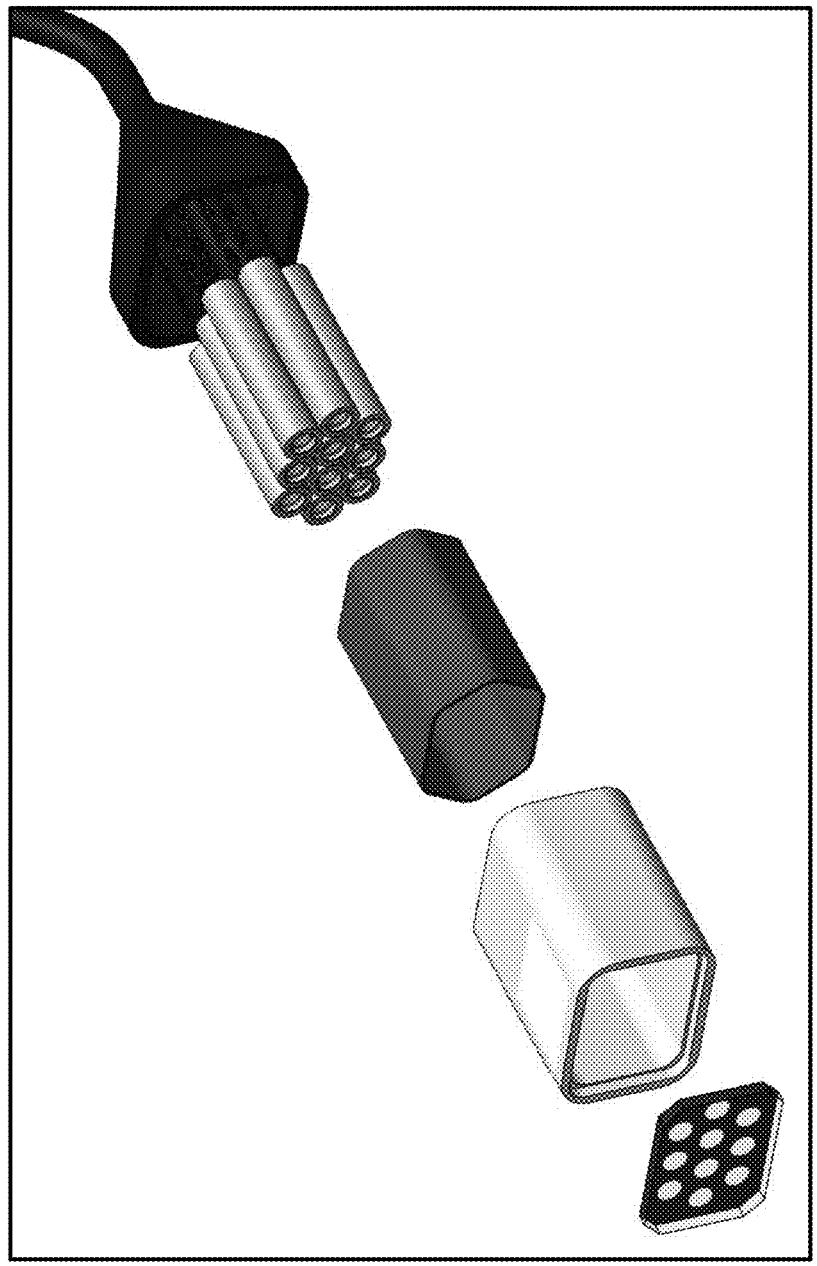
FIG. 88 illustrates an exploded view of the 10-FSD tiled projector array assembly illustrated in FIG. 87 in some embodiments.
Figure 89:
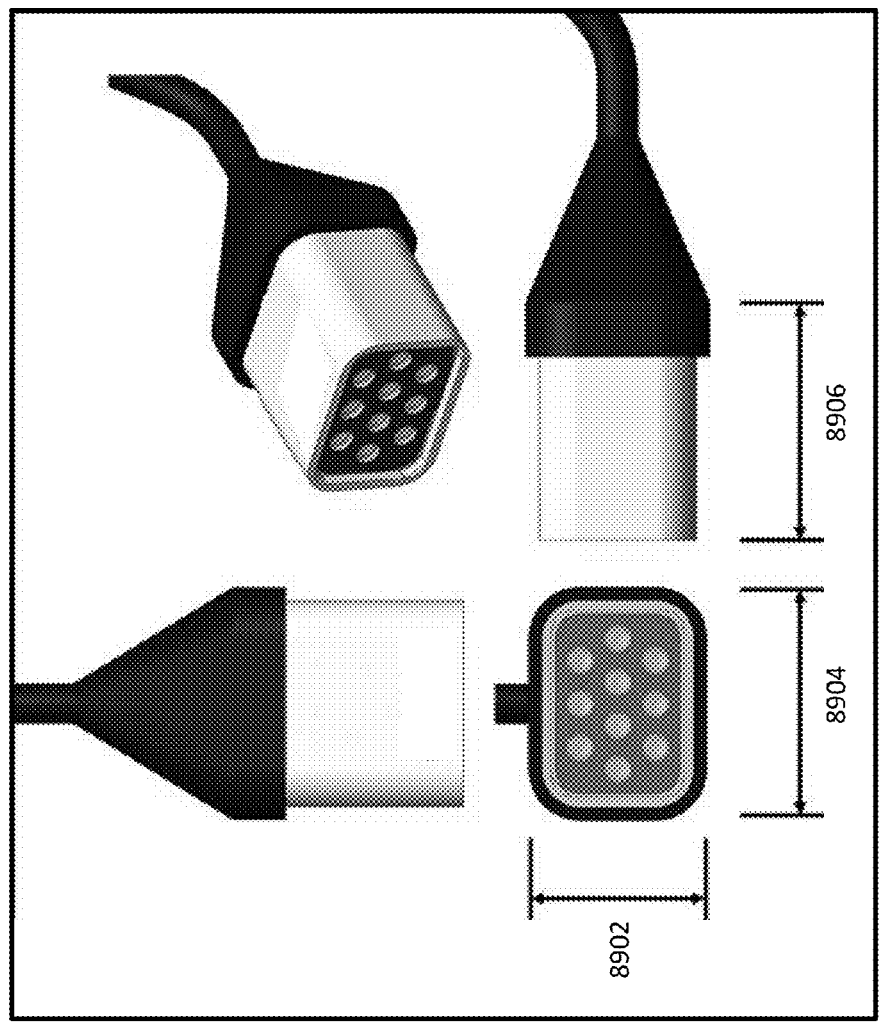
FIG. 89 illustrates the overall dimensions of the 10-FSD tiled projector array assembly illustrated in FIG. 87 in some embodiments.
Figure 90:
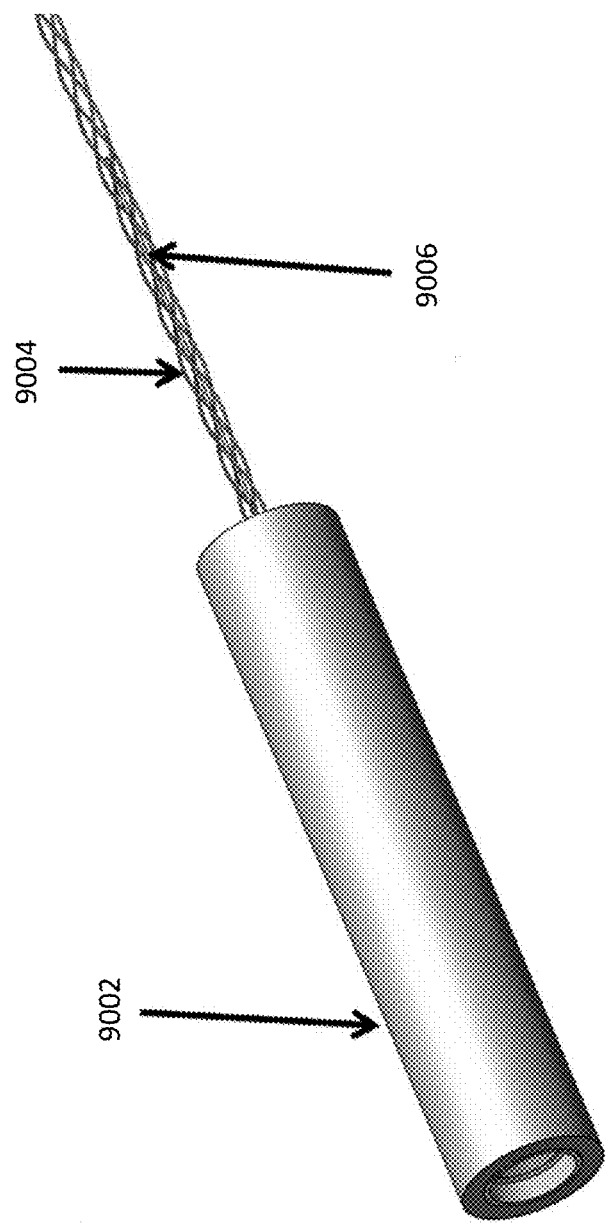
FIG. 90 illustrates an example of a 45 kHz individual fiber scanned display in some embodiments.
Figure 91:
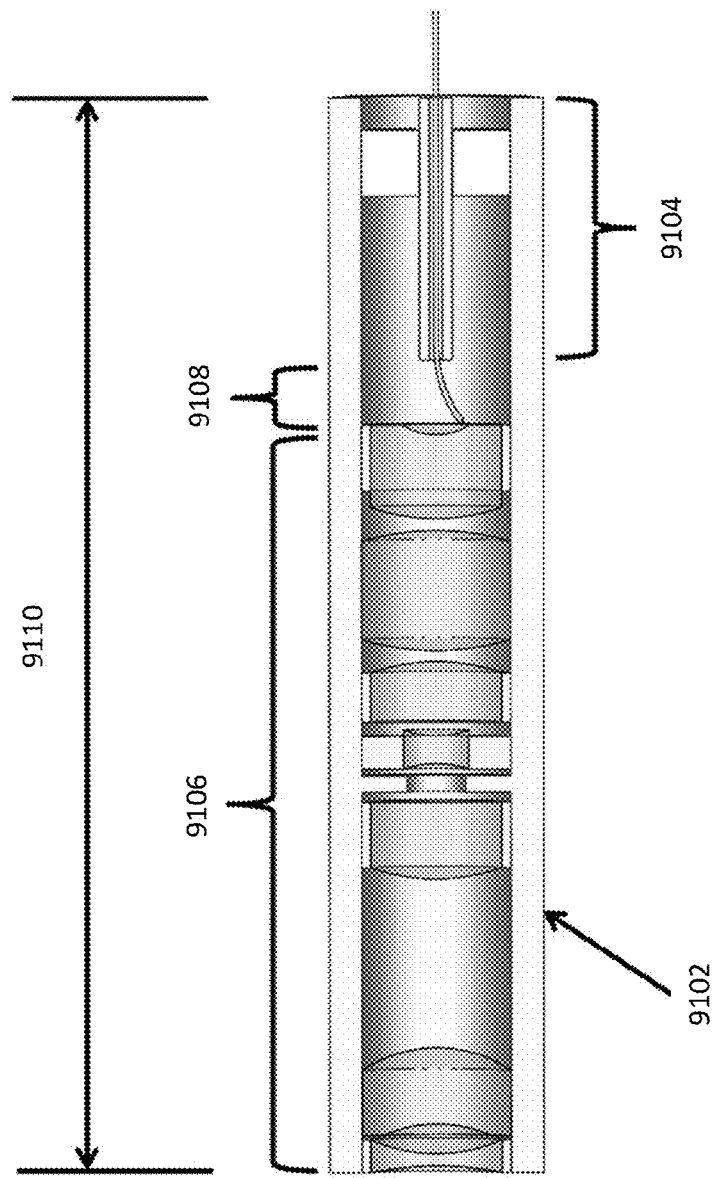
FIG. 91 illustrates a cross-sectional view of the 45 kHz individual fiber scanned display illustrated in FIG. 90 in some embodiments.

In some embodiments, the larger, 45 kHz, 8 MPx display design is similar in construction to the 5.24 MPx display. This display, however, utilizes only 10 scanners in three alternating rows of three and four scanners in this example. The assembly dimensions are 17.5 mm (L)×17.6 mm (W)×13.4 mm (H) and has a mass of approximately 10 g. The design is illustrated in FIGS. 86-91. In FIG. 86, the tiled array image schematic produces a display area of 9.37 mm (8602)×7.50 mm (8604) and includes ten φ3.77 mm fiber scanners 8606. In FIG. 89, the overall assembly of the 8 MPx display is measured 13.4 mm (8902)×17.6 mm (8904)×17.5 mm (8906). In the perspective view illustrated in FIG. 90, the individual FSD includes the piezo housing (9002), the piezo drive leads (9004), and the optical fiber (9006) in this example. In the cross-section view of a fiber scanner, the fiber scanner includes the housing tube (9102), the piezo tube (9104), the projector optics (9106), and the fiber scanner (9108). The overall length (9110) is approximately 16 mm in this example.

In the foregoing specification, various embodiments have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. In another example, one of skill in the art will appreciate that the embodiments described herein can be used to address a cross-layer electronic design with more than two electronic designs with a single editable layout and multiple selectable and non-editable layouts. The specification and drawings are, accordingly, to be regarded in an illustrative rather than restrictive sense.

I claim:

1. A tiled array of fiber scanned displays, comprising:
   a number of fiber scanners that are affixed in the tiled array in a polygonal pattern, wherein
      each of the fiber scanners produces a component image;
      a fiber scanner in the number of fiber scanners comprises:
         projector optics disposed within a housing tube; and
         a scan fiber disposed within a piezoelectric actuator tube, which is coupled with the projector optics, according to analysis results and one or more compensators; and
      a number of component images are tiled together in a corresponding polygonal pattern derived from the polygonal pattern to produce an overall image that is visually seamless;
      the overall image has a resolution of 5.24 mega-pixels with a pixel pitch of 3.66 μm and an aspect ratio of 5:4; and
   the tiled array has a dynamic range of 12-bit and produces the overall image at a refresh rate of 72 Hz.

* * * * *